United States Patent
Ellis et al.

(10) Patent No.: US 11,941,986 B2
(45) Date of Patent: Mar. 26, 2024

(54) METHODS FOR CHARACTERIZING A LOW-IMPACT VEHICLE COLLISION USING HIGH-RATE ACCELERATION DATA

(71) Applicant: Geotab Inc., Oakville (CA)

(72) Inventors: Jack Graham Ellis, Burlington (CA); Willem Petersen, Elmira (CA); Sanghamesh Vastrad, Kitchener (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/363,340

(22) Filed: Aug. 1, 2023

(65) Prior Publication Data

US 2023/0377462 A1    Nov. 23, 2023

Related U.S. Application Data

(63) Continuation-in-part of application No. 17/404,816, filed on Aug. 17, 2021.

(60) Provisional application No. 63/425,429, filed on Nov. 15, 2022, provisional application No. 63/145,057, filed on Feb. 3, 2021.

(51) Int. Cl.
*G08G 1/16*      (2006.01)
*B60W 30/09*     (2012.01)
*B60W 30/095*    (2012.01)

(52) U.S. Cl.
CPC .......... *G08G 1/162* (2013.01); *B60W 30/09* (2013.01); *B60W 30/0953* (2013.01); *G08G 1/166* (2013.01); *B60W 2520/00* (2013.01); *B60W 2556/50* (2020.02); *B60W 2756/00* (2020.02)

(58) Field of Classification Search
CPC ....... G08G 1/162; G08G 1/166; B60W 30/09; B60W 30/0953; B60W 2520/00; B60W 2556/50; B60W 2756/00
See application file for complete search history.

(56) References Cited

U.S. PATENT DOCUMENTS

| | | |
|---|---|---|
| 3,146,624 A | 9/1964 | Talbot |
| 5,491,631 A | 2/1996 | Shirane et al. |

(Continued)

FOREIGN PATENT DOCUMENTS

| | | |
|---|---|---|
| CA | 3008512 A1 | 12/2018 |
| CN | 104062465 A | 9/2014 |

(Continued)

OTHER PUBLICATIONS

Stobbe et al., Characterizing a Vehicle Collision. Co-pending U.S. Appl. No. 17/670,007, filed Feb. 11, 2022.

(Continued)

*Primary Examiner* — Daryl C Pope
(74) *Attorney, Agent, or Firm* — Wolf, Greenfield & Sacks, P.C.

(57) ABSTRACT

Described herein are various techniques, including a method that uses high-rate acceleration data for computing an accident score indicative of a potential collision and triggering an action in response to determining that the accident score indicates a potential collision. The method includes filtering out undesired high-rate acceleration trigger events such as noise and harsh braking events prior to determining the accident score. The accident score is based on contexts or scores computed from high-rate acceleration data, speed, and GPS data captured by a telematics monitor deployed in a vehicle.

19 Claims, 43 Drawing Sheets

(56) References Cited

U.S. PATENT DOCUMENTS

| | | |
|---|---|---|
| 5,608,629 A | 3/1997 | Cuddihy et al. |
| 5,801,619 A | 9/1998 | Liu et al. |
| 5,809,439 A | 9/1998 | Damisch |
| 6,076,028 A | 6/2000 | Donnelly et al. |
| 6,157,892 A | 12/2000 | Hada et al. |
| 6,185,410 B1 | 2/2001 | Greene |
| 6,223,125 B1 | 4/2001 | Hall |
| 6,246,961 B1 | 6/2001 | Sasaki et al. |
| 6,405,132 B1 | 6/2002 | Breed et al. |
| 7,089,099 B2 | 8/2006 | Shostak et al. |
| 7,123,164 B2 | 10/2006 | Zoladek et al. |
| 7,158,016 B2 | 1/2007 | Cuddihy et al. |
| 7,421,322 B1 | 9/2008 | Silversmith et al. |
| 7,656,280 B2 | 2/2010 | Hines et al. |
| 7,716,002 B1 | 5/2010 | Smith et al. |
| 7,725,216 B2 | 5/2010 | Kim |
| 7,853,375 B2 | 12/2010 | Tuff |
| 8,032,276 B2 | 10/2011 | Cawse |
| 8,155,841 B2 | 4/2012 | Erb |
| 8,437,903 B2 | 5/2013 | Willard |
| 8,589,015 B2 | 11/2013 | Willis et al. |
| 8,768,560 B2 | 7/2014 | Willis |
| 8,825,271 B2 | 9/2014 | Chen |
| 8,977,426 B2 | 3/2015 | Cawse |
| 9,043,041 B2 | 5/2015 | Willis et al. |
| 9,373,149 B2 | 6/2016 | Abhyanker |
| 9,607,444 B2 | 3/2017 | Cawse |
| 9,650,007 B1 | 5/2017 | Snyder et al. |
| 10,072,933 B1 | 9/2018 | Surpi |
| 10,083,551 B1 | 9/2018 | Schmitt et al. |
| 10,246,037 B1 | 4/2019 | Shea et al. |
| 10,392,013 B2 | 8/2019 | Hakki et al. |
| 10,395,438 B2 | 8/2019 | Jenkins et al. |
| 10,460,534 B1 | 10/2019 | Brandmaier et al. |
| 10,489,995 B2 | 11/2019 | Capozza |
| 10,676,084 B2 | 6/2020 | Fujii |
| 10,688,927 B2 | 6/2020 | Lee et al. |
| 10,843,691 B2 | 11/2020 | Stobbe et al. |
| 10,957,124 B2 | 3/2021 | Cawse |
| 10,957,127 B2 | 3/2021 | Cawse |
| 10,994,728 B2 | 5/2021 | Stobbe et al. |
| 10,999,374 B2 | 5/2021 | ElHattab et al. |
| 11,080,568 B2 | 8/2021 | ElHattab et al. |
| 11,094,144 B2 | 8/2021 | Cawse |
| 11,254,306 B2 | 2/2022 | Stobbe et al. |
| 11,352,013 B1 | 6/2022 | Srinivasan et al. |
| 11,378,956 B2 | 7/2022 | Zhang et al. |
| 11,494,921 B2 | 11/2022 | ElHattab et al. |
| 11,631,285 B2 | 4/2023 | Cawse |
| 11,758,358 B2 | 9/2023 | Stobbe et al. |
| 2003/0149530 A1 | 8/2003 | Stopczynski |
| 2003/0154017 A1 | 8/2003 | Ellis |
| 2003/0158638 A1 | 8/2003 | Yakes et al. |
| 2003/0191568 A1 | 10/2003 | Breed |
| 2004/0036261 A1 | 2/2004 | Breed |
| 2004/0102883 A1 | 5/2004 | Sala et al. |
| 2005/0040937 A1 | 2/2005 | Cuddihy et al. |
| 2006/0220826 A1 | 10/2006 | Rast et al. |
| 2007/0088465 A1 | 4/2007 | Heffington |
| 2008/0161989 A1 | 7/2008 | Breed |
| 2008/0284575 A1 | 11/2008 | Breed |
| 2008/0294690 A1 | 11/2008 | McClellan et al. |
| 2009/0048750 A1 | 2/2009 | Breed |
| 2009/0051510 A1 | 2/2009 | Follmer et al. |
| 2009/0055044 A1 | 2/2009 | Dienst |
| 2009/0228157 A1 | 9/2009 | Breed |
| 2009/0237226 A1 | 9/2009 | Okita |
| 2009/0256690 A1 | 10/2009 | Golenski |
| 2009/0276115 A1 | 11/2009 | Chen |
| 2010/0033333 A1 | 2/2010 | Victor et al. |
| 2010/0052945 A1 | 3/2010 | Breed |
| 2010/0065344 A1 | 3/2010 | Collings, III |
| 2010/0141435 A1 | 6/2010 | Breed |
| 2010/0207754 A1 | 8/2010 | Shostak et al. |
| 2010/0228432 A1 | 9/2010 | Smith et al. |
| 2010/0256863 A1 | 10/2010 | Nielsen et al. |
| 2010/0268423 A1 | 10/2010 | Breed |
| 2011/0060496 A1 | 3/2011 | Nielsen et al. |
| 2011/0093162 A1 | 4/2011 | Nielsen et al. |
| 2011/0112717 A1 | 5/2011 | Resner |
| 2011/0130915 A1 | 6/2011 | Wright et al. |
| 2011/0202152 A1 | 8/2011 | Barton et al. |
| 2011/0202305 A1 | 8/2011 | Willis et al. |
| 2011/0224865 A1 | 9/2011 | Gordon et al. |
| 2011/0226038 A1 | 9/2011 | Donahoe et al. |
| 2012/0022780 A1 | 1/2012 | Kulik et al. |
| 2012/0071151 A1 | 3/2012 | Abramson et al. |
| 2012/0075095 A1 | 3/2012 | Howard et al. |
| 2012/0077439 A1 | 3/2012 | Howard et al. |
| 2012/0077440 A1 | 3/2012 | Howard et al. |
| 2012/0077441 A1 | 3/2012 | Howard et al. |
| 2012/0078569 A1 | 3/2012 | Doerr et al. |
| 2012/0089299 A1 | 4/2012 | Breed |
| 2012/0095674 A1 | 4/2012 | Lee et al. |
| 2012/0101855 A1 | 4/2012 | Collins et al. |
| 2012/0129544 A1 | 5/2012 | Hodis et al. |
| 2012/0224827 A1 | 9/2012 | Tano |
| 2013/0218603 A1 | 8/2013 | Hagelstein et al. |
| 2013/0274955 A1 | 10/2013 | Rosenbaum |
| 2013/0302758 A1 | 11/2013 | Wright |
| 2013/0317693 A1 | 11/2013 | Jefferies et al. |
| 2013/0325250 A1 | 12/2013 | Cawse |
| 2013/0331055 A1 | 12/2013 | McKown et al. |
| 2014/0253308 A1 | 9/2014 | Kanda |
| 2014/0288727 A1 | 9/2014 | Everhart et al. |
| 2015/0142209 A1 | 5/2015 | Breed |
| 2015/0206357 A1 | 7/2015 | Chen et al. |
| 2015/0206358 A1 | 7/2015 | Chen et al. |
| 2016/0094964 A1 | 3/2016 | Barfield, Jr. et al. |
| 2016/0117868 A1 | 4/2016 | Mitchell et al. |
| 2017/0008517 A1 | 1/2017 | Himi |
| 2017/0053461 A1 | 2/2017 | Pal et al. |
| 2017/0101093 A1 | 4/2017 | Barfield, Jr. et al. |
| 2017/0132856 A1 | 5/2017 | Cawse |
| 2017/0147420 A1 | 5/2017 | Cawse et al. |
| 2017/0149601 A1 | 5/2017 | Cawse et al. |
| 2017/0149602 A1 | 5/2017 | Cawse et al. |
| 2017/0150442 A1 | 5/2017 | Cawse et al. |
| 2017/0201619 A1 | 7/2017 | Cohen et al. |
| 2017/0210323 A1 | 7/2017 | Cordova et al. |
| 2017/0236340 A1 | 8/2017 | Hagan, Jr. |
| 2017/0263120 A1 | 9/2017 | Durie, Jr. et al. |
| 2017/0309092 A1 | 10/2017 | Rosenbaum |
| 2017/0330455 A1 | 11/2017 | Kikuchi et al. |
| 2018/0025235 A1 | 1/2018 | Fridman |
| 2018/0075309 A1 | 3/2018 | Sathyanarayana et al. |
| 2018/0108189 A1 | 4/2018 | Park et al. |
| 2018/0114377 A1 | 4/2018 | Dyeyev |
| 2018/0178745 A1 | 6/2018 | Foltin |
| 2018/0188032 A1 | 7/2018 | Ramanandan et al. |
| 2018/0188384 A1 | 7/2018 | Ramanandan et al. |
| 2018/0218549 A1 | 8/2018 | Wahba et al. |
| 2019/0031100 A1 | 1/2019 | Lee et al. |
| 2019/0100198 A1 | 4/2019 | Hakki et al. |
| 2019/0102840 A1 | 4/2019 | Perl et al. |
| 2019/0122551 A1 | 4/2019 | Madrigal et al. |
| 2019/0139327 A1 | 5/2019 | Hay, II |
| 2019/0279440 A1 | 9/2019 | Ricci |
| 2019/0334763 A1 | 10/2019 | Cawse et al. |
| 2019/0378355 A1 | 12/2019 | Bruneel, II et al. |
| 2020/0001865 A1 | 1/2020 | Stobbe et al. |
| 2020/0209873 A1 | 7/2020 | Chen |
| 2020/0294401 A1 | 9/2020 | Kerecsen |
| 2020/0334762 A1 | 10/2020 | Carver et al. |
| 2020/0334928 A1 | 10/2020 | Bourke et al. |
| 2020/0342235 A1 | 10/2020 | Tsai et al. |
| 2020/0342611 A1 | 10/2020 | ElHattab et al. |
| 2020/0344301 A1 | 10/2020 | ElHattab et al. |
| 2020/0380799 A1 | 12/2020 | Cawse |
| 2021/0089572 A1 | 3/2021 | Lawlor et al. |
| 2021/0166500 A1 | 6/2021 | Cawse |
| 2021/0227031 A1 | 7/2021 | ElHattab et al. |
| 2021/0279976 A1 | 9/2021 | Cawse |
| 2021/0300346 A1 | 9/2021 | Stobbe |

(56) References Cited

U.S. PATENT DOCUMENTS

| | | |
|---|---|---|
| 2022/0118931 A1 | 4/2022 | Qi et al. |
| 2022/0161789 A1 | 5/2022 | Stobbe et al. |
| 2022/0242427 A1 | 8/2022 | Petersen et al. |

FOREIGN PATENT DOCUMENTS

| | | |
|---|---|---|
| CN | 104460464 A | 3/2015 |
| CN | 105678218 A | 6/2016 |
| CN | 104376154 B | 5/2018 |
| CN | 108062600 A | 5/2018 |
| CN | 109049006 A | 12/2018 |
| DE | 10 2007 007 848 A1 | 6/2008 |
| DE | 10 2014 225 790 A1 | 6/2016 |
| EP | 1 569 176 A2 | 8/2005 |
| EP | 2 854 112 A1 | 4/2015 |
| EP | 3 171 352 A2 | 5/2017 |
| EP | 3 281 846 A1 | 2/2018 |
| EP | 19181267.6 | 11/2019 |
| EP | 19193207.8 | 11/2019 |
| EP | 3 786 903 A1 | 3/2021 |
| EP | 22152376.4 | 5/2022 |
| ES | P201830655 | 3/2019 |
| FR | 2 944 621 A1 | 10/2010 |
| GB | 2 485 971 A | 6/2012 |
| GB | 2 506 365 A | 4/2014 |
| GB | 2 541 668 A | 3/2017 |
| GB | 2 578 647 A | 5/2020 |
| JP | 2008-073267 A | 4/2008 |
| KR | 10-2016-0088099 A | 7/2016 |
| WO | WO 2000/019239 A2 | 4/2000 |
| WO | WO 2000/052443 A1 | 9/2000 |
| WO | WO 2004/106883 A1 | 12/2004 |
| WO | WO 2013/055487 A1 | 4/2013 |
| WO | WO 2013/105869 A1 | 7/2013 |
| WO | WO 2013/184620 A1 | 12/2013 |
| WO | WO 2014/177891 A1 | 11/2014 |
| WO | WO-2017136627 A1 * | 8/2017 |

OTHER PUBLICATIONS

Cawse, VIN based accelerometer threshold. Co-pending U.S. Appl. No. 18/135,252, filed Apr. 17, 2023.

Peterson et al., Systems for Characterizing a Vehicle Collision. Co-pending U.S. Appl. No. 17/404,784, filed Aug. 17, 2021.

Peterson et al., Methods for Characterizing a Vehicle Collision. Co-pending U.S. Appl. No. 17/404,816, filed Aug. 17, 2021.

Spanish Search Report for Spanish Application No. P201830655 dated Mar. 25, 2019.

Extended European Search Report for European Application No. 19181267.6 dated Nov. 21, 2019.

Extended European Search Report for European Application No. 19193207.8 dated Nov. 12, 2019.

Extended European Search Report for European Application No. 22152376.4, dated May 31, 2022.

[No Author Listed], 2017 road safety statistics: What is behind the figures? European Commission—Fact Sheet. Apr. 10, 2018. http://europa.eu/rapid/press-release_MEMO-18-2762_en.pdf. [last accessed Dec. 5, 2019]. 5 pages.

[No Author Listed], Ecall in all new cars from Apr. 2018. European Commission, Digital Single Market. Apr. 28, 2015. https://ec.europa.eu/digital-single-market/en/news/ecall-all-new-cars-april-2018. [last accessed Dec. 5, 2019]. 3 pages.

[No Author Listed], Regulation (EU) 2015/758 of the European Parliament and of the Council of Apr. 29, 2015 concerning type-approval requirements for the deployment of the eCall in-vehicle system based on the 112 service and amending Directive 2007/46/EC. Official Journal of the European Union. May 19, 2015. https://eur-lex.europa.eu/legal-content/EN/TXT/?uri=CELEX:32015R0758. [last accessed Dec. 5, 2019]. 17 pages.

[No Author Listed], Statistics—accidents data. European Commission Community database on Accidents on the Roads in Europe (CARE) Report. Dec. 9, 2020: 1 page. https://ec.europa.eu/transport/road_safety/specialist/statistics_en [last accessed Dec. 9, 2020].

[No Author Listed], The interoperable eu-wide ecall. European Commission, Mobility and Transport. May 12, 2019. https://ec.europa.eu/transport/themes/its/road/action_plan/ecall_en. [last accessed Dec. 5, 2019]. 6 pages.

[No Author Listed], Traffic Safety Basic Facts 2017. European Commission, European Road Safety Observatory. 2017. https://ec.europa.eu/transport/road_safety/sites/roadsafety/files/pdf/statistics/dacota/bfs2017_main_figures.pdf. [last accessed Dec. 5, 2019]. 21 pages.

Ahmed, Accident Reconstruction with Telematics Data: Quick Guide for Fleet Managers. Geotab. Oct. 20, 2016:1-17.

Aloul et al., ibump: Smartphone application to detect car accidents. Industrial Automation, Information and Communications Technology (IAICT), 2014 International Conference on, IEEE. 2014:52-56.

Altun et al., Human activity recognition using inertial/magnetic sensor units. International workshop on human behavior understanding. Springer, Berlin, Heidelberg. Aug. 22, 2010:38-51.

Apté et al., Data mining with decision trees and decision rules. Future generation computer systems. Nov. 1, 1997;13(2-3):197-210.

Baoli et al., An improved k-nearest neighbor algorithm for text categorization. arXiv preprint cs/0306099. Jun. 16, 2003: 7 pages.

Bayat et al., A study on human activity recognition using accelerometer data from smartphones. Procedia Computer Science. Jan. 1, 2014;34:450-7.

Bebis et al., Feed-forward neural networks. IEEE Potentials. Oct. 1994;13(4):27-31.

Bottou, Large-scale machine learning with stochastic gradient descent. Proceedings of COMPSTAT'2010. Springer. 2010:177-186.

Breiman, Random forests. Machine learning. Oct. 1, 2001;45(1):5-32.

Broomé, Objectively recognizing human activity in body-worn sensor data with (more or less) deep neural networks. KTH Royal Institute of Technology School of Computer Science and Communication. 2017:64 pages.

Brown et al., Are you ready for the era of 'big data'. McKinsey Quarterly. Oct. 2011;4(1):1-12.

Buscarino et al., Driving assistance using smartdevices. 2014 IEEE International Symposium on Intelligent Control (ISIC) Oct. 8, 2014:838-842.

Chong et al., Traffic accident analysis using machine learning paradigms. Informatica. Jan. 1, 2005;29(1):89-98.

Christ, Convolutional Neural Networks for Classification and Segmentation of Medical Images. Ph.D. thesis, Technische Universität München. 2017:137 pages.

Dimitrakopoulos et al., Intelligent transportation systems. IEEE Vehicular Technology Magazine. Mar. 15, 2010;5(1):77-84.

Errejon et al., Use of artificial neural networks in prostate cancer. Molecular urology. Dec. 1, 2001;5(4):153-8.

Frigge et al., Some implementations of the boxplot. The American Statistician. Feb. 1, 1989;43(1):50-4.

Gentleman et al., Unsupervised machine learning. Bioconductor case studies. Springer, New York, NY. 2008:137-157.

Glorot et al., Understanding the difficulty of training deep feedforward neural networks. Proceedings of the thirteenth international conference on artificial intelligence and statistics Mar. 31, 2010:249-256.

Goetz et al., Extremely randomized trees based brain tumor segmentation. Proceeding of BRATS challenge—MICCAI. May 2014:7 pages.

Gorjestani et al., Impedance control for truck collision avoidance. Proceedings of the 2000 IEEE American Control Conference (ACC). Jun. 28, 2000;3:1519-24.

Gu et al., Recent advances in convolutional neural networks. Pattern Recognition. 2017:38 pages.

Gurney, An introduction to neural networks. CRC press. Aug. 5, 1997:7 pages.

Harms, Terrestrial gravity fluctuations. Living reviews in relativity. Dec. 1, 2015;18(1):1-150.

Hecht-Nielsen, Theory of the backpropagation neural network. Neural networks for perception. Academic Press, Inc. 1992:65-93.

(56) References Cited

OTHER PUBLICATIONS

Hinton et al., Deep neural networks for acoustic modeling in speech recognition: The shared views of four research groups. IEEE Signal Processing Magazine, Nov. 2012;29(6):82-97.

Hou et al., A real time vehicle collision detecting and reporting system based on internet of things technology. 2017 3rd IEEE International Conference on Computer and Communications (ICCC). Dec. 13, 2017:1135-1139.

Iandola et al., SqueezeNet: AlexNet-level accuracy with 50x fewer parameters and< 0.5 MB model size. arXiv preprint arXiv:1602.07360. Feb. 24, 2016:1-13.

Ioffe et al., Batch normalization: Accelerating deep network training by reducing internal covariate shift. arXiv preprint arXiv:1502.03167. Feb. 11, 2015:1-11.

Jain et al., Data clustering: 50 years beyond K-means. Pattern recognition letters. Jun. 1, 2010;31(8):651-66.

Jolliffe, Principal component analysis and factor analysis. Principal component analysis. Springer, 1986:111-149.

Júnior et al., Driver behavior profiling: An investigation with different smartphone sensors and machine learning. PLoS one. Apr. 10, 2017;12(4):1-16.

Keller et al., A fuzzy k-nearest neighbor algorithm. IEEE transactions on systems, man, and cybernetics. Jul. 1985(4):580-5.

Keogh et al., Exact indexing of dynamic time warping. Knowledge and information systems. Mar. 1, 2005;7(3):29 pages.

Khorrami et al., Do deep neural networks learn facial action units when doing expression recognition ?. Proceedings of the IEEE International Conference on Computer Vision Workshops 2015:19-27.

Kitchin, The data revolution: Big data, open data, data infrastructures and their consequences. Sage; Aug. 18, 2014:244 pages.

Krizhevsky et al., Imagenet classification with deep convolutional neural networks. Communications of the ACM. Jun. 2017;60(6):84-90.

Larose, k-nearest neighbor algorithm. Discovering knowledge in data: An introduction to data mining. 2005:90-106.

Lecun et al., Backpropagation applied to handwritten zip code recognition. Neural Computation. Dec. 1989;1(4):541-51.

Lee et al., Predictive risk assessment using cooperation concept for collision avoidance of side crash in autonomous lane change systems. 2017 17th International Conference on Control, Automation and Systems (ICCAS). Oct. 18, 2017:47-52.

Li et al., An improved k-nearest neighbor algorithm for text categorization. arXiv preprint cs/0306099. Jun. 16, 2003:7 pages.

Liao, Clustering of time series data—a survey. Pattern recognition. Nov. 1, 2005;38(11):1857-74.

Liaw et al., Classification and regression by randomForest. R news. Dec. 3, 2002;2(3):1-41.

McCulloch et al., A logical calculus of the ideas immanent in nervous activity. The Bulletin of Mathematical Biophysics. Dec. 1, 1943;5(4):115-33.

Michalski et al., Machine learning: An artificial intelligence approach. Springer Science & Business Media. 2013. 587 pages.

Naik, Advances in Principal Component Analysis: Research and Development. Springer, 2017:256 pages.

Nair et al., Rectified linear units improve restricted Boltzmann machines. Proceedings of the 27th international conference on machine learning (ICML-10). Jan. 1, 2010:8 pages.

Neter et al., Applied linear statistical models. Chicago: Irwin; Feb. 1996. Fourth Edition. 1432 pages.

Nyamati et al., Intelligent collision avoidance and safety warning system for car driving. 2017 International Conference on Intelligent Computing and Control Systems (ICICCS). Jun. 15, 2017:791-796.

Olah et al., The building blocks of interpretability. Distill. Mar. 6, 2018;3(3):1-22.

Perez et al., The effectiveness of data augmentation in image classification using deep learning. arXiv preprint arXiv:1712.04621. Dec. 13, 2017:8 pages.

Qian et al., Similarity between Euclidean and cosine angle distance for nearest neighbor queries. Proceedings of the 2004 ACM Symposium on Applied Computing, ACM. Mar. 14, 2004:1232-1237.

Rédei, Introduction. In: Encyclopedia of genetics, genomics, proteomics, and informatics. Springer, Dordrecht. 2008:2 pages. https://link.springer.com/referencework/10.1007/978-1-4020-6754-9 [last accessed Dec. 9, 2020].

Rédei, Principal Component Analysis. In: Encyclopedia of genetics, genomics, proteomics, and informatics. Springer, Dordrecht. 2008:672.

Robert, Machine learning, a probabilistic perspective. Chance. Apr. 23, 2014;27(2):62-63.

Rupok et al., MEMS accelerometer based low-cost collision impact analyzer. 2016 IEEE International Conference on Electro Information Technology (EIT). May 19, 2016:0393-0396.

Sakoe et al., Dynamic programming algorithm optimization for spoken word recognition. IEEE transactions on acoustics, speech, and signal processing. Feb. 1978;26(1):43-9.

Salvador et al., FastDTW: Toward accurate dynamic time warping in linear time and space. Intelligent Data Analysis. Jan. 1, 2007;11(5):561-80.

Shalizi, Advanced data analysis from an elementary point of view. Sep. 8, 2019:828 pages.

Shazeer et al., Outrageously large neural networks: The sparsely-gated mixture-of-experts layer. arXiv preprint arXiv: 1701.06538. Jan. 23, 2017:1-19.

Smith, Image segmentation scale parameter optimization and land cover classification using the Random Forest algorithm. Journal of Spatial Science. Jun. 1, 2010;55(1):69-79.

Srivastava et al., Dropout: a simple way to prevent neural networks from overfitting. The Journal of Machine Learning Research. Jan. 1, 2014;15(1):1929-58.

Stobbe, Road Accident Prediction and Characterization Using Convolutional Neural Networks. Master's Thesis, Institute for Data Processing Technische Universität München. Jul. 2, 2018:93 pages.

Sug, The effect of training set size for the performance of neural networks of classification. WSEAS Transactions on Computers. Nov. 1, 2010;9(11):1297-306.

Ten Holt et al., Multi-dimensional dynamic time warping for gesture recognition. Thirteenth annual conference of the Advanced School for Computing and Imaging. Jun. 13, 2007:8 pages.

Thompson, Regression methods in the comparison of accuracy. Analyst. 1982;107(1279):1169-80.

Tomas-Gabarron et al., Vehicular trajectory optimization for cooperative collision avoidance at high speeds. IEEE Transactions on Intelligent Transportation Systems. Jul. 16, 2013;14(4):1930-41.

Virtanen et al., Impacts of an automatic emergency call system on accident consequences. Proceedings of the 18th ICTCT, Workshop Transport telemetric and safety. Finland 2005:1-6.

Voulodimos et al., Deep learning for computer vision: A brief review. Computational intelligence and neuroscience. 2018;2018:1-13.

Wang et al., Improving nearest neighbor rule with a simple adaptive distance measure. Pattern Recognition Letters. Jan. 15, 2007;28(2):207-13.

Werbos, Backpropagation through time: what it does and how to do it. Proceedings of the IEEE. Oct. 1, 1990;78(10):1550-60.

Witten et al., Data Mining: Practical machine learning tools and techniques. Morgan Kaufmann; 2017. Fourth Edition. 646 pages.

Xu et al., Empirical evaluation of rectified activations in convolutional network. arXiv preprint arXiv:1505.00853. Nov. 27, 2015:5 pages.

Yamane, Statistics: An introductory analysis. Harper & Row New York, NY. 1973. Third Edition. 1146 pages.

Yee et al., Mobile vehicle crash detection system. 2018 IEEE International Workshop on Advanced Image Technology (IWAIT). Jan. 7, 2018:1-4.

Yosinski et al., Understanding neural networks through deep visualization. arXiv preprint arXiv:1506.06579. Jun. 22, 2015:1-12.

Zhang et al., A feature selection-based framework for human activity recognition using wearable multimodal sensors. Proceedings of the 6th International Conference on Body Area Networks. ICST (Institute for Computer Sciences, Social-Informatics and Telecommunications Engineering). Nov. 7, 2011:92-98.

(56) References Cited

OTHER PUBLICATIONS

Zou et al., Correlation and simple linear regression. Radiology. Jun. 2003:227(3);617-628.
U.S. Appl. No. 17/670,007, filed Feb. 11, 2022, Stobbe et al.
U.S. Appl. No. 18/135,252, filed Apr. 17, 2023, Cawse.
U.S. Appl. No. 17/404,784, filed Aug. 17, 2021, Petersen et al.
U.S. Appl. No. 17/404,816, filed Aug. 17, 2021, Petersen et al.

* cited by examiner

METHODS FOR CHARACTERIZING A LOW-IMPACT VEHICLE COLLISION USING HIGH-RATE ACCELERATION DATA

CROSS-REFERENCE TO RELATED APPLICATIONS

This application is a continuation-in-part of and claims priority under 35 U.S.C. § 120 to U.S. application Ser. No. 17/404,816, entitled "METHODS FOR CHARACTERIZING A VEHICLE COLLISION," and filed Aug. 17, 2021 which claims the benefit under 35 U.S.C. § 119(e) to U.S. Provisional Application Ser. No. 63/145,057, entitled "HARSH ACCELERATION DETECTION," and filed Feb. 3, 2021. This application the benefit under 35 U.S.C. § 119(e) of U.S. Provisional Application Ser. No. 63/425,429, filed Nov. 15, 2022, entitled "SYSTEMS FOR CHARACTERIZING A LOW-IMPACT VEHICLE COLLISION USING HIGH-RATE DATA." The contents of these applications are incorporated herein by reference in their entirety.

TECHNICAL FIELD

The present disclosure generally relates to fleet management, and in particular relates to methods and systems for characterizing a low-impact vehicle collision using high-rate acceleration data.

BACKGROUND

Some organizations, including commercial enterprises or other organizations, own and/or operate a fleet of vehicles. For example, a commercial enterprise that provides goods or services to customers at customers' homes (e.g., pest control services, or grocery delivery services) may own and/or operate a fleet of vehicles used by employees and/or contractors to travel to the customers' homes.

These organizations often desire to know when one of their vehicles has been involved in a collision, so the organization can respond appropriately and effectively. The organization may want to know promptly that a collision has occurred so it can attempt to contact the employee/contractor who was operating the vehicle and determine whether the employee/contractor, or any other person, has been injured and so that emergency services can be dispatched if needed. The organization may also want to know promptly that a collision has occurred so it can promptly begin investigating the collision and determine whether the organization is likely to incur any liability for the collision and, if so, so that it can begin addressing the collision appropriately.

SUMMARY

In one aspect of the present disclosure there is provided a method by a telematics monitor and a collision detection facility. The method comprises capturing by a telematics monitor coupled to a vehicle high-rate acceleration data speed data and global positioning system (GPS) data; computing, by a collision detection facility local to the telematics monitor each of an acceleration context based on the high-rate acceleration data, a pullover context based on the speed data, a speed context based on the speed data, and a road context based on the GPS data; computing by the collision detection facility an accident score based on the acceleration context, the pullover context, the speed context, and the road context; and in response to determining that the accident score indicates a potential collision, triggering at least one action for responding to the potential collision.

Capturing the high-rate acceleration data may comprise capturing acceleration data at a rate between 80 Hz and 120 Hz.

Computing the acceleration context may comprise identifying at least one high-rate acceleration trigger event from the high-rate acceleration data and computing a plurality of feature values for a plurality of features corresponding to the at least one high-rate acceleration trigger event. When at least some of the plurality of feature values indicate that the at least one high-rate acceleration trigger event comprises a noise event or a harsh braking event, the method includes filtering out the at least one high-rate acceleration trigger event from the high-rate acceleration data. When the at least some of the plurality of feature values indicate that the high-rate acceleration trigger event does not comprise a noise event and does not comprise a harsh braking event, the method includes computing a plurality of feature scores corresponding to the plurality of feature values and computing the acceleration context based on the plurality of feature scores.

Identifying the at least one high-rate acceleration trigger event from the high-rate acceleration data may comprise identifying a plurality of successive acceleration points having a magnitude which is above a trigger threshold.

Identifying the at least one high-rate acceleration trigger event from the high-rate acceleration data may comprise identifying a first plurality of successive acceleration points having magnitudes above a trigger threshold and identifying a second plurality of successive acceleration points magnitudes above the trigger threshold. When a first acceleration point of the second plurality of successive acceleration points has a first acceleration point timestamp that is within a predetermined time window after a last acceleration point timestamp of a last acceleration point in the first plurality of successive acceleration points, the method may further comprise combining the first plurality of successive acceleration points and the second plurality of successive acceleration points to form the at least one high-rate acceleration trigger event.

Computing the plurality of feature values for the plurality of features corresponding to the at least one high-rate acceleration trigger event may comprise defining an impact window for the at least one high-rate acceleration trigger event, computing an area-under-the-curve (AUC) for the impact window, computing a deviation change for the impact window, determining an impact window length for the impact window, determining a maximum acceleration point value of the impact window, and determining a number of zero crossings for the impact window.

At least some of the plurality of feature values indicate that the at least one high-rate acceleration trigger event comprises a noise event when the AUC comprises a combined AUC for a combined X-direction and Y-direction acceleration profile inside the impact window, the combined AUC has a lower magnitude than a noise AUC threshold, the deviation change is greater than a noise deviation change threshold, and the number of zero crossings is greater than a noise zero crossings threshold.

At least some of the plurality of feature values indicate that the at least one high-rate acceleration trigger event comprises a harsh braking event when the AUC is more negative than a harsh braking AUC threshold, the deviation change is less than a harsh braking deviation change threshold, and the maximum acceleration point value is lower than the low maximum acceleration threshold.

Computing the plurality of feature scores may comprise computing an AUC score from the AUC, computing a deviation score from the deviation change, and computing an impact length score from the impact window length.

Computing the plurality of feature scores may further comprise computing a maximum acceleration score.

Computing the AUC score may comprise comparing an X-direction maximum acceleration for an X-direction acceleration profile of the at least one high-rate acceleration trigger event and a Y-direction maximum acceleration for a Y-direction acceleration profile of the at least one high-rate acceleration trigger event, when the X-direction maximum acceleration is greater than the Y-direction AUC computing an X-direction AUC and selecting the X-direction AUC as a selected AUC that is to be mapped to the AUC score, and when the Y-direction maximum acceleration is greater than the X-direction maximum acceleration computing a Y-direction AUC and selecting the Y-direction AUC to be the selected AUC that is to be mapped to the AUC score.

Mapping the selected AUC to the AUC score may comprise setting the AUC score to 1 when the selected AUC is lower than a maximum negative AUC or is higher than a maximum positive AUC.

Mapping the selected AUC to the AUC score may comprise setting the AUC score to 1−(the selected AUC−the maximum negative AUC)/(the medium negative AUC−the maximum negative AUC) when the selected AUC is higher than the maximum negative AUC and is lower than a medium negative AUC.

Mapping the selected AUC to the AUC score may comprise setting the AUC score to 0 when the selected AUC is higher than the medium negative AUC and lower than a medium positive AUC.

Mapping the selected AUC to the AUC score may comprise setting the AUC score to (the maximum positive AUC−the selected AUC)/(the maximum positive AUC−the medium positive AUC) when the selected AUC is higher than the medium positive AUC and is lower than the maximum positive AUC.

Computing the deviation score may comprise for each of an X-direction acceleration profile and a Y-direction acceleration profile of the at least one high-rate acceleration trigger event, computing a first standard deviation for a first plurality of acceleration points within the impact window, computing a second standard deviation for a second plurality of acceleration points outside the impact window but within a predetermined duration thereof, and computing the deviation change by dividing the first standard deviation by the second standard deviation.

The present disclosure relates to techniques for characterizing a vehicle collision. In an embodiment, the techniques provide a computerized method comprising: in response to obtaining information regarding a potential collision between a vehicle and an object: obtaining, for a time period extending before and after a time of the potential collision, data describing the vehicle during the time period; determining, based at least in part on the data describing the vehicle during the time period, a likelihood that the potential collision is a non-collision event; and in response to determining that the likelihood indicates that the potential collision is not a non-collision event, triggering one or more actions responding to the potential collision. The deviation change computed for the X-direction acceleration profile is an X-direction deviation change, and the deviation change computed for the Y-direction acceleration profile is a Y-direction deviation change.

Computing the deviation score may further comprise selecting a higher deviation change of the X-direction deviation change and the Y-direction deviation change as a selected deviation change, when the selected deviation change is lower than a minimum deviation change setting the deviation score to 0, when the selected deviation change is higher than a maximum deviation change, setting the deviation score to 1, and when the selected deviation change is higher than the minimum deviation change and lower than the maximum deviation change, setting the deviation score to (the selected deviation change−the minimum deviation change)/(the maximum deviation change−the minimum deviation change).

Determining the impact length score may comprise when the impact window length is lower than a minimum impact window length or higher than a maximum impact window length setting the impact length score to 0, when the impact window length is higher than a low impact window length and lower than a high impact window length setting the impact length score to 1, when the impact window length is higher than the minimum impact window length and is lower than the low impact window length setting the impact length score to (the impact window length−the minimum impact window length)/(the low impact window length−the minimum impact window length), and when the impact window length is higher than the high impact window length and lower than the maximum impact window length, setting the impact length score to 1− (the maximum impact window length−the impact window length)/(the maximum impact window length−the minimum impact window length).

Computing the maximum acceleration score may comprise when the maximum acceleration point value is lower than a low maximum acceleration threshold setting the maximum acceleration score to 0, when the maximum acceleration point value is higher than a high maximum acceleration threshold setting the maximum acceleration score to 1, and when the maximum acceleration point value is higher than the low maximum acceleration threshold and lower than the high maximum acceleration threshold setting the maximum acceleration score to (the maximum acceleration point value−the low maximum acceleration threshold)/(the high maximum acceleration threshold−the low maximum acceleration threshold).

Computing the accident score may comprise computing a weighted average of the acceleration context, the pullover context, the speed context, and the road context.

Triggering the at least one action may comprise placing the telematics monitor in a data-gathering mode for gathering additional data pertaining to a collision.

Triggering the at least one action may comprise making an emergency call from the telematics monitor.

Defining the impact window may uses a threshold-based method in which the impact window starts at a first acceleration point having an acceleration magnitude that is higher than an impact window trigger threshold and the impact window ends at a second acceleration point having an acceleration magnitude that is lower than the impact window trigger threshold.

In an embodiment, the techniques provide a system comprising: at least one processor; and at least one storage medium containing program instructions that, when executed by the processor, cause the at least one processor to carry out a method that comprises various operations in response to obtaining information regarding a potential collision between a vehicle and an object. The operations in the method include: obtaining, for a time period extending before and after a time of the potential collision, data describing the vehicle during the time period; determining, based at least in part on the data describing the vehicle during the time period, a likelihood that the potential collision is a non-collision event; and in response to determining that the likelihood indicates that the potential collision is not a non-collision event, triggering one or more actions responding to the potential collision.

In an embodiment, the techniques provide a system comprising: at least one non-transitory computer-readable storage medium containing program instructions that, when executed by at least one processor, will cause the at least one processor to carry out a method comprising various operations. These various operations include: in response to obtaining information regarding a potential collision between a vehicle and an object: obtaining, for a time period extending before and after a time of the potential collision, data describing the vehicle during the time period; determining, based at least in part on the data describing the vehicle during the time period, a likelihood that the potential collision is a non-collision event; and in response to determining that the likelihood indicates that the potential collision is not a non-collision event, triggering one or more actions responding to the potential collision.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
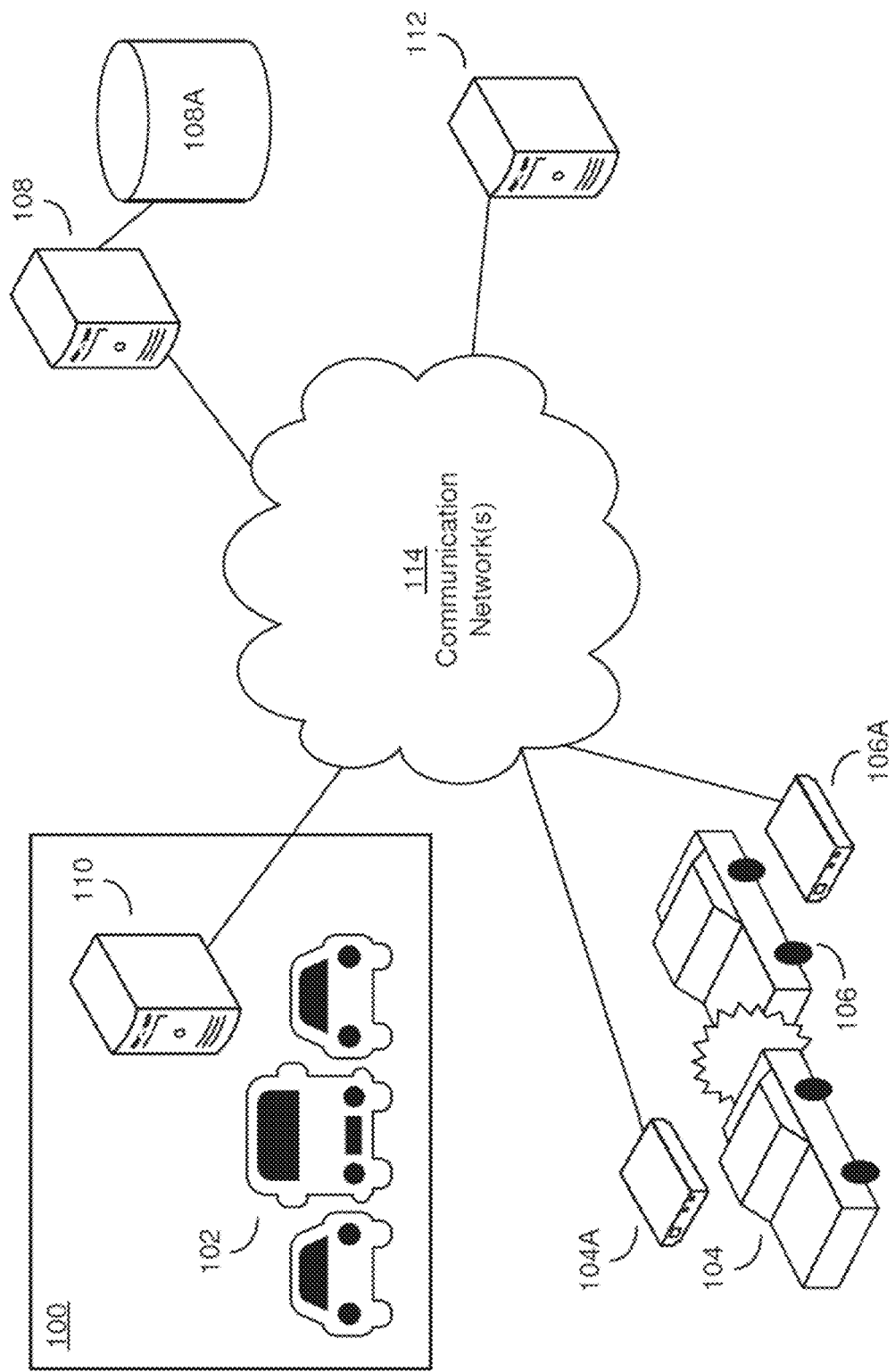
FIG. 1 is a schematic diagram of an illustrative system with which some embodiments may operate.

Described herein are various embodiments of a system that processes information describing movement of a vehicle related to a potential collision to reliably determine whether a collision occurred and/or to determine one or more characteristics of the collision.

Different collisions have different effects on the vehicle(s) and people involved in the collisions and thus may justify different responses. For example, a severe collision may justify involving emergency services while a minor collision may not. A collision in which a first vehicle is struck by a second from the back may suggest fault lies primarily with the driver of the second vehicle, and different responses may be appropriate for the owner or operator of the first vehicle than for the second vehicle. Detecting a potential collision and reliably determining whether the potential collision is likely an actual collision, or determining characteristics of a collision, may aid in determining an appropriate response to the potential collision.

Conventionally, accelerometer data has been used to determine whether a vehicle has experienced a collision. Accelerometer data is used because accelerometers are simple devices to install and use and also because of the relation between acceleration and force, and the conventional understanding that when a vehicle experiences a sudden acceleration/force, this is a sign that the vehicle experienced a collision. In one such conventional approach, accelerometer data is analyzed to derive an acceleration experienced by the accelerometer (and thus potentially by the vehicle) over time and to determine whether the acceleration at any time exceeds a threshold. If the acceleration exceeds the threshold, the vehicle is inferred to have experienced a collision.

The inventors have recognized and appreciated that such conventional approaches were unreliable and limited in the information they were able to provide. Often, the conventional approach suffered from false positives (flagging a collision when there was not a collision) and false negatives (not flagging a collision when there was a collision). The inventors have recognized and appreciated that this lack of reliability is because acceleration alone is not a reliable predictor of whether a collision has occurred. Vehicles or accelerometers may, under normal circumstances, experience accelerations of similar magnitude to accelerations experienced by a vehicle during a collision when there is no actual collision. For example, an accelerometer unit disposed in a passenger cabin of a vehicle may on occasion be accidentally kicked or bumped, and it is difficult to differentiate an acceleration associated with a kick or bump from an acceleration experienced during a collision. In another example, accelerometers on board a vehicle may experience accelerations when there is a door slam, when the vehicle is being loaded (e.g., when objects are being placed in a cargo area of the vehicle), or when the vehicle is being unloaded. In such scenarios, a potential collision may be detected when there is no actual collision.

As another example, an accelerometer unit disposed in a passenger cabin of a vehicle may be loosely mounted and may move while the vehicle is operating, such as by snapping from one position to another when the vehicle is turning. When the unit moves suddenly, the movement may be incorrectly flagged as a collision. As a further example, a large pothole or other road deformity, or other road surface feature (e.g., railway track or other road impediments) may, when struck by a vehicle, cause a large acceleration value that may be difficult to differentiate from acceleration values associated with collisions. Kicks or bumps, and potholes, or other road surface features, may therefore be flagged as a collision, a false positive.

The inventors recognized and appreciated that conventional techniques were limited in the information they were able to leverage to determine whether a collision had occurred. Information about a vehicle before or after a collision is detected, has not been used in collision detection, but has instead been used in accident reconstruction, to determine other events that may have caused the collision, or events that happened after the collision. These techniques do not improve the unreliable nature of acceleration analysis (discussed in the preceding paragraph), for example, reduce false positive or false negative detection. For example, data obtained subsequent to a collision may be analyzed in a conventional system to determine what happened to the vehicle (e.g., the vehicle has left, the vehicle has blocked the road etc.). These data obtained after the collision is determined to have occurred, however, is not in any way related to determining whether the collision occurred and thus does not improve the false positive or false negative detection.

The inventors recognized and appreciated that other telemetry data describing a vehicle may be used to enhance the reliability of processing of accelerometer data about a potential collision. For example, GPS information, speed information, road condition, vehicle operating condition (including operating condition of instruments or other components installed in a vehicle), or contextual information around the time of the potential collision may all advantageously provide additional information about the potential collision. However, it remains a challenge how these telemetry data may be analyzed to improve the collision detection accuracy. Some of these data may be used in a conventional system as a sole decision factor. For example, GPS data may be used to determine whether a vehicle is off road. If the vehicle is determined to be off road, a determination may be made to indicate that the vehicle experienced an accident. This single-factor approach often does not account for other scenarios. For example, the vehicle could be parked in a parking lot or an unpaved area; the GPS sensor on the vehicle may be improperly operating; or the GPS sensor may generate unreliable data points when an accident occurred. These may result in a false positive or false negative decision about a potential collision.

The inventors further recognized and appreciated that reliably determining whether a collision has occurred and determining information characterizing the collision may be enabled by monitoring movements of a vehicle for a longer period of time around a collision. Conventional approaches focused on an instant in time, which was inferred to be the instant of first impact for a collision. The inventors recognized and appreciated, however, that some collisions may last quite some time, such as for more than a second or even up to 10 seconds. Reviewing movement information for the entirety of the collision may help in characterizing the collision. Beyond that, though, the inventors recognized and appreciated that by reviewing movements of a vehicle from a time starting before a collision and lasting until a time following the collision, the reliability of determining whether a collision occurred and the reliability of characterizing the collision may be increased.

The inventors further recognized and appreciated that reliably determining whether a collision has occurred and determining information characterizing the collision may depend on reliable data points from a telematics monitor installed in a vehicle, as such telematics monitor may provide information that may be used to determine whether the collision occurred and/or to characterize the collision. However, once an accident happens, a telematics monitor may operate improperly. For example, a monitor may become loosely installed and may move in a way that is not directly reflective of movements of the whole vehicle, and thus unreliable acceleration data may be obtained. In another example, acceleration triggers accompanied by an airbag deploying may result in acceleration signals that may be confusable with collision accelerations. As another example, collection of GPS signals to determine location may be less reliable or unavailable after a collision, due to damage to a GPS receiver and/or a location or orientation of a vehicle that limits reception of GPS signals. These difficulties may reduce the accuracy of a system in determining whether a potential collision is likely to have been an actual collision.

Accordingly, the inventors have developed new technologies to improve the reliability of collision detection, for example, by reducing a false detection rate. In some embodiments, data describing a vehicle may be analyzed to identify an indication of a potential collision between the vehicle and at least one other object, such as one or more other vehicles or one or more obstacles. Examples of data describing a vehicle may include sensor data from various telematics monitors installed on board a vehicle. For example, the data may include acceleration data from an accelerometer, location information from a GPS sensor, engine diagnostics codes recorded on board the vehicle, operational signals from one or more components (e.g., instruments) of the vehicle (e.g., data or signals output by an airbag controller), data from laser sensors, audio data captured in the vehicle, image/video data from an image capturing device (e.g., a camera) on board the vehicle, and/or other suitable sensor data. Alternatively, and/or additionally, data describing the vehicle may be captured from a sensor not on board the vehicle. For example, image data depicting the vehicle may be obtained from a camera installed off of a road the vehicle was traveling.

The data describing the vehicle may include any information about the operation of the vehicle, the driver of the vehicle, the road the vehicle was traveling, and/or the environment (e.g., street scene) the vehicle was passing by. The data describing the vehicle may be obtained from another device over a communication network, such as from one or more servers (e.g., a "cloud" system). For example, the data that may be obtained from one or more sensors on board the vehicle may be provided from the vehicle to the server(s) or may be downloaded from the server(s). In another example, the image data captured by a camera of the street the vehicle was traveling through may be uploaded to a server that processes data describing the vehicle to determine a likelihood of collision.

Alternatively, and/or additionally, data describing the vehicle may also be generated based, at least in part, on sensor data collected by one or more sensors of the vehicle or sensors installed elsewhere. For example, the speed of a vehicle may be obtained based on calculations performed on GPS data indicating locations of the vehicle over time, by calculating from the GPS data the distance traveled over a period of time. Alternatively, and/or additionally, the speed of a vehicle may be obtained based on one or more sensors or imaging capturing devices installed off of a street the vehicle was passing by. A "pull-over" or stop event, in which a vehicle stops at a given location or "pulls over" to stop not in a road the vehicle was traveling but on a road shoulder, rest area, parking space, or other stopping point adjacent to the road, may be determined from an analysis of speed, acceleration, and/or location of the vehicle over time. Various data described above may be obtained from one or more sensors on board the vehicle and uploaded to a server for processing by, for example, a collision detection facility of the server.

In some embodiments, a potential collision at an instant during a vehicle's traveling time may be detected. In some examples, acceleration data in one or more axes may be used to detect the potential collision. For example, a potential collision may be detected in response to an abrupt increase in acceleration data or otherwise in response to an acceleration value that exceeds a threshold. The threshold may be an absolute threshold, such as a threshold indicating that the acceleration value by itself is above the threshold, or may be a relative threshold, such as that the acceleration value satisfies some condition with respect to one or more prior acceleration values, such as by being more than a threshold amount above one or more prior acceleration values. In response to obtaining information regarding a potential collision, data describing the vehicle during a time period before and/or after a time associated with the indication of the potential collision may be analyzed to determine a likelihood that the potential collision is a non-collision event. In some examples, a likelihood may be represented by a numeric value that stands for a probability that the potential collision is a non-collision event, e.g., 10%, 20%, 35%, etc. In other examples, a likelihood may be a binary indicator, e.g., collision or non-collision, or 0% and 100%. In other examples, a likelihood may be represented by multiple levels, e.g., "yes," "no," "most likely," "likely," "less likely," or "unlikely" etc. If the likelihood indicates that the potential collision is not a non-collision, then the system may trigger one or more actions responding to the potential collision.

Alternatively, and/or additionally, if the likelihood indicates that a potential collision is not a non-collision, then a classification process may be used to classify the data describing the vehicle, such as using a trained classifier. Performing such classifying following a separate determination of the likelihood that the potential collision is a non-collision event may aid in reducing a false detection rate and improve accuracy and reliability of collision detection and collision characterization. In some examples, based on the result of the classification, the data describing the vehicle into at least one of a plurality of classes, each class of the plurality of classes being associated whether the potential collision is a collision. For example, the data describing the vehicle being classified into a class that indicates that the potential collision is likely to be a collision. In response to that classification, the one or more actions may be triggered. Additionally, information characterizing the collision may also be obtained from the classification.

In some examples, the analysis of the data describing the vehicle during the time period to determine the likelihood that the potential is a non-collision event may be carried out by checking the data against sets of criteria/criterion that are each related to non-collision events. If, in connection with a potential collision, data describing the vehicle during the time period matches at least one criterion associated with a non-collision event, the system may determine that the potential collision was not a collision and instead was the non-collision event.

For example, the data describing the vehicle may be analyzed to determine whether a telematics monitor that provides at least a portion of the data is improperly operating such that unreliable data are obtained. This may be the case if a telematics monitor is improperly mounted in a vehicle, such that the telematics monitor moves during operation of the vehicle. If a series of acceleration values reported during the time period regarding a potential collision, or other data describing the vehicle matches at least one criterion associated with a loosely mounted telematics monitor, then a potential collision may be determined to be associated with a loosely-mounted telematics monitor rather than a collision. Such a criterion may be, for example, a pattern of acceleration values that is associated with a movement of a telematics monitor when loosely mounted. Such a criterion may be implemented as, for example, one or more rules to which the data describing the vehicle (e.g., acceleration data or other data) may be compared to determine whether the rule is met. In a case that the rule is met, the potential collision may be determined to be associated with the non-collision event (e.g., the loosely mounted telematics monitor).

As another example that may be implemented in some embodiments, data describing the vehicle may be analyzed in connection with road surface features to determine whether the vehicle is near a road surface feature (e.g., railway tracks or other road impediments) that is prone to causing acceleration values of the vehicle to be detected as acceleration events. In such a case, at least a criterion may be related to whether the vehicle traverses through a road surface feature that is prone to causing such acceleration values. The criterion may be implemented as, for example, one or more rules to which the data describing the vehicle may be compared. For example, a location of the vehicle at a time of an acceleration event may be used to determine whether the location of the vehicle matches a known road surface feature prone to causing the acceleration value of a vehicle traveling therethrough to be detected as an acceleration event. Examples of a match of the locations include a scenario when the closest distance between the location of the vehicle and the known road surface feature is less than a threshold distance. Additionally, acceleration data of the vehicle may be used to determine whether the acceleration data matches an expected acceleration that may result from a matched road surface feature. The determination of the match may be done in a variety of ways, such as by determining whether a set of acceleration values of the vehicle detected over time matches a known pattern of acceleration values that may be known to be caused by the road surface feature. If the acceleration data matches the acceleration expected of the road surface feature, then the criterion related to the road surface feature is determined to be met. Subsequently, the potential collision may be determined to be a non-collision event related to the road feature surface. This may be explained in that the acceleration event that may have resulted in the detection of the potential collision may be caused by the vehicle traversing the road surface feature prone to causing the acceleration event, rather than by a collision.

As another example that may be implemented in some embodiments, at least one criterion may be related to a driver's behavior around the time of the potential collision. The criterion related to driver's behavior may be implemented, for example, as one or more conditions to which the data describing the vehicle around the time of the potential collision may be compared. For example, data describing the vehicle may be analyzed to determine whether the driver's behavior around the time of the potential collision matches any behavior that may match to a non-collision. In some embodiments, frontal images/videos depicting the driver may be analyzed to determine whether the driver's head stays in a central area of the driver seat, and/or whether both of the driver's hands are holding the steering wheel. If one or both of these conditions are met, it may be determined that the potential collision is a non-collision. This may be because, if the potential collision were a collision, it may be unlikely that the driver's behavior would be unchanged from a "normal" behavior and that the driver's heads and/or hands would still be in the same position.

In some embodiments, if the driver's head departs from the central area of the driver seat, and/or at least one of the driver's hands is off the steering wheel, it may be determined that the driver experienced fatigue, or the driver was engaged in some other behavior that may cause distracted driving (e.g., operating a user interface such as texting, radio, navigation system etc.). If it is determined that the driver experienced fatigue or was distracted, then it may be determined the potential collision is likely a collision as the behavior of fatigue or distracted driving may be prone to causing a collision. Alternatively, and/or additionally, if the driver's behavior does not match any of the behavior prone to causing a collision, then it may be determined that the potential collision is likely a non-collision.

As another example that may be implemented in some embodiments, at least one criterion is related to a trip that is being made during the time of travel. Data describing the vehicle and/or additional information about the trip may be analyzed by correlating the data describing the vehicle with the trip information, to determine whether a trip criterion is met. For example, if a detected potential collision is near the beginning of a trip or near the end of a trip (either in time or distance), it may be determined whether a trip criterion related to a likelihood of collision is met. In response to the determination as to whether a trip criterion is met, it may be determined that the potential collision is likely a collision/non-collision event. In some embodiments, an event near the end of a trip (in time or distance) may likely be a collision, and thus, a trip criterion related to a likelihood of collision may be determined to have not been met. In some embodiments, an event that occurs at the beginning of a trip (e.g., soon after the beginning of the trip, in time or distance) may unlikely be a collision, and thus, the trip criterion may be determined to be met.

Alternatively, and/or additionally, other events, such as a door slam, when the vehicle is being loaded, and/or when the vehicle is being unloaded may be detected from the data about the vehicle obtained from the various sensors. For example, a door slam may be detected in response to readings from one or more sensors installed near the vehicle doors. In another example, a vehicle being loaded/unloaded may be detected in response to readings from one or more sensors installed near the vehicle's trunk lid or hatchback. Once these events are detected, it may be determined that the potential collision is likely a non-collision event.

In some embodiments, at least some of the one or more criteria related to non-collision events may each be related to a respective non-collision context around a potential collision. Based on the assessment of the one or more criteria each related to a respective non-collision context of the potential collision, the system may determine whether a potential collision is a non-collision. In some embodiments, metric values (e.g., scores) may be generated for each criterion, and the metric values of various criteria may be combined to generate an overall score, such as a collision score.

In some embodiments, each of the criteria related to a respective non-collision context of the potential collision may be implemented as, for example, one or more conditions each describing a scenario around the time and/or location of the potential collision and are related to the non-collision context. The one or more conditions may each generate a metric value (e.g., a score) indicative of the likelihood of collision or non-collision, if the condition is satisfied.

In some embodiments, a criterion related to a non-collision context may include one or more conditions related to vehicle "pull-over" or vehicle stop around a detected potential collision. For example, in response to determining a potential collision, the data describing the vehicle may be analyzed to assess whether the vehicle experienced a "pull-over" by determining whether the vehicle came to a stop within a certain amount of time and distance and/or stopped in an area outside of a travel lane for vehicles (e.g., side of a road, parking lot, etc.). If the vehicle came to a stop within the time and distance of an identified potential collision, then the likelihood that the potential collision is a non-collision may be low, as the stop may be more likely to be explainable by a driver stopping a vehicle following a collision. A pullover score may be calculated based on the number of stops the vehicle experienced within the time and distance, the speed of the vehicle, or the distance of the stop.

In some embodiments, a criterion related to a non-collision context may include one or more conditions related to vehicle speed reduction around the time of a detected potential collision. For example, in response to determining a potential collision, the data describing the vehicle may be analyzed to assess whether the vehicle experienced a speed reduction around the time of the potential collision. In some examples, the speed reduction may include a change of speed of the vehicle. The speed reduction may also include a change of speed ratio relative to the speed of the vehicle. Thus, a speed reduction score may be calculated based on the change of speed ratio. In such a case, a change of speed in a low-speed driving may result in a significant speed reduction score indicative of a speed reduction that is likely to cause a collision.

In some embodiments, a criterion related to a non-collision context may include one or more conditions related to vehicle's GPS data quality around the time of a detected potential collision. For example, in response to determining a potential collision, the data describing the vehicle may be analyzed to determine whether GPS data for the vehicle around the time of the potential collision is unreliable. One or more conditions associated with such determination of whether GPS data for the vehicle is unreliable may include, for example, a sudden drop of a number of GPS data points collected over time, a change in reception quality of GPS data over time (e.g., sudden drop in the number of available satellites, such as a drop without a corresponding detectable change in position), or other change. A low number of GPS points may be indicative of a potential collision. Thus, a GPS score may be calculated based on the number of GPS data points before, during, and/or after the potential collision, or on a comparison of such numbers of GPS data points, or on another analysis of GPS data quality over time.

In some embodiments, a criterion related to a non-collision context may include one or more conditions related acceleration context of the vehicle around the time of a detected potential collision. For example, in response to determining a potential collision, the data describing the vehicle may be analyzed to assess whether an acceleration context linked to collision existed around the time of the potential collision. In some examples, the acceleration context may be associated with a number of impacts that may be generated based on the acceleration data included in the data describing the vehicle. An acceleration context linked to collision may be determined based on the acceleration magnitude in the horizontal plane, the number of impacts within a time period and the speed of the vehicle. Thus, an acceleration context score may be calculated based on one or more of the acceleration magnitude, the number of impacts and the movement of the vehicle.

In some embodiments, a criterion related to a non-collision context may include one or more conditions related to road-type context of the vehicle around the time of a detected potential collision. In some examples, in response to determining a potential collision, the data describing the vehicle may be analyzed to determine whether the vehicle experienced a stop in a travel lane of a road, particular a stop at a location in the travel lane at which vehicles do not customarily stop. Some type of roads may not typically include vehicle stops in travel lanes. For example, vehicles typically do not suddenly stop in a travel lane of a highway. A decrease in speed followed by a stop in such a travel lane may be indicative of traffic, but a sudden stop may be more indicative of a collision. On other roads, such as roads with traffic lights, stop signs, or other traffic control features, cars may often stop at certain locations in a travel lane (e.g., at an intersection) but may not stop at other locations (e.g., not at intersections). As such, a vehicle experiencing a stop in a travel lane at a location that is not an intersection, including if the stop was associated with a sudden stop, may have been involved in a collision. A vehicle stop score may be calculated based on the type of the road the vehicle is traveling and the duration of vehicle stop, for example.

As described above, the various scores of one or more criteria may be combined to determine an overall metric value, e.g., a collision score that is indicative of the likelihood that the potential collision is a non-collision event. For example, the values for the one or more criteria, each related to a respective non-collision event or a respective non-collision context, may each be normalized in the range of [0,1], where "0" indicates unlikely to be an accident and "1" indicates likely to be an accident. The values from the various criteria may be combined in any suitable manner (e.g., multiplied together, added together, weighted average, or any suitable calculation with weighting, etc.) to generate the overall collision score. If the collision score is below a threshold, it may be determined the potential collision is likely a non-collision event. It is also appreciated that values from different criteria may be each assigned a different weight in the combination, where the weights of the scores may be obtained through training (e.g., machine learning) or using empirical data.

In some examples, the one or more conditions associated with a criterion may each be associated with an individual score depending on whether the condition is satisfied. In such a process, a score for a respective criterion of the one or more criteria may also be generated by combining the scores associated with the one or more conditions that are associated with the respective criterion. In some examples, the scores of one or more conditions associated with a criterion may be combined (e.g., multiplied, summed, weighted, etc.) to generate a score for the associated criterion. For example, the scores of the one or more conditions may be assigned such that the sum of these scores is in the normalized range of [0, 1].

The inventors recognized and appreciated that machine learning techniques may increase reliability of processing of accelerometer data to determine information about a potential collision. Accordingly, in response to determining that the potential collision is likely a non-collision event, the data describing the vehicle may be further analyzed, using a trained classifier, to determine whether the potential collision is likely to have been an actual collision. As disclosed in the present disclosure, the data describing the vehicle may be obtained from various telematics monitors during a time period extending before and/or after the time of the potential collision.

As discussed above, when analyzing a potential collision, a time period may be defined around the time of the potential collision. In some cases, a second potential collision may be detected within that time period. In some embodiments, the two potential collisions may be analyzed separately. In other embodiments, the second potential collision may be determined to be a part of the first potential collision, and the two potential collisions may be merged. With such a merge, the time period for the first potential collision may be extended to be an updated time period from before the first potential collision to after the second potential collision. With such a merge, for example, a second time period (e.g., of a same length as the first time period around the first potential collision) may be defined around the second potential collision and a combined time period may be determined that extends from a start of the first time period to an end of the second time period. Subsequent to the merging and determination of the updated/extended time period, data describing the vehicle may be obtained during the updated time period and used for the analysis disclosed herein. In a case that a third, fourth, or additional potential collisions are determined within the time period, additional extensions may be made.

While an example has been given of merging in response to detecting second or subsequent potential collisions occurring within (e.g., before the end of) an already-defined time period for analyzing a potential collision, embodiments are not so limited. A different time period may be defined for merging, in some embodiments. For example, if a second potential collision is identified within a threshold time of a first potential collision, merging may be performed, even if the second potential collision is not within the defined analysis time period for the first potential collision.

The various embodiments disclosed herein may be implemented in various configurations. In a non-limiting example, a system, such as a collision detection facility, may be configured to perform operations for detecting and outputting a collision score pertaining to a vehicle. The system may detect one or more potential collisions. For example, acceleration data indicating an acceleration value or values that satisfy a condition (e.g., a value that exceeds a threshold) may be used to detect a potential collision. The system may further filter the detected potential collisions, for example, by removing the false positives in the detected potential collision. Various criteria related to non-collision events, as described in the present disclosure, may be used to determine a likelihood that a potential collision is a non-collision event. If it is determined that the likelihood indicates that the potential collision is a non-collision event, such potential collision may be filtered out and thus removed from the list of potential collisions. Upon obtaining the updated potential collisions, the system may obtain data describing the vehicle for the updated potential collisions.

In some embodiments, for each potential collision of the updated potential collisions, a time period may be determined by extending from before the potential collision to after the potential collision. For each of the potential collisions, the system may determine a collision score indicative of the likelihood of that potential collision being a collision. Various embodiments of generating metric values for one or more criteria related to respective non-collision events are described in the present disclosure. Thus, the system may generate an overall metric value, e.g., a collision score. In some examples, the system may adjust the overall collision score based on whether the vehicle traversed a certain road surface feature at the time of the potential collision. For example, if, around the time of the potential collision, it is determined that the vehicle was traversing a road surface feature prone to causing acceleration values of vehicles traveling therethrough to be detected as acceleration events, the system may adjust the overall collision score by lowering the collision score (e.g., setting the collision score to 0) because the detection of the potential collision may likely be caused by the road surface feature the vehicle was traversing rather than a collision. Then, the system may output the collision score or display the collision score to a user.

The techniques described herein may provide advantages over conventional systems in improving the performance of collision detection, e.g., reducing the false positive or false negative rate. For example, by determining the likelihood that a potential collision is a non-collision event, and by using data describing the vehicle in a time period extending from before and/or after the time of the potential collision, more data will be used to reliably decrease the number of false positives in collision detection. Further, various data describing the vehicle around the potential collision may be combined in a quantitative manner, e.g., in the form of a collision score, to determine a likelihood of a potential collision being an actual collision or a non-collision. If the collision score is below a threshold, the potential collision may be determined to be a non-collision, which can result in reduced false positives. In such case, the data describing the vehicle or contextual information have all been considered to further improve the performance of collision detection.

In addition, once a determination of the potential collision is analyzed using the various methods described herein and the likelihood that the potential collision is a non-collision indicates that the potential collision is not a non-collision, a portion or a whole of the data describing the vehicle may further be provided to a classifier to determine whether the potential collision is likely to have been actual collision. The application of rules in analyzing the data describing the vehicle to determine whether a potential collision is an actual collision provides advantages in filtering the false positive detection of potential collision and may remove or reduce the need to have such potential collisions analyzed by the classifier. Reducing the number of non-collision events analyzed by the classifier may, in turn, improve the reliability of the classifier and accuracy of collision detection and/or classification. These various techniques, such as the time period that extends surrounding the potential collision, data combination in determining whether a potential collision is likely a non-collision event, and further using the classifier to determine a likelihood of a potential collision being an actual collision, may improve accuracy of collision detection and/or characterization.

Described below are illustrative embodiments of approaches for obtaining and analyzing vehicle information to reliably determine whether a vehicle has experienced a collision and/or one or more characteristics of such a collision. It should be appreciated, however, that the embodiments described below are merely exemplary and that other embodiments are not limited to operating in accordance with the embodiments described below.

FIG. 1 illustrates a computer system with which some embodiments may operate. For example, FIG. 1 includes an organization 100 that may operate a fleet 102 of vehicles. The organization 100 may be a commercial enterprise, a government or government agency, a not-for-profit organization, or a non-profit organization, or any other organization. Embodiments are not limited to operating with any particular form of organization, or with formal or informal organizations. Illustrative examples of such an organization include a commercial service that delivers goods and/or services to customers' homes or businesses, a business that rents vehicles, a municipality that operates vehicles within the municipality (e.g., vehicles to perform public works projects, public safety vehicles like police cars, fire trucks, and ambulances, etc.). The vehicles of the fleet 102 may be operated by employees and/or contractors of the organization 100, or by others (e.g., customers of a rental car agency may drive the cars).

The organization 100 may want to be notified promptly when any of the vehicles of the fleet 102 are involved in a collision. The organization 100 may wish to respond to such a collision by determining whether the driver (e.g., the employee or contractor) or any other person was injured. The organization 100 may also wish to respond to a collision by determining whether the vehicle is still safe to operate, or has been damaged to the point that it should not be operated and another vehicle should be sent to act in the place of the damaged vehicle (e.g., by taking on deliveries that the damaged vehicle was to have made, or otherwise providing service the damaged vehicle was to be operated to perform). Such information might be inferred or determined from an indication of the severity of a collision. More severe collisions may be more likely than less severe collisions to result in injuries or result in vehicles that can no longer be safely operated. Accordingly, if the severity of a collision could be determined, the organization 100 may also be able to estimate whether anyone was injured or whether the vehicle can still be safely operated.

The organization 100 may also want to know, when a collision has occurred, the likelihood that it will incur liability for the collision. Fault for different collisions falls with different parties, and the fault may be inferred from a manner in which two vehicles collided. The angle at which a vehicle in the fleet 102 struck or was struck by another object (e.g., another vehicle or obstacle) may thus be indicative of who is at fault for the collision, and may be indicative of whether the organization 100 will incur liability. For example, if a vehicle in the fleet 102 is hit from behind by another vehicle, it may be less likely that the driver of the vehicle in the fleet 102 is at fault and less likely that the organization 100 will incur liability. If the vehicle in the fleet 102 hits another vehicle with its front end, though, it may be more likely the driver of the vehicle in the fleet 102 is at fault and more likely that the organization 100 will incur liability. Accordingly, if an angle of impact information can be determined for a vehicle involved in a collision, the organization 100 may be more effectively able to determine who may be at fault and whether it is likely to incur liability.

FIG. 1 also illustrates a collision between two vehicles 104, 106, in which vehicle 104 is being struck from behind by vehicle 106. In this example, the vehicle 104 is a member of the fleet 102. Techniques described herein may be used to obtain data describing the vehicle 104 (e.g., movement information) and/or additional data describing the driver of the vehicle that may be analyzed to determine whether a collision occurred and to characterize the collision, including by determining a severity of the collision and/or angle of impact on vehicle 104.

In some embodiments, each of the vehicles 104, 106 may be respectively equipped with a telematics monitor 104A, 106A. The telematics monitor 104A, 106A may include a three-axis accelerometer that indicates acceleration of the device over time, which may be indicative of acceleration of the associated vehicle over time. The telematics monitor 104A and the telematics monitor 106A may each be equipped to produce an accelerometer value at a set interval, such as multiple times per second (e.g., 100 times per second), once per second, or at another suitable interval. In some embodiments, the telematics monitors 104A, 106A may also be equipped to obtain information from one of the associated vehicles. For example, a telematics monitor 104A, 106A may be equipped to connect to an OBD port of an associated vehicle and obtain information from an ECU or OBD system of the vehicle. Such information may include fault messages generated by the ECU or OBD system, or messages indicating a state of components of the vehicle, such as messages indicating whether an airbag has deployed.

A collision detection facility may be implemented as executable instructions and may analyze information generated or obtained by a telematics monitor 104A, 106A. The collision detection facility may analyze the information to determine whether a vehicle associated with the telematics monitor 104A or 106A has experienced a collision and, if so, determine one or more characteristics of the collision (e.g., severity, angle of impact).

In some embodiments, the collision detection facility may be implemented in (e.g., stored by and executed by) the telematics monitor 104A, to make such determinations about vehicle 104. In other embodiments, the collision detection facility may be implemented by another device of the vehicle 104, such as a computing device integrated with the vehicle 104 (e.g., the ECU, or a computer of the OBD system), or a computing device disposed in a passenger cabin of the vehicle 104. Such a computing device disposed in the passenger cabin may be a mobile device (e.g., smart phone, tablet, etc.) or personal computer (e.g., laptop computer), or other suitable device. In other embodiments, the collision detection facility may be implemented remote from the vehicle 104. In the embodiment of FIG. 1, for example, the collision detection facility may be implemented in one or more servers, such as the server 108 located remote from the vehicle 104. For example, the server 108 may be one or more servers operated by a vendor of the telematics monitor 104A, one or more servers operated by the organization 100, operated by a cloud computing platform, or other servers.

In still other embodiments, operations of the collision detection facility described herein may not be implemented wholly in one location or another, but may be split in any suitable manner. As one such example, operations of a collision detection facility to determine whether a collision has occurred may be implemented within the telematics monitor 104A or otherwise local to the vehicle 104, whereas operations to characterize a collision, once it is determined that a collision is likely to have occurred, may be implemented remote from the vehicle 104 in the server 108.

Regardless of where it is implemented, in accordance with some techniques described herein, the collision detection facility of the example of FIG. 1 may detect one or more potential collisions of a vehicle based on the data obtained from one or more telematics monitors. For example, the collision detection facility may detect a potential collision in response to determining an acceleration event indicative of an abrupt increase in the vehicle's acceleration. The collision detection facility may determine a time period around the detected potential collision, for example, extending before and after the potential collision. The collision detection facility may obtain data describing the vehicle during the time period around the potential collision. The collision detection facility may further determine a likelihood that the potential collision is a non-collision.

In some examples, a likelihood may be represented by a numeric value that stands for a probability that the potential collision is a non-collision event, e.g., 10%, 20%, 35%, etc. In other examples, a likelihood may be a binary indicator, e.g., collision or non-collision, or 0% and 100%. In other examples, a likelihood may be represented by multiple values, e.g., "collision," "likely collision," "most likely collision," "likely non-collision," "most likely non-collision," or "non-collision."

If it is determined that the likelihood indicates that the potential collision is a non-collision, the collision detection facility may determine that there is no actual collision. The facility may subsequently display or output the result to a user (or, in some cases, may not display or output the result, if the result is that the potential collision was not a collision or otherwise that there was no collision).

In some embodiments, if it is determined that the likelihood indicates that the potential collision is not a non-collision, the collision detection facility may make use of a trained classifier to further determine whether a collision has occurred and/or to characterize the collision. The trained classifier may have information associated with each of the classes with which it is configured, illustrated in FIG. 1 as datastore 108A. That information may be used by the trained classifier to analyze information about the vehicle 104 obtained by the telematics monitor 104A, including movement data or other data, and determine a class that best matches the obtained data.

Each of the classes may be associated with whether or not a collision has occurred and/or, if a collision has occurred, one or more characteristics associated with the collision. For example, classes may be associated with a binary decision of whether a collision occurred or did not occur. As another example, classes may be associated with different levels of likelihood that a collision occurred. As a further example, classes may be additionally or alternatively associated with one or more characteristics of a collision, such as a severity of a collision, different levels of severity of a collision, different angles of impact, or other characteristics of a collision.

In embodiments in which the collision detection facility is implemented remote from the telematics monitor 104A, the telematics monitor 104A may communicate obtained data to the collision detection facility. The telematics monitor 104A may include communication components, such as one or more wireless transceivers. The wireless transceiver(s) may include, for example, components for communicating via a Wireless Wide Area Network (WWAN), such as via a cellular protocol such as the General Packet Radio Service (GPRS), Universal Mobile Telecommunications Service (UMTS), Enhanced Data Rates for GSM Evolution (EDGE), Long-Term Evolution (LTE), or other suitable protocol. In some such embodiments, the telematics monitor 104A may directly communicate with one or more networks outside the vehicle 104 to communicate data to the collision detection facility. In other embodiments, the telematics monitor 104A may communicate to such networks via another device that is disposed in the vehicle 104. For example, the vehicle 104 may include communication components for communicating via a WWAN and the telematics monitor 104A may communicate to the vehicle 104 to request that data obtained by the telematics monitor 104A be sent to the collision detection facility. As an example of such an embodiment, the telematics monitor 104A may include components to communicate via a Controller Area Network (CAN) of the vehicle 104 and request that obtained data be transmitted from the vehicle 104. In still other embodiments, the telematics monitor 104A may communicate via a mobile device local to the vehicle 104, such as a mobile device operated by a driver of the vehicle 104. The mobile device may be, for example, a smartphone or tablet computer. In such an embodiment, the telematics monitor 104A may communicate with the mobile device via a Wireless Local Area Network (WLAN) or Wireless Personal Area Network (WPAN), such as any of the IEEE 802.11 protocols or any of the Bluetooth® protocols, to request that obtained data be sent to the collision detection facility.

Together with obtained data describing the vehicle or other information, the telematics monitor 104A may transmit to the collision detection facility one or more identifiers for the vehicle 104 and/or for the telematics monitor 104A, to indicate that the transmitted data relates to the vehicle 104. Embodiments are not limited to operating with a particular form of identifier. In some embodiments, a Vehicle Identification Number (VIN), a license plate number, or other identifier may be used. The collision detection facility may receive this information from a telematics monitor, which may be configured with this information, such as by receiving the information as input when the telematics monitor is installed in the vehicle 104. The collision detection facility may also receive this information when the collision detection facility is executing on a computing device integrated with the vehicle 104 (in which case the facility may obtain the identifier from memory), or when the facility receives data from or via the vehicle 104, in which case one or more components of the vehicle may add the identifier to the information that is sent.

In some embodiments, an identifier or contact information for a driver of the vehicle 104 may be obtained and transmitted. For example, a phone number that may be used to contact the driver of the vehicle 104 may be sent. This may be sent in embodiments in which the collision detection facility is executing or, or receives data from or via, a mobile device of the driver, in which case the mobile device may send data from the telematics monitor 104A together with the phone number. In other embodiments, a driver of the vehicle 104 may "log in" to the telematics monitor 104A or otherwise configure the telematics monitor 104A when first operating the vehicle 104, and as part of that configuration may provide an identifier and/or phone number for the driver.

In some embodiments, location data for the vehicle 104 may also be sent to the collision detection facility. For example, the telematics monitor 104A may include Global Positioning System (GPS) hardware to determine a location of the telematics monitor 104A, or the telematics monitor 104A may obtain from vehicle 104 information describing a location of the vehicle 104. The telematics monitor 104A may also transmit this location information to the collision detection facility.

The collision detection facility, upon analyzing the data and determining one or more classes that likely describe the potential collision, may report the potential collision to the organization 100. For example, the collision detection facility may communicate to one or more servers, such as the server 110 associated with the organization 100. The server 110 may be associated with a call center or other employee or group of employees tasked with reviewing and potentially responding to collisions or potential collisions. The server 110 may thus be operated by the organization 100 and/or by a service provider that the organization 100 has engaged to monitor and respond to collisions or potential collisions.

The collision detection facility may provide various information to the organization 100 when reporting a collision or potential collision. For example, if the collision detection facility determines one or more characteristics of the potential collision, such as a severity and/or angle of impact for the collision, the characteristic(s) may be sent to the organization 100. In some cases, some of the data obtained by the telematics monitor 104A and sent to the collision detection facility may be sent. For example, if data was obtained from vehicle 104, such as information indicating whether an airbag was deployed, this information may be sent to the organization 100. The identifier for the vehicle 104 and/or the telematics monitor 104A may be transmitted, so the organization 100 can identify a vehicle to which the report relates. In embodiments in which the collision detection facility receives an identifier or contact information for a driver, the identifier or contact information may also be sent. In embodiments in which location information for the vehicle 104 is received by the collision detection facility, the location information may also be sent to the organization 100.

Upon receipt of a report of a collision or potential collision at the organization 100, the organization 100 may determine whether and how to respond. The response of the organization 100 may be manual and/or automatic, as embodiments are not limited in this respect. In embodiments in which the response of the organization 100 is at least partially automatic, the automatic response may be generated using rules that evaluate information received from the collision detection facility. For example, if a report from a collision detection facility indicates that the vehicle 104 is likely to have experienced a severe collision, and the report includes location information, this information may satisfy conditions associated with triggering dispatch of emergency services to the location, and the server 110 may trigger that dispatch without human intervention, such as by sending location information and/or identifying information to the dispatcher. In other cases, though, a person may review the report from the collision detection facility and determine how to respond. The person may respond by attempting to contact a driver of vehicle 104, such as using received contact information for the driver, to inquire as to the health or safety of the driver or others. The person may also contact emergency services and/or roadside assistance services in an area in which the vehicle 104 is located, to request dispatch of emergency services or roadside assistance to the vehicle 104 using the location information and/or identifying or contact information.

Automatically and/or manually carrying out these or other responses may, in some embodiments, include communicating with one or more computing devices 112 associated with one or more service providers, such as emergency services or roadside services.

Communications in the computer system of FIG. 1 may be carried out using one or more wireless and/or wired networks, including the Internet, generally depicted in FIG. 1 as communication network(s) 114. It should be appreciated that the communication network(s) may include any suitable combination of networks operating with any suitable communication media, as embodiments are not limited in this respect.

FIG. 1 illustrated examples of components of a computer system with which some embodiments may operate. Described below in connection with FIGS. 2-13E are examples of implementations of a collision detection facility, including techniques for determining a likelihood that a potential collision is a non-collision event, using a classifier to determine a likelihood that a potential collision has been an actual collision, and training a collision detection facility. These embodiments may operate with a computer system like the one shown in FIG. 1, or with another form of computer system.

Figure 2A:
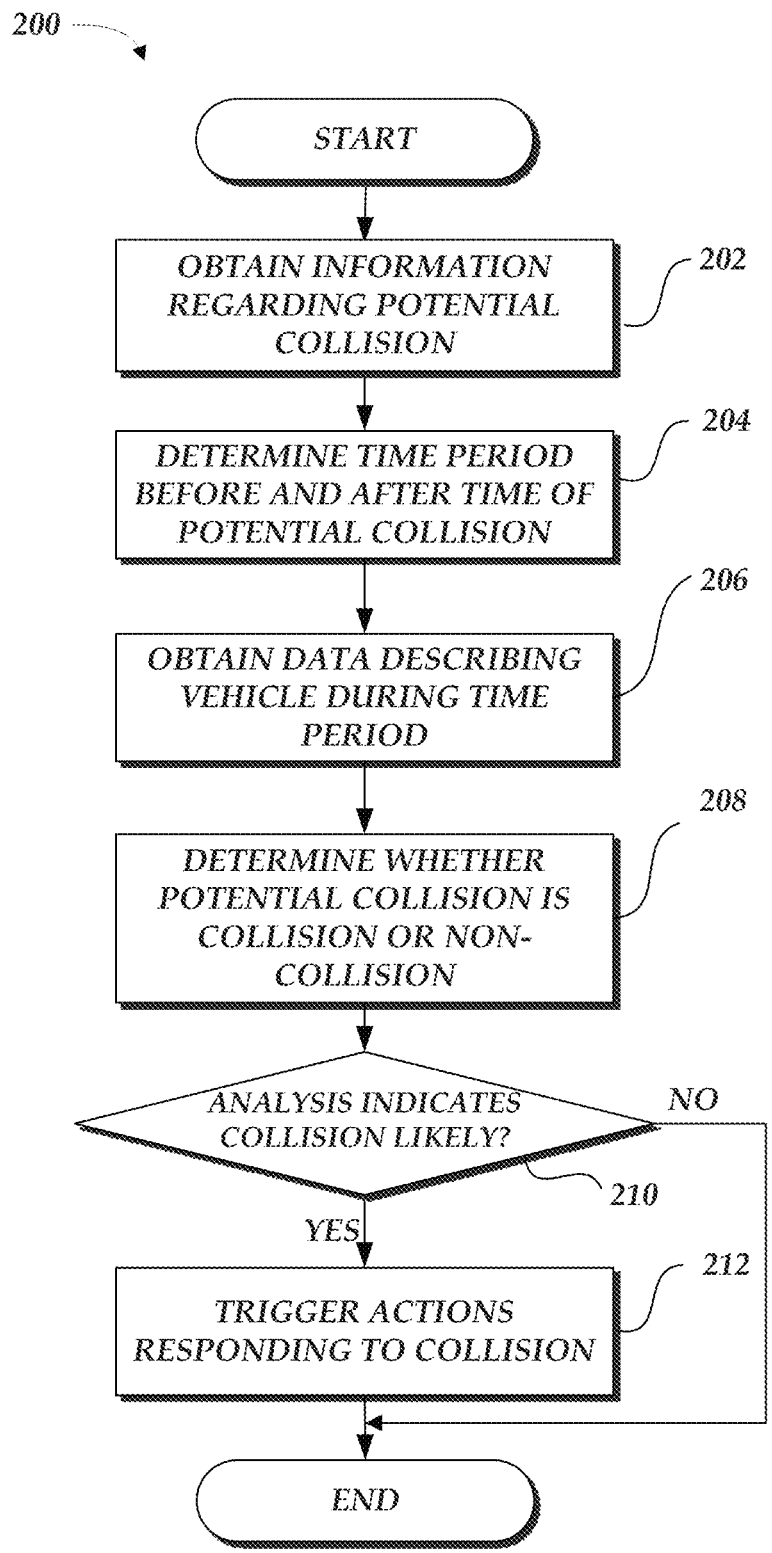
FIGS. 2A-2B illustrate flowcharts of example processes that may be implemented in some embodiments to characterize a collision.
Figure 2B:
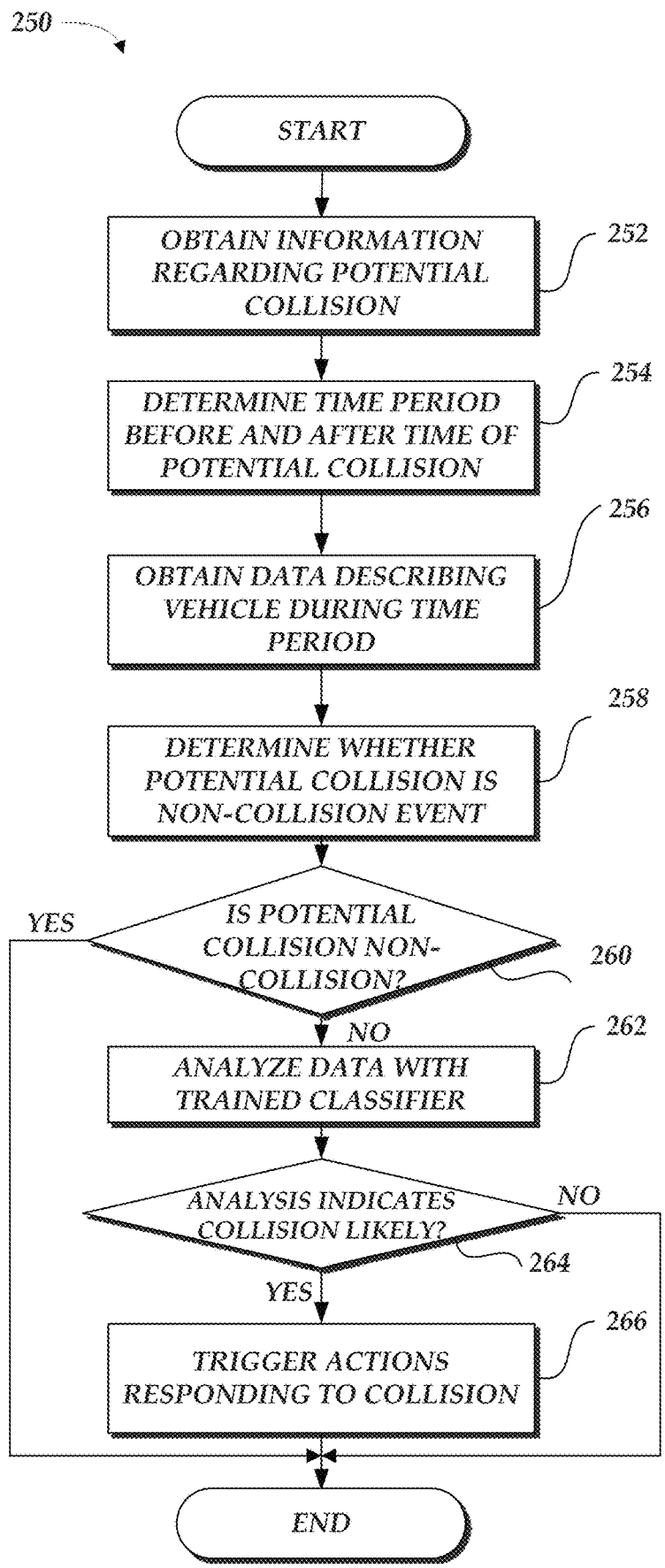

FIGS. 2A-2B illustrate flowcharts of example processes that may be implemented in some embodiments to characterize a collision. The processes 200/250 of FIGS. 2A-2B may be implemented in some embodiments by a collision detection facility. For example, the process 200/250 may be implemented locally on a vehicle (e.g., in a telematics monitor of FIG. 1) and/or remote from a vehicle. In some embodiments, for example, part of the process 200 of FIG. 2 may be implemented local to a vehicle, such as operations of blocks 202-208 of the process 200, while another part of the process 200 may be implemented from a vehicle, such as operations of blocks 210-212.

In some embodiments, in FIG. 2A, process 200 may begin with the collision detection facility obtaining information regarding a potential collision at block 202. In some examples, block 202 may include the collision detection facility detecting a potential collision at an instant during a vehicle's traveling time. Acceleration data in one or more axes may be used to detect the potential collision. For example, the facility may obtain, e.g., from the vehicle, acceleration data including acceleration values for the vehicle at one or more times and the facility may detect a potential collision in response to identifying that the acceleration value(s) indicate that the vehicle has experienced at least one acceleration that meets at least one criterion. In some examples, the at least one criterion may include whether the acceleration of the vehicle at the instant time has a value larger than a threshold, such as 1.0 g, 1.5 g, 2.5 g, or other suitable threshold. Thus, in response to determining that the acceleration of the vehicle exceeded a threshold, the facility may detect a potential collision.

In some embodiments, process 200 continues with the facility determining a time period around the detected potential collision, at block 204. For example, the time period may extend before and/or after a time associated with the indication of the potential collision. In a non-limiting example, 15 seconds after the potential collision and 15 seconds before the potential collision may be used. The process 200 may further include the collision detection facility obtaining data describing the vehicle during the time period at block 206. Examples of data describing the vehicle are described in the present disclosure, and the facility may obtain these data from various sources, such as from telematics monitors on board the vehicle, or from one or more servers (e.g., the cloud) through a communication network.

Process 200 may also include the collision detection facility analyzing the data describing the vehicle during the time period of the detected potential collision to determine whether the detected potential collision may be a collision or a non-collision, at block 208. In some examples, the analysis of the data describing the vehicle during the time period to determine whether the potential collision is a non-collision may be carried out by checking the data against sets of criteria/criterion that are each related to non-collision events. If, in connection with a potential collision, data describing the vehicle during the time period matches at least one criterion associated with a non-collision event, the system may determine that the potential collision was not a collision and instead was the non-collision event. The description of criteria for determining a likelihood that a potential collision is a non-collision event are further described in detail with reference to FIGS. 3-4.

The collision detection facility may check whether the likelihood from block 208 indicates that the potential collision is a non-collision, at block 210. If the analysis from block 208 indicates that the potential collision is not a non-collision event, the process 200 may proceed to the collision detection facility triggering one or more actions responding to the potential collision at block 212. The trigger actions responding to the collision may include notifying an operator of a fleet of vehicles of which the vehicle is a member, notifying roadside assistance, notifying emergency services, attempting to contact a driver of the vehicle, or other actions.

Once the actions are triggered, or, if the likelihood from block 208 indicates that the potential collision is a non-collision event, the process 200 may end, or continue monitoring in block 202, with either monitoring the vehicle that experienced the collision or monitoring other vehicles.

In some embodiments, the likelihood determined from block 208 may be a binary indicator that indicates whether the potential collision is a collision, or is a non-collision event. In other embodiments, the result from block 208 may be a metric, e.g., a value indicating a probability that the potential collision is a collision or non-collision event. In such a process, the facility, at block 210, may determine that the likelihood indicates that the potential collision is likely a collision if the result from block 208 satisfies one or more criteria, such as whether the result exceeds a threshold value. In another example, if the likelihood determined from block 208 is represented by a binary value (e.g., "collision"/"non-collision"), then the facility at block 210 may determine whether the potential collision is a collision or a non-collision event based on the result from block 208. In other examples, the likelihood determined from block 208 may have multiple values, e.g., "collision," "most likely collision," "likely collision," "likely non-collision," "most likely non-collision," or "non-collision."

Process 250 depicted in FIG. 2B has similarities to process 200 in FIG. 2A, and includes use of a trained classifier to further determine whether a potential collision is a collision. With references to FIGS. 2A and 2B, blocks 252-258 may be performed by a collision detection facility in a manner similar to blocks 202-208, respectively. For ease of description, the descriptions of these blocks will not be repeated.

With reference to FIG. 2B, at block 260 the collision detection facility may check the result from block 258. If the result from block 258 indicates that the potential collision is a non-collision event, then process 250 may proceed to end, or the facility continuing monitoring in block 252, with either monitoring the vehicle that experienced the collision or monitoring other vehicles.

If, however, the result from block 258 indicates that the potential collision is not a non-collision at block 260, the facility may proceed to block 262 to analyze the data describing the vehicle with a trained classifier. Examples of such a trained classifier and the training thereof are described in detail in FIGS. 10-13E.

Based on the result of the classification at block 262, the data describing the vehicle may be classified into at least one of a plurality of classes, each class of the plurality of classes being associated with whether the potential collision is a collision. For example, the data describing the vehicle may be classified into a class indicative that the potential collision is likely to be a collision, or that the potential collision is likely to be a non-collision. Thus, at block 264, the facility may check the classification result. If the classification result indicates that the potential collision is likely a collision, then process 250 may proceed to the collision detection facility triggering actions responding to the collision at block 266, which may be performed in a manner similar to block 212 (FIG. 2A). If the classification result indicates that the potential collision is likely a non-collision, process 250 may proceed to end, or continue monitoring in block 252, with either monitoring the vehicle that experienced the collision or monitoring other vehicles.

As shown in FIG. 2B, performing such classification at block 262 following a separate determination of whether a potential collision may be a collision or non-collision event at block 258 may aid in reducing false positives before providing data to the trained classifier. The false positives may be reduced by filtering out in block 258 such non-collision events that could trigger potential false positives, prior to provision of event data to the classifier. Such techniques may improve the accuracy and reliability of collision detection and collision characterization.

Figure 3:
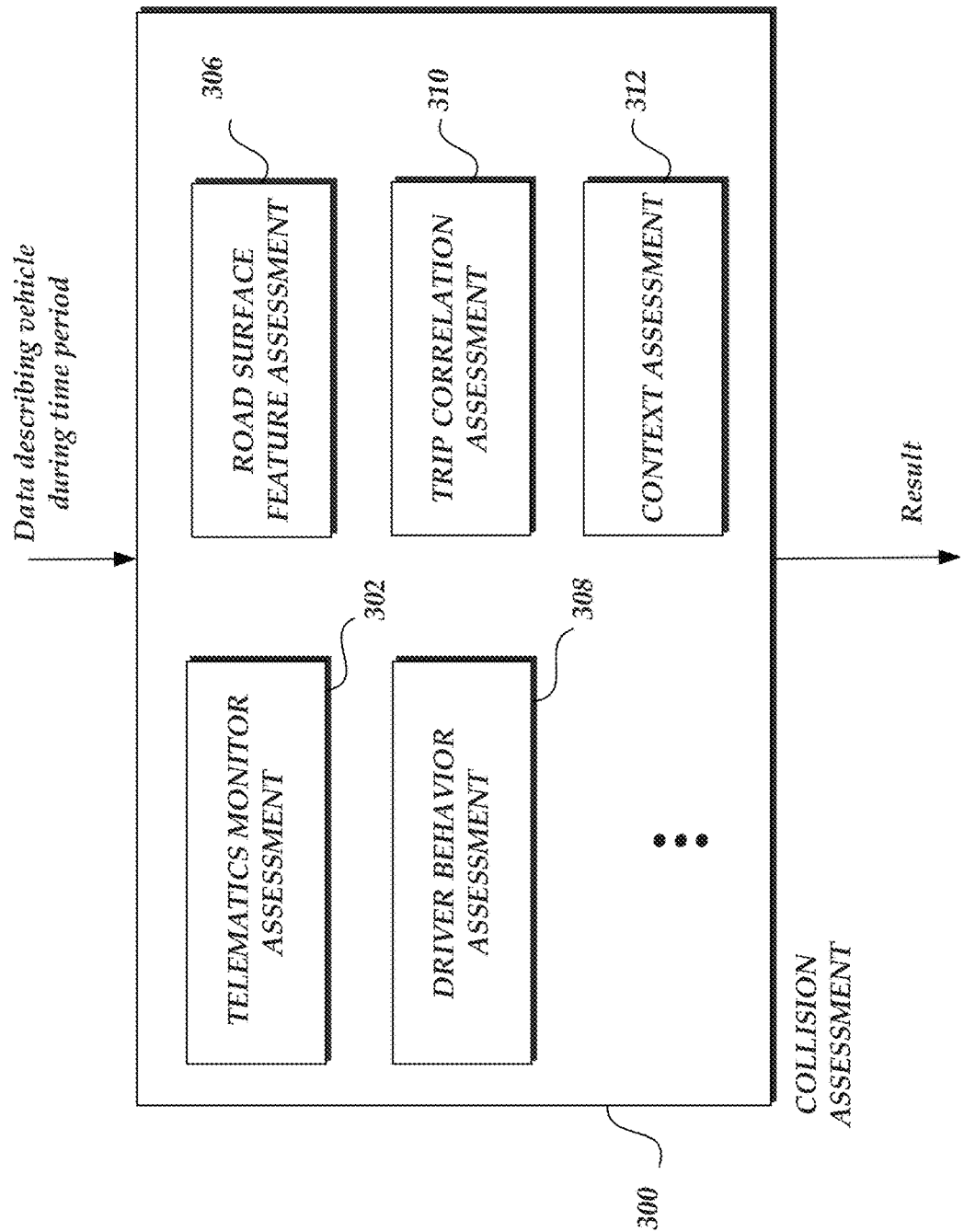
FIG. 3 is a schematic diagram of example operations that may be implemented in some embodiments to characterize a collision.

FIG. 3 is a schematic diagram of operations that may be implemented in some embodiments to characterize a collision. A collision assessment operation of block 300 may be implemented by the collision detection facility (FIG. 1), including in some embodiments in block 208 of the process 200 of FIG. 2A and/or in block 258 of the process 250 of FIG. 2B. In some embodiments, the collision assessment operation of block 300 may include multiple operations, such as telematics monitor assessment at block 302, road surface feature assessment operation at block 306, driver behavior assessment operation at block 308, trip correlation assessment operation at block 310, and/or context assessment operation at block 312.

By carrying out one or more of these operations of blocks 302-312, a collision detection facility may analyze data describing the vehicle during a time period of a detected potential collision and generate a result that indicates whether the potential collision has been determined to be a collision event and/or a non-collision event. The operations of analyzing the data describing the vehicle during the time period to determine whether the potential collision is a non-collision event may be carried out by checking the data against sets of criteria/criterion that are each related to non-collision events. If, in connection with a potential collision, data describing the vehicle during the time period matches at least one criterion associated with a non-collision event, the collision detection facility may determine that the potential collision was not a collision and instead was a non-collision event.

In some embodiments, the telematics monitor assessment operation at block 302 may be implemented by the collision detection facility to analyze the data describing the vehicle to determine whether a telematics monitor that provides at least a portion of the data is improperly operating such that unreliable data were obtained. This may include a case when a telematics monitor is improperly mounted in a vehicle, such that the telematics monitor moves during operation of the vehicle. If a series of acceleration values reported during the time period regarding a potential collision, or other data describing the vehicle, matches at least one criterion associated with a loosely mounted telematics monitor, then a potential collision may be determined to be associated with a loosely-mounted telematics monitor rather than a collision. Such a criterion may be, for example, a pattern of acceleration values that is associated with or otherwise produced by a movement of a telematics monitor when loosely mounted. Such a criterion may be implemented as, for example, one or more rules to which the data describing the vehicle (e.g., acceleration data or other data) may be compared to determine whether the rule is met. In a case that the rule is met, the potential collision may be determined to be associated with the non-collision event (e.g., the loosely mounted telematics monitor).

In a non-limiting example, the pattern of acceleration values that is associated with an improperly operating telematics monitor may include the number of triggers (e.g., acceleration triggers) the telematics monitor has generated during a time length. The inventors have recognized and appreciated that a defective (e.g., loosely mounted) accelerometer may often generate too many triggers, accordingly, whether the telematics monitor is operating improperly may be determined based on the number of triggers the telematics monitor has generated during the time length. For example, a number of triggers an accelerometer has generated in the past four weeks and/or a daily maximum number of triggers may be determined. If the daily maximum exceeds a threshold (e.g., 6 triggers or other suitable number of triggers), the telematic monitor may be determined to be operating improperly. Similarly, if the number of triggers in the past four weeks exceeds a threshold (e.g., 70 triggers or other suitable number of triggers), the telematic monitor may be determined to be operating improperly.

As another example that may be implemented in some embodiments, the road surface feature assessment operation at block 306 may be implemented by a collision detection facility to analyze the data describing the vehicle in connection with road surface features (e.g., railway tracks or other road impediments) to determine whether the vehicle is near a road surface feature that is prone to causing acceleration values of vehicles traveling therethrough to be detected as acceleration events. In such a case, at least a criterion may be related to whether the vehicle traverses through a road surface feature that is prone to causing acceleration events. The criterion may be implemented as, for example, one or more rules to which the data describing the vehicle may be compared. For example, a location of the vehicle may be used to determine whether the location of the vehicle matches a known road surface feature prone to causing acceleration events. Examples of a match of the locations include a scenario when the closest distance between the location of the vehicle and the known road surface feature is less than a threshold distance.

Additionally, acceleration data of the vehicle may be used by the collision detection facility to determine whether the acceleration data for the vehicle during the time period matches an acceleration signal that would be produced by the vehicle striking the road surface feature at the location of the vehicle at the time of the potential collision. If the acceleration data for the vehicle matches an acceleration signal associated with the road surface feature at the location of the vehicle, then it may be determined that the vehicle was traversing the road surface feature around the time of the potential collision. In such a case, the criterion related to the road surface feature is determined to be met. Subsequently, the potential collision may be determined to be a non-collision event related to the road feature surface. This may be explained in that the acceleration event that may have resulted in the detection of the potential collision may be caused by the vehicle traversing the road surface feature prone to causing acceleration events, rather than by an actual collision.

As another example that may be implemented in some embodiments, the driver behavior assessment operation depicted as block 308 may be implemented by a collision detection facility to evaluate at least one criterion related to a driver's behavior around the time of the potential collision. The criterion related to driver's behavior may be implemented, for example, as one or more conditions to which the data describing the vehicle around the time of the potential collision may be compared. For example, data describing the vehicle may be analyzed to determine whether the driver's behavior around the time of the potential collision matches any behavior that matches a non-collision event. In some embodiments, frontal images/videos depicting the driver may be analyzed to determine whether the driver's head stays in a central area of the driver seat, and/or whether both of the driver's hands are holding the steering wheel. If one or both of these conditions are met, it may be determined that the potential collision is a non-collision.

In some embodiments, if the driver's head departs from the central area of the driver seat, and/or at least one of the driver's hands is off the steering wheel, it may be determined that the driver experienced fatigue, or the driver was engaged in some other behavior that may cause distracted driving (e.g., operating a user interface such as texting, radio, navigation system etc.), or that the driver has moved (or been moved) to a different position because of a collision. If it is determined that the driver experienced fatigue or was distracted, or has otherwise moved to a different position, then a likelihood may be generated to indicate that the potential collision is not a non-collision as the behavior of fatigue or distracted driving may be prone to causing a collision. Or, if the driver has moved to a different position after the time of a potential collision, it may be determined that the potential collision is not a non-collision because the position change may result from a collision. Alternatively, and/or additionally, if the driver's behavior does not match any of the behavior that is prone to causing or may result from a collision, then it may be determined that the potential collision is likely a non-collision.

In some embodiments, the time period for obtaining data describing the vehicle and the time period for obtaining data describing the driver may be different. For example, the time period for obtaining data describing the vehicle may be 15 seconds before and after a potential collision. In comparison, the time period for obtaining the driver's behavior may be longer than the time period for obtaining the data describing the vehicle, e.g., 15 minutes before and after a potential collision.

As another example that may be implemented in some embodiments, the trip correlation assessment operation of block 310 may be implemented by a collision detection facility to determine at least a criterion related to trip being made during the time of travel. Data describing the vehicle and/or additional information about the trip may be analyzed by correlating the data describing the vehicle with the trip information, to determine whether a trip-related criterion is met. For example, if a detected potential collision is near the beginning of a trip (either in time or distance) in which the vehicle is making, it may be determined that a trip criterion related to a likelihood of collision is not met. In another example, if a detected potential collision is near the end of a trip (either in time or distance) in which the vehicle is making, it may be determined that the trip criterion is met. In response to the determination as to whether the trip-related criterion is met, the potential collision may be determined to be a collision/non-collision event. In the above example, if a potential collision is detected within a time threshold or within a distance threshold since the beginning of a trip in which the vehicle is making, it may be determined the potential collision is likely a non-collision event. Conversely, if a potential collision is detected within a time threshold or within a distance threshold before the end of the trip in which the vehicle is making, it may be determined the potential collision is likely a collision event.

In some embodiments, the beginning and end of a trip may be obtained through post-processing of vehicle position data. For example, a time and/or location of the vehicle may be determined to be the end of a trip when the vehicle stops at the location for more than a threshold amount of time such that it appears the driver has reached a destination. In another example, subsequent to an extended stop (e.g., a few hours or overnight), a time and/or location of the vehicle may be determined to be the beginning of a trip when the vehicle starts moving.

As another example that may be implemented in some embodiments, the context assessment operation of block 312 may be implemented by a collision detection facility to determine at least some of the one or more criteria related to collision/non-collision events may each be related to a respective collision/non-collision context of a potential collision. Based on the assessment of the one or more criteria, the system may determine whether a potential collision is a non-collision. In some embodiments, a metric (e.g., scores) may be generated by the collision detection facility for each criterion, and the metric values of various criteria may be combined by the collision detection facility to generate an overall score, such as a collision score. The context assessment operation is further described in detail in FIG. 4.

Figure 4:
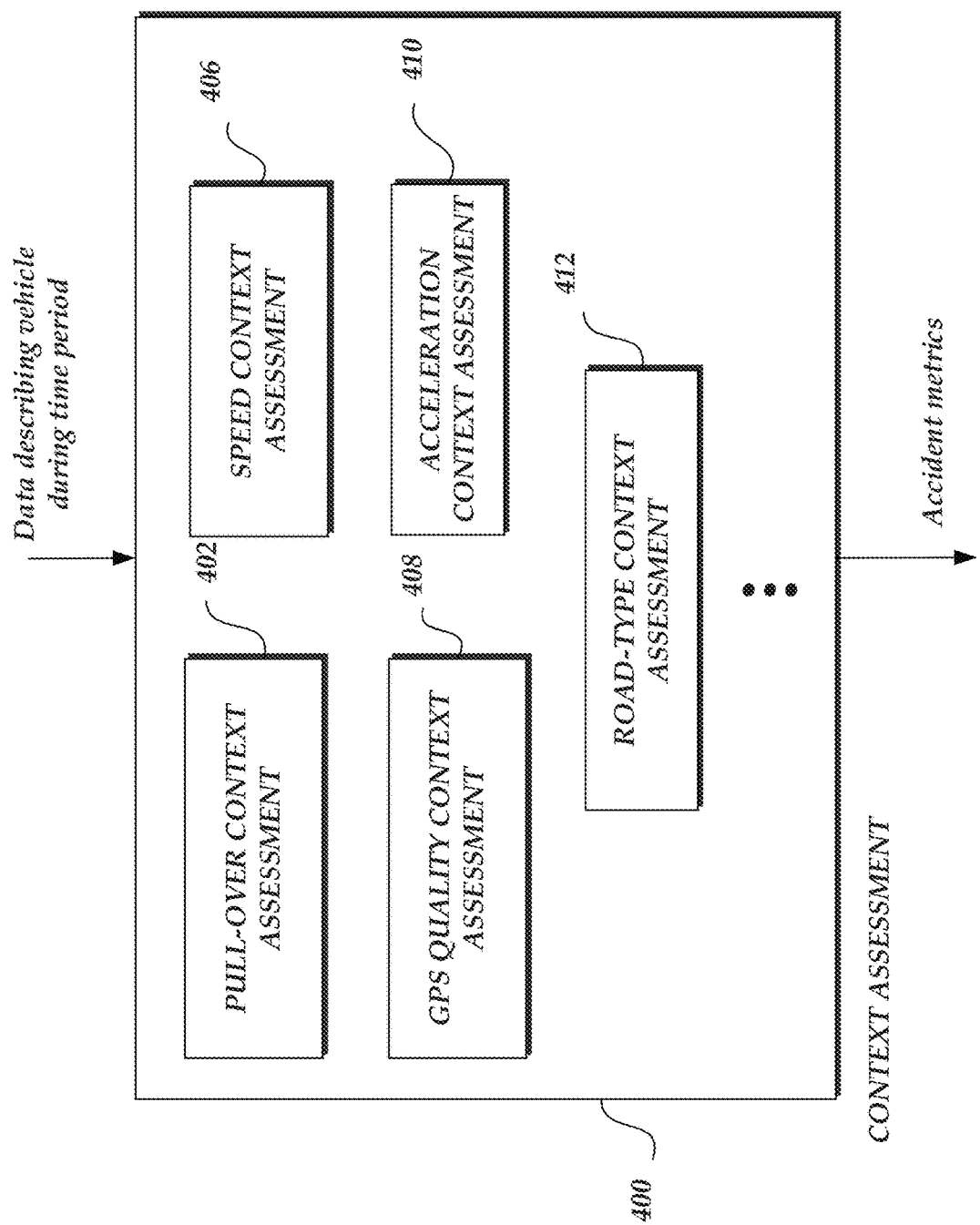
FIG. 4 is a schematic diagram of example operations that may be implemented in some embodiments to characterize a context of a collision.

FIG. 4 is a schematic diagram of an illustrative system that may be implemented in some embodiments to characterize a context of a collision. In some examples, context assessment depicted in block 400 may be implemented by the collision detection facility in the context assessment operation depicted in block 312 of FIG. 3. In some embodiments, once a potential collision has been identified and data describing the vehicle during a time period has been obtained, the collision detection facility may analyze the data describing the vehicle to assess one or more conditions to determine whether one or more criteria related to collision/non-collision context are met. In some examples, one or more conditions related to context criteria may be associated with contextual information of a potential collision around the time and/or location of the potential collision. Such conditions may be used by the collision detection facility to determine a metric value, e.g., a collision score. If the collision score is below a threshold, it may be determined that the potential collision is likely a non-collision event.

In some examples, context assessment operation of block 400 may include "pull-over" context assessment operation block 402, speed context assessment operation of block 406, GPS quality context assessment operation of block 408, acceleration context assessment operation of block 410, or road-type context assessment operation of block 412. In each of the context assessment operations of blocks 402-412, the collision detection facility may analyze the data describing the vehicle in a time period around a potential collision and determine whether one or more criteria related to the potential collision is met. In some examples, in each of the context assessment operations 402-412 the facility may generate a metric value (e.g., a score) indicative of the likelihood of collision or non-collision with respect to a respective context assessment described above.

In some embodiments, the facility may determine with the "pull-over" context assessment operation of block 402 whether the vehicle experienced a pullover around the time of the potential collision. For example, in response to determining a potential collision, the data describing the vehicle may be analyzed to assess whether the vehicle experienced a "pull-over" by determining whether the vehicle came to a stop within a certain amount of time and distance and/or stopped in an area outside of a travel lane for vehicles (e.g., side of a road, parking lot, etc.). If the vehicle came to a stop within the time and distance of an identified potential collision, and stayed at the stop for more than a threshold period of time, then the likelihood that the potential collision is a non-collision may be low, as the stop may be more likely to be explainable by a driver stopping a vehicle following a collision. On the other hand, if the vehicle made several short stops within a distance, it is likely that the potential collision is a non-collision event.

In the "pull-over" context assessment operation of block 402, one or more conditions may be assessed to determine an assessment score indicative of the likelihood of the potential collision being a collision. For example, the one or more conditions may include whether the vehicle stopped within a threshold time of the time of the potential collision and within a threshold distance of the location of the vehicle at the time of the potential collision. In a non-limiting example, Table 1 lists examples of scores when different conditions are satisfied. The parameters used in calculating the score are shown only as examples, whereas various methods may be used to obtain the parameters. For example, the parameters may be obtained empirically or may be obtained via machine learning algorithms.

TABLE 1

| Condition | Score |
|---|---|
| A "pull-over" event is detected and when the vehicle's speed is greater than a threshold (dynamic pullovers) | 1.0 |
| A "pull-over" event is detected and when the vehicle's speed is lower than a threshold (static pullovers) | 1.0 |
| Double Pullovers is detected | 0.5 + 0.5*negative_slope_map of the first moving group distance from the time of potential collision, mapped between a range of distance (e.g., 500-3000 meters) |
| A short stop followed by 1 moving event is detected | 0.4 + 0.4*negative_slope_map of the first moving group distance from the time of potential collision, mapped between a range of distance (e.g., 500-3000 meters) |
| A short stop followed by greater than one moving events is detected | 0.1 |
| The vehicle started moving after the potential collision | 0 |
| Insufficient data | −1 |

In Table 1, a "pull-over" event may be determined if the vehicle came to a stop within a certain amount of time and distance from the potential collision. A detection of one or two "pull-overs" around the time of the potential collision may be indicative of a likelihood of a collision, thus, the score is set to 1.0. On the other hand, if the vehicle moved after the potential collision, or moved more than once after a short stop, the potential collision is likely to be a non-collision, thus, the score is set to a lower value. If the vehicle had double "pull-overs," then the score may be determined based on the slope of the map. Double pullover is when the vehicle pulls over twice. Detection of double pullovers may capture a scenario where the accident happened in the middle of the road/intersection and the vehicle was stopped or parked for an initial inspection. The vehicle may be asked to pull over again to the side of the road or to the next parking lot nearby for the driver to exchange insurance information with the other party or the police and finish the investigation. Similarly, if the vehicle had a short stop followed by one moving event, the score may be determined in a similar manner with slightly different weights. A short stop is a stop event for a short period of time after which the vehicle moves on with the rest of the trip (e.g., the vehicle stopped at an unusually long stop light or due to traffic congestion). In some scenarios, the system may determine a moving event if the vehicle has moved exceeding a minimal threshold distance, and/or a moving time has exceeded a threshold time.

As shown in Table 1, a slope map value may be used to map the context (or any input value) to a score value between 0 and 1. For example, a positive slope map (shown in Table 2) may be used for values that increase with the likelihood of an accident increasing, whereas a negative slope map may be used for values that increases with the likelihood of an accident decreasing (e.g. the lower the speed after the events, the higher the probability of an accident).

In some embodiments, the slope map value may be obtained from a linear map. A linear map is a discontinuous function that represents a linear approximation of a sigmoid function. In some examples, the linear map may be used to convert an arbitrary input value to a value between 0 and 1. For example, a positive_slope_map (x, min_x, max_x) may be defined using a linear map as below:

=0.0, if ($x$<=min_$x$)

=1.0, if ($x$>=max_$x$)

=($x$−min_$x$)/(max_$x$−min_$x$), if $x$>min_$x$ and $x$<max_$x$.

Similarly, a negative_slope_map (x, min_x, max_x) may be defined using a linear map as below:

=1.0, if ($x$<=min_$x$)

=0.0, if ($x$>=max_$x$)

=(max_$x$−$x$)/(max_$x$−min_$x$), if ($x$>min_$x$ and $x$<max_$x$)

In the examples above, an input value between the lower and upper bounds (e.g., min_x, max_x) is mapped in a linearly increasing and decreasing manner, for positive and negative slope map, respectively. An input value beyond the lower and upper bounds may be equal to a value at the boundary (0 or 1).

When the negative_slope_map is used in a pullover context, it is hypothesized that the further the distance between the triggered events and the pullover location the less likely it is that the pullover event was caused by the trigger events. In other words, the further the vehicle drives after the trigger, the less likely it is an accident. Thus, the negative slope map is used to provide a measure of the likelihood of the event being an accident based on the distance from the triggered event to the pullover location. The negative slope map may be normalized to provide a maximum context value (or likelihood) of 1 for distances of smaller or equal to a lower threshold (e.g., 500 m or other suitable distance) and a minimum context value (or likelihood) of 0 at a distance of greater or equal to a higher threshold (e.g., 3000 m or other suitable distance). Furthermore, the context score is linearly decreased between these thresholds to provide a linearly decreasing measure of likelihood. As an example, if the distance from the triggered event to the pullover location is 1000 m, the negative slope map may return a metric of a potential accident of 0.8 (or 80%).

Returning to FIG. 4, in some embodiments, in the speed context assessment operation of block 406 the facility may determine whether the vehicle experienced a speed reduction around the time of a potential collision. For example, in response to determining a potential collision, the data describing the vehicle may be analyzed to assess whether one or more conditions related to a speed context are satisfied. In some examples, the one or more conditions may be associated with a speed reduction, which may include a change of speed of the vehicle. The speed reduction may also include a change of speed ratio relative to the speed of the vehicle. In such a case, a speed reduction score may be calculated based on the change of speed ratio. A change of speed in a low-speed driving may still result in a significant speed reduction which could indicate a likelihood of collision. Similar to other assessment operations, in the speed context assessment operation depicted in block 406, an assessment score may be generated based, at least in part, on whether the change of speed, the change of speed ratio, and/or the slop of the road from before to after the potential collision. In a non-limiting example, Table 2 lists examples of scores when different conditions are satisfied. The parameters used in calculating the score are shown only as examples, whereas various method may be used to obtain the parameters. For example, the parameters may be obtained empirically or may be obtained via machine learning algorithms.

TABLE 2

| Condition | Score |
|---|---|
| No Stop event | 0 |
| Speed after potential collision > speed before potential collision | 0 |

TABLE 2-continued

| Condition | Score |
|---|---|
| Speed before the potential collision < T | 0 |
| Otherwise | 0.6 * positive_slope_map when speed change is in the range of (10, 70) + 0.4 * positive_slope_map when speed change ratio is in the range of (0.4, 0.8) |
| Insufficient data (e.g., speed before or after is unknown) | −1 |

As will be described with respect to obtaining GPS data points, the speed change ratio may be determined by the ratio of the speed change (from before to after) relative to the speed before the time of the potential collision.

In some embodiments, in the GPS quality context assessment operation of block 408 the facility may determine whether the GPS data for the vehicle around the time of the potential collision is unreliable. In response to determining a potential collision, the data describing the vehicle may be analyzed to assess whether one or more conditions related to GPS data quality are satisfied. For example, in the GPS quality context assessment operation of block 408 the facility may determine whether the number of GPS points within the GPS data for the vehicle during the time period has dropped after the potential collision as compared to the number of GPS points before the potential collision. Additionally, and/or alternatively, a time window in which the available GPS points are obtained after the potential collision is also compared to the time window before the potential collision. If a decrease in a number of GPS data points after the potential collision, and/or the reduction of time window after the potential collision does not satisfy criteria (e.g., is below a threshold), the likelihood of a collision may be high because these low numbers after the potential collision may have resulted from an actual accident.

Similar to other assessment operations in FIG. 4, in the GPS quality context assessment operation of block 408, the collision detection facility may generate an assessment score based on a drop of GPS data points or a reduction of time window for the GPS data points after the potential collision. For example, for a detected potential collision, an assessment score may be generated based on a ratio of the number of GPS data points after the potential collision relative to the number before the potential collision. The assessment score may indicate the likelihood of the potential collision being a collision. In another example, the assessment score may also be generated based on the ratio of the length of window in which GPS data points are available, after the potential collision relative to the length of window before the potential collision. In a non-limiting example, Table 3 lists examples of scores when different conditions are satisfied. The parameters used in calculating the score are shown only as examples, whereas various method may be used to obtain the parameters. For example, the parameters may be obtained empirically or may be obtained via machine learning algorithms.

TABLE 3

| Condition | Score |
|---|---|
| Otherwise | 0.2 * positive_slope_map (PreTriggerGpsPointCount, 15, 20) + 0.4 * positive_slope_map(PostToPreTriggerGpsPointCount, 0.07, 0.2) + 0.4 * positive_slope_map(PostToPreTriggerTimeAvailable, 0.05, 0.2) |
| Insufficient data (e.g., no pre-trigger GPS points) | −1 |
| Speed < T | −1 |

In some embodiments, in the acceleration context assessment operation of block 410 the collision detection facility may determine whether one or more conditions related to an acceleration context are satisfied. For example, one or more conditions may be associated with the acceleration magnitude in the horizontal plane and the number of impacts that occurred over the duration of a data window. Harsh accidents may tend to generate a higher force than the usual false positive event (e.g., bumped devices or speed bumps). A dynamic event (e.g., potential collision, "pull-over," false positive event, etc.) refers to when the vehicle is moving greater than a threshold speed, e.g., 5 miles per hour. If the vehicle is moving slower than the threshold speed, the event may be a static event. In some examples, a dynamic potential collision may be a false positive if there was only one significant impact as opposed to multiple impacts in a real accident. On the other hand, a trigger that was recorded when the vehicle was stationary, a noisy trigger and often false positive trigger can be filtered out by a high number of recorded impacts.

Similar to other assessment operations in FIG. 4, in the acceleration context assessment operation depicted as block 408, the facility may generate an assessment score based on whether one or more conditions related to an acceleration context are satisfied. For example, the acceleration data around a potential collision may be analyzed to determine whether the number of impacts from acceleration data for the vehicle during the time period is within a range. The range may depend on whether the vehicle is moving. In response to determining that the number of impacts from the acceleration data for the vehicle during the time period is within the range, an assessment score may be determined based at least in part on an acceleration magnitude feature, wherein the score is indicative of whether the potential collision is likely a collision. The acceleration magnitude feature may be obtained based on an acceleration magnitude in the horizontal plane from the acceleration data for the vehicle during the time period. In a non-limiting example, Table 4 lists examples of scores when different conditions are satisfied. The parameters used in calculating the score are shown only as examples, whereas various method may be used to obtain the parameters. For example, the parameters may be obtained empirically or may be obtained via machine learning algorithms.

| Condition | Score |
|---|---|
| Vehicle is stationary and NumberOfImpacts > T1 | 0 |
| Vehicle is stationary and NumberOfImpacts <= T1 | accel_mag_feature |
| Potential collision is dynamic and NumberOfImpacts >= T2 | 0 |
| Potential collision is dynamic and NumberOfImpacts > T3 and < T2 | 0.5 * accel_mag_feature + 0.5 * num_of_impact_feature |
| Other conditions | accel_mag_feature |

The accel_mag_feature may be obtained based on acceleration magnitude in the horizontal plane, and num_of_impact_feature may be obtained based on detected number of acceleration impacts that occur over a time duration around the potential collision. The thresholds T1-T3 may be learned through a training process or maybe empirical data. For example, T1 may be set to 4, T2 may be set to 20. In other words, when the vehicle is in stationary, if the number of impacts triggered from the acceleration data is below a low threshold, e.g., T1, or above a high threshold, e.g., T2, the potential collision is unlikely to be a collision. When the vehicle is moving and the number of impacts is above a high threshold, e.g., T2, then the potential collision is unlikely to be a collision. During other situations, the assessment score may be based on the accel_mag_feature and/or num_of_impact_feature.

In some embodiments, the collision detection facility may determine in the road-type context assessment operation of block 412 whether the vehicle experienced a stop around the time of the potential in a travel lane at which vehicles do not customarily stop. In some examples, in response to determining a potential collision, the data describing the vehicle may be analyzed to determine whether the vehicle experienced a stop in a travel lane of a road, particularly a stop at a location in the travel lane at which vehicles do not customarily stop. Some types of roads may not typically include vehicle stops in travel lanes. For example, vehicles typically do not suddenly stop in a travel lane of a highway. A decrease in speed followed by a stop in such a travel lane may be indicative of traffic, but a sudden stop may be more indicative of a collision. On other roads, such as roads with traffic lights, stop signs, or other traffic control features, cars may often stop at certain locations in a travel lane (e.g., at an intersection) but may not stop at other locations (e.g., not at intersections). As such, a vehicle experiencing a stop in a travel lane at a location that is not an intersection, including if the stop was associated with a sudden stop, may have been involved in a collision. A vehicle stop score may be calculated based on the type of the road the vehicle is traveling and the duration of vehicle stop, for example.

The one or more conditions may be associated with a location of a stop of the vehicle around the time of the potential collision, and/or a time duration of the stop of the vehicle. For example, the type of the travel lane of the road on which the vehicle was traveling may be determined based on the location of the vehicle stop. If it is determined that a time duration of the stop of the vehicle is above a duration threshold, it may be determined that the vehicle experienced a stop in a travel lane at which vehicles do not customarily stop. The duration threshold may be dependent on the type of the road.

Similar to other assessment operations in FIG. 4, in the road-type context assessment operation of block 408, the collision detection facility may generate an assessment score based on whether one or more conditions related to the road-type context are satisfied. In a non-limiting example, Table 5 lists examples of scores when different conditions are satisfied. The parameters used in calculating the score are shown only as examples, whereas various methods may be used to obtain the parameters. For example, the parameters may be obtained empirically or may be obtained via machine learning algorithms.

TABLE 5

| Condition | Score |
|---|---|
| the road-type of the lane the vehicle is traveling matches a highway road-type, the location of the potential collision lies within an intersection or is on one of the major road types, and a dynamic pullover or double pullover is detected | 1 |
| a dynamic pullover or double pullover is detected, and the road-type is non-major roads | 0.8 |
| there is a short stop event around the potential collision on major roads | 0.7 |
| there was insufficient data or the vehicle was stationary before and after the potential collision | 0.6 |
| Other conditions | 0 |

Under these various conditions, the road-type of the lane in which the vehicle is traveling, whether or not the vehicle is moving, whether there is a "pullover" event, and/or the duration of a stop are considered for a matched road type. For example, under the first condition in Table 5, if the location of the potential collision lies within an intersection or is on one of the major road types, and the pullover label is either dynamic pullover or double pullover, then a score of 1.0 may be assigned, indicating that the potential collision is likely a collision. The reasoning is that these types of pullovers usually do not occur within major road types for a long period of time.

Under the second condition in Table 5, a lower score but high value may be assigned (e.g., 0.8 or other suitable values) if the facility detects a dynamic pullover or double pullover and the road-type is a non-major road. The reasoning is that "pullovers" may be more common on residential or track road types. Similarly, under the third condition in Table 5, a short stop event around the potential collision on major roads may indicate a likelihood of collision. Thus, a lower score (e.g., 0.7 or other suitable values) may be assigned. Under the fourth condition, a lower score (e.g., 0.6 or other suitable values) may be assigned if there was insufficient data or the vehicle was stationary before and after the potential collision. Such an event may indicate a lesser, but still a likelihood of collision. Thus, a lower score (e.g., 0.6 or other suitable values) may be assigned. For all other events, a score of 0 was assigned, indicating that collision may be unlikely.

The collision detection facility may combine the metric values of the various context assessment operations 402-412 to generate an overall score. For example, the values from each context assessment operation (e.g., 402-412) may each be normalized in the range of [0,1], where "0" indicates that an accident is unlikely and "1" indicates that an accident is likely. The values from the various context assessment operations (e.g., 402-412) may be multiplied together or otherwise mathematically combined (e.g., added, etc.) to generate the overall collision score. The context assessment scores from blocks 402-412 may be each assigned a weight in the combination.

As discussed above, a time period may be defined around the time of the potential collision, and data describing the vehicle during the time period may be analyzed to determine a likelihood that the potential collision is a non-collision. In some cases, a second potential collision may be detected within that time period, where the second potential collision may be determined to be a part of the first potential collision, and the two potential collisions may be merged. With such a merge, the time period for the first potential collision may be extended to be an updated time period from before the first potential collision to after the second potential collision, and subsequently additional data (in an extended time period) may be obtained and analyzed to determine whether the potential collision is likely a non-collision. The merging operations of multiple potential collisions are described in detail with reference to FIGS. 5A-5B.

Figures 5A, 5B:
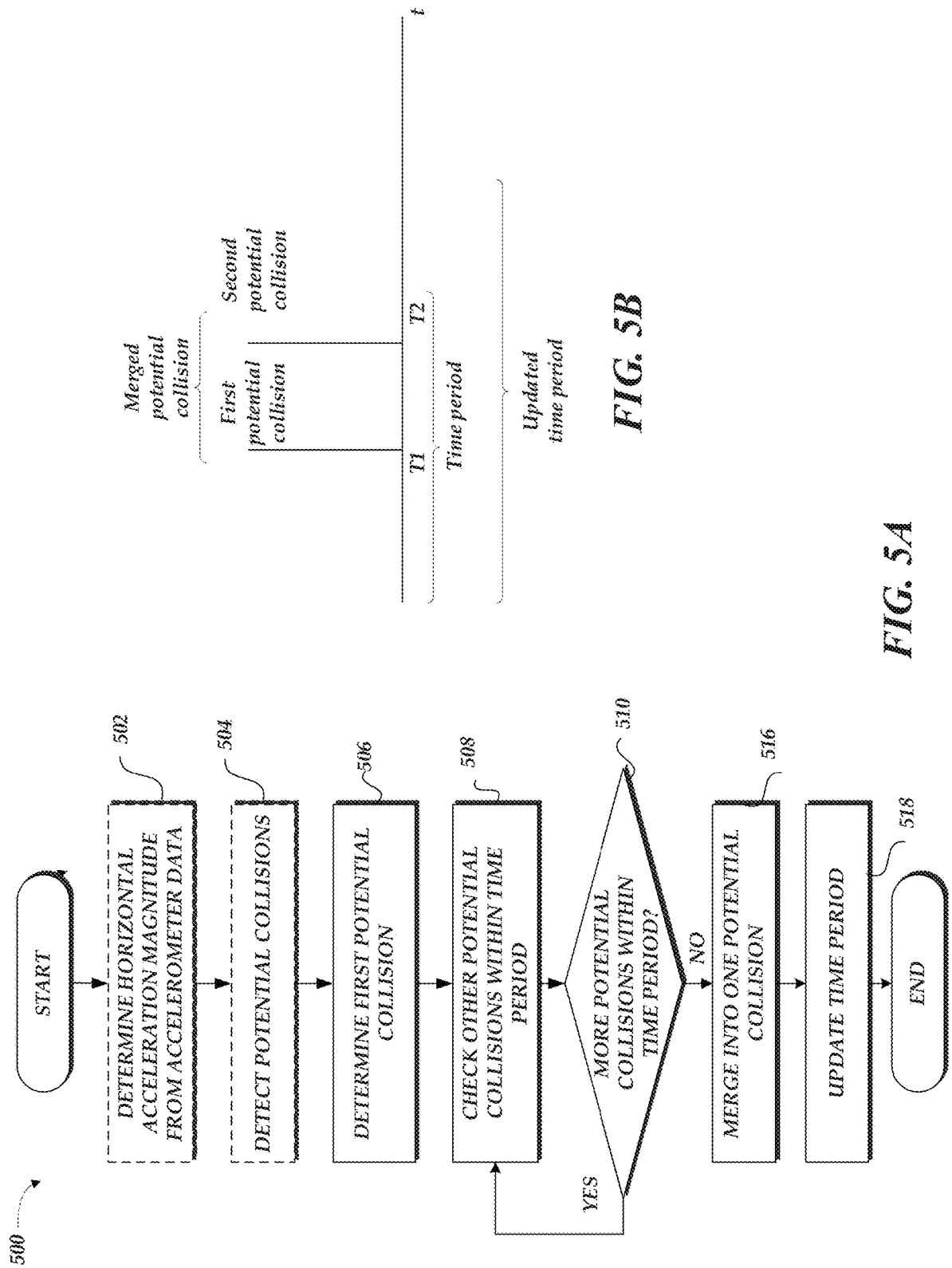
FIG. 5A is a flowchart of an example process that may be implemented in some embodiments to merge potential collisions.
FIG. 5B illustrates an example of updating a time period following merging potential collisions according to some embodiments.

FIG. 5A is a flowchart of an example process that may be implemented in some embodiments for a collision detection facility to merge potential collisions. FIG. 5B illustrates an example of updating a time period following a merge if potential collisions according to some embodiments. FIGS. 5A-5B may be implemented in various systems and processes described in FIGS. 1-4, for example, by the collision detection facility (FIG. 1) in connection with block 204 of FIG. 2A, or block 254 of FIG. 2B.

In some embodiments, the process 500 may include determining a first potential collision at block 504. For example, the first potential collision may be detected using various embodiments examples described above, including in connection with FIGS. 1, 2A-2B.

Optionally, in process 500 the collision detection facility may also detect multiple potential collisions. For example, the process 500 may begin with the collision detection facility determining acceleration magnitudes from accelerometer data at block 502 along a timeline. At block 504, the collision detection facility may further detect one or more potential collisions, in response to determining that the horizontal acceleration magnitudes exceed a threshold at one or more instances of time. Among the detected potential collisions, the collision detection facility may determine a first potential collision at block 506 and check other potential collisions within a time period from the first potential collision at block 508. For example, additional potential collisions are checked within a threshold time (e.g., 20 seconds, or other suitable time period) of the first potential collision. Once all of the potential collisions within that threshold time of the first potential collision are determined, these potential collisions are merged into one potential collision at block 516. Consequently, the collision detection facility updates the time period at block 518.

A non-limiting example is further illustrated with reference to FIG. 5B. A first potential collision is detected at time T1. Within a time period of T1, a second potential collision is detected at T2. The two potential collisions are then merged, and the time period for the first potential collision is further updated to include an extended time period, which extends from before the time of the first potential collision and after the time of the second potential collision.

Other variations of the merging operation may be possible. For example, instead of searching for other potential collisions with a time period of the first potential collision, once a second potential collision is found in the time period of the first potential collision, the time period is instantly updated and extended to extend after the second potential collision. Subsequently, other potential collisions are searched in the updated time window. The operations of merging potential collisions and updating the time period may be repeated until no other potential collisions are found in the updated time period.

Once potential collisions are merged and the time period is updated, data describing the vehicle and/or additional data describing the driver may be obtained during the updated time period in place of obtaining data during the original, shorter time period. The collision detection facility may then determine whether the potential collision(s) are collisions, based on the data describing the vehicle that is collected across the extended time period.

As previously described, data describing the vehicle may be obtained during the time period of a potential collision. This may be implemented by the facility, in some embodiments, to store various tables containing data describing the vehicle, where the data are obtained from various telematics monitors or generated from the readings of the telematics monitors. Some data are generated along with the detection of potential collisions (e.g., based on acceleration values as previously described), whereas some data are generated using the data previously generated.

In a non-limiting example, once the potential collisions are detected, a HarshTriggers Table is generated for each potential collision. For example, for each potential collision (triggers), the facility may generate latitude/longitude/speed by using triggers with raw GPS data with a window (e.g., a 10 second window, 5 seconds before and after the trigger datetime when a respective potential collision is detected). The facility may calculate the speed by taking an average of all the GPS points. The facility may calculate latitude/longitude by taking the latitude/longitude reading from the closest GPS point to the trigger date/time of the detected potential collision, e.g., TriggerDateTime. The facility may also generate a unique ID for the detected potential collision, e.g., "TriggerId."

In some embodiments, the facility may further generate two downstream tables related to the detected potential collisions (triggers). These downstream tables may include the vehicle dynamics data of the harsh acceleration event within the trigger window with respect to the events in the HarshTriggers table. For example, the facility may generate a trigger window for GPS data, e.g., HarshTriggerWindowsGps table by taking all triggers from the HarshTriggers table where length of window less than 60 or number of datapoints in a trigger window is less than 60 (other window length or number may also be possible). The facility may use interpolated data to get corresponding GPS data, speed, bearing, and ignition data based on DateTime and HardwareId, to generate the trigger window for GPS data.

In some embodiments, the facility may also generate another downstream trigger window for acceleration data, e.g., HarshTriggerWindowsAcceleration by taking all triggers from HarshTriggers table where length of window less than 60 or number of datapoints in a trigger window is less than 60 (other window length or number may also be possible). The facility may use interpolated acceleration data to get corresponding GPS, speed, X, Y, Z, bearing and ignition data based on DateTime and HardwareId, to generate the trigger window for acceleration data. The interpolated data, such as interpolated GPS data is provided in an interpolated dataset in case the raw GPS data does not include any data points within the trigger window.

In some embodiments, the facility may further generate GPS window features and Acceleration window features based on the HarshTriggerWindowsGps table and HarshTriggerWindowsAcceleration table. For example, the GPS window features are calculated using the upstream HarshTriggerGpsWindow. This contains the following basic statistics of the window: Min, Max, Avg, Std_dev, and percentiles for speed. Further, the facility may generate the following columns for three different scenarios (total window, before trigger, after trigger):

ActualWindowLength—The actual GPS window length is seconds which is different from the queried length because of infrequent GPS logging;

QueriedWindowLength—The queried window length of GPS points by our query in seconds;

Sampling rate for the above two which states the amount of samples that are obtained per second;

NumberOfValidPoints—number of GPS points obtained in the window which have GPSValid=1; and NumberOfPoints—total number of GPS points obtained in the window.

The facility may further generate SpeedBeforeWeightedAvg, which is a weighted average using the GPS points that fall between a range of time (e.g., 1 to 11 seconds) before the first trigger datetime (first point where an acceleration event is detected). For example, for a GPS point that is before the first trigger datetime t, a window time the extends from t−Δt/2 to t+Δt/2 is used.

The facility may further generate SpeedAfterWeightedAvg, which is a weighted average calculated using the GPS points that fall between a range of time (e.g., 1 to 11 seconds) after the first trigger datetime (first point where an acceleration event is detected)

Based on the speed, the facility may further generate SpeedChange, SpeedChangeRatio (ratio of speed before to speed after to determine how much the speed was reduced by), StopEvent (0, if there was no GPS point with Speed<5 in the GPS window), PostTriggerTimeToStopEvent (time it took to get a stop event post trigger), PostTriggerDistanceToStopEvent (distance it took to come to a stop event), and QualityLabel.

In some embodiments, this GPS Window features table is used downstream in an operation, such as block 406 (FIG. 4) to calculate a collision score related to speed context.

In some embodiments, the acceleration window features may be calculated using the acceleration data windows provided in the HarshTriggerAccelerationWindow table. This features table contains the following basic statistics and metrics of the event data windows, such as NumberOfImpacts which is based on the impacts extracted from the horizontal acceleration magnitude; MaxAccelMag which is the maximum acceleration magnitude in the horizontal plane; Min, max, ave, std_dev of all acceleration components; and general data quality metrics that are generated for three different scenarios (total data window, points before trigger, and points after trigger). These general data quality metrics may include, for example:

ActualWindowLength—The actual acceleration data window length in seconds which is different from the queried length because of infrequent acceleration data logging;

QueriedWindowLength—The queried data window length of acceleration data points by our query in seconds;

Sampling rate for the above two which states the amount of samples are obtained per second;

NumberOfPoints—total number of acceleration data points obtained in the window; and ClosestPoint—time difference between triggers in the adjacent acceleration data point (only for before and after scenario).

The facility may further generate QualityLabel which is based on the calculated metrics above, and ActiveWindowLengthAroundTrigger which is the actual data window length of a filtered acceleration signal that removes low activity acceleration readings before and after the trigger.

The listed acceleration features are used in the downstream query to perform operation of acceleration context assessment (e.g., block 410 in FIG. 4).

In obtaining data describing the vehicle, the facility may further generate a trigger window for fault code data for each of the potential collisions. In some embodiments, a downstream table (CorrelateTriggersAndEngineFaults) may be created by using the reduced harsh triggers table with fault code events that fall within a window (e.g., 60 seconds before or after the trigger time, or other window time). This may be implemented by taking all triggers from HarshTriggers table and using the fault codes of the vehicle to get all the correlated fault code events. Examples of fault code may include whether an airbag was deployed or identifying the location of impact (frontal, rear, left, and right). The criteria for a fault code to be correlated is that it must fall within a window 60 seconds (other window time may also be possible) before or after a trigger event. The facility may further use the correlated fault codes with other comparison dataset to get the fault description which identifies the type of collision detection fault.

In some embodiments, the fault code data may include engine fault code of the vehicle, and may be obtained from the vehicle's Engine Control Unit (ECU) and/or otherwise available from or via the vehicle's On-Board Diagnostics (OBD) facility (which, as used herein, also refers to an OBD-II system). For example, information indicating multiple engine errors at the same time may be a strong indicator that a collision occurred. Using this as a strong sign that a collision occurred, movement information (e.g., accelerometer and/or speed data) might be analyzed to characterize the collision, such as the severity of the collision and/or a direction of impact. As another example, if any of a vehicle's sensors indicated a fault at a time of a potential collision, this may be a sign of damage associated with a collision and indicative that the potential collision was a collision. Movement information may then be analyzed to characterize the collision.

The various data, which describe the vehicle, or any other data that may be used in detecting the potential collisions or determining a likelihood that the potential is a non-collision, may be stored in any suitable format, such as being implemented as metadata, or as data labels. Variations of the embodiments described in FIGS. 2-5B may be implemented by the collision detection facility, with examples shown in FIGS. 6-9.

Figure 6:
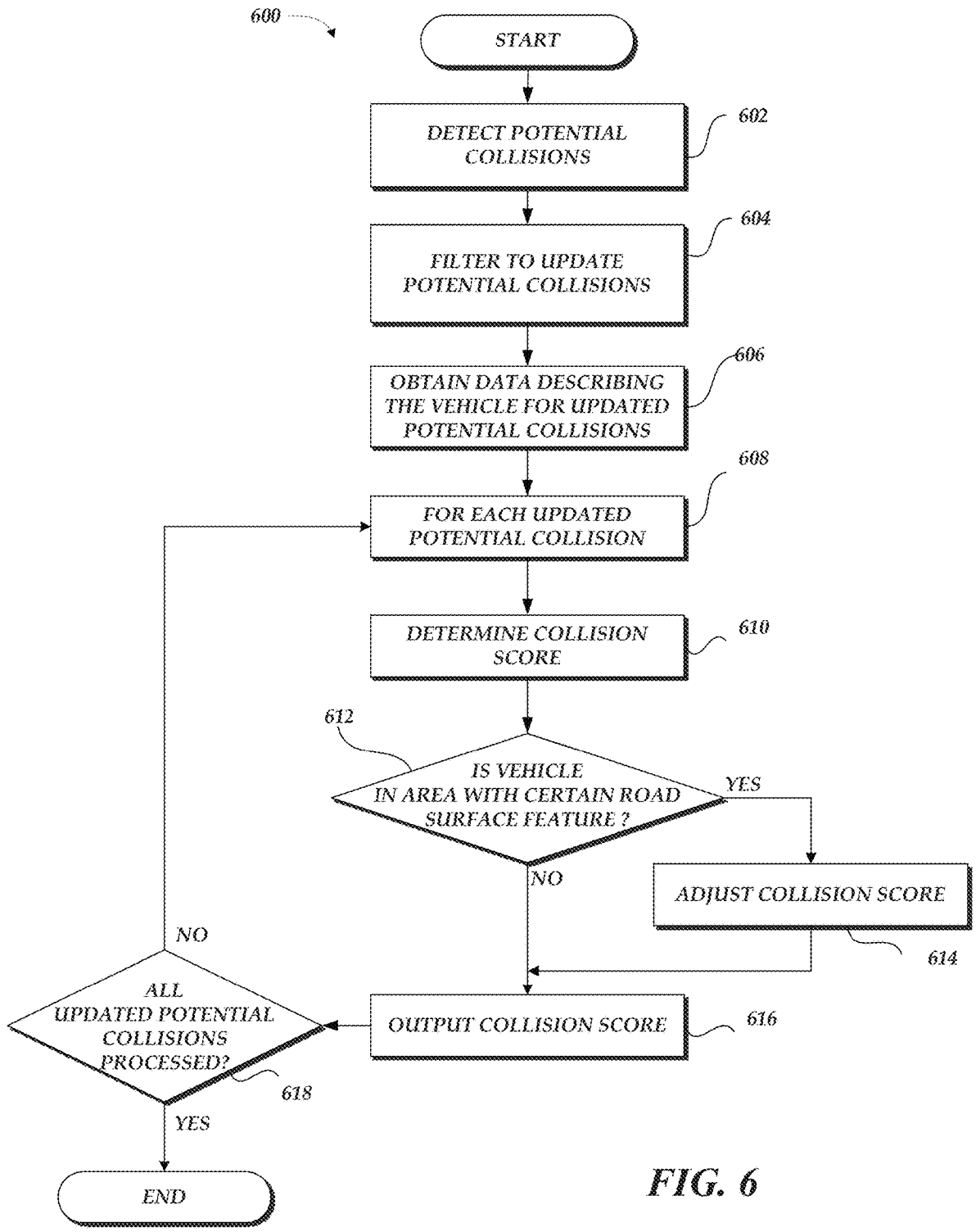
FIG. 6 illustrates a flowchart of an example process that may be implemented in some embodiments to process multiple potential collisions.

FIG. 6 illustrates a flowchart of an example process that may be implemented in some embodiments for a collision detection facility to process multiple potential collisions. The example process 600 may be implemented as a system in the collision detection facility (FIG. 1) in connection with various embodiments described in FIGS. 2A-5B, for example. In some embodiments, the example process 600 may start with the collision detection facility detecting one or more potential collisions at block 602. For example, acceleration data indicating an abrupt increase in acceleration may be used to detect a potential collision.

Optionally, the facility may merge potential collisions and generate an updated time period for the merged potential collision. The description of merging potential collisions and updating the time period are disclosed in the present disclosure, such as in FIGS. 5A-5B.

The process may further include the facility filtering the detected potential collisions to generate updated potential collisions at block 604 by removing the potential collisions that are false positives (or non-collision events). In some examples, removing the false positives may include determining a likelihood that a potential collision is a non-collision event, using various operations described in the present disclosure. If it is determined that the likelihood indicates that the potential collision is a non-collision event, such potential collision may be filtered out, and thus removed from the list of potential collisions.

For example, removing noisy triggers may include removing those triggers caused by an improperly operating telematics monitor as described in the present disclosure, such as the telematics monitor assessment procedure of block 302 (FIG. 3). Removing the false positives may also include determining "pull-over" events, the operations of which are described in the present disclosure, such as block 402 (FIG. 4). Removing the false positives may also include trip correlation assessment operation, which is described in the present disclosure, such as block 310 (FIG. 3).

With further reference to FIG. 6, the example process 600 may include the collision detection facility obtaining data describing the vehicle for updated potential collisions at block 606. In some embodiments, block 606 may include the facility determining a time period for each of the updated potential collisions and obtaining data describing the vehicle in the time period of a respective potential collision. The determination of the time period for a potential collision is described in the present disclosure, such as block 204 of FIG. 2A or block 254 of FIG. 2B. For example, for each potential collision, a time period may be determined by extending from before the potential collision to after the potential collision.

With further reference to operation at block 606, in the example process 600 in FIG. 6, the collision detection facility may obtain or further generate data describing the vehicle around each of the potential collisions. For example, in the example process 600 the facility may generate data for the filtered triggers, including, for example, speed, latitude, and longitude that are extracted from the original HarshTriggers table. The facility may also generate RoadType (which can be used for road-type context assessment operation (e.g., block 412 in FIG. 4), for example. RoadType may be generated by using the triggers that have latitude/longitude and spatial reference data, with the criteria being that the road segment must lie within a threshold distance (e.g., 15 meters, or other values) of the trigger point. Then, the triggers may be matched with the closest road such that there is at most one road type matched per trigger. The road type categorization may be used by following OSM guidelines as there are some variations of usage based on country.

In some embodiments, in the example process 600 the facility may further generate data including TriggerType determined by the speed (which may be dynamic, static, or unknown). For example, if the speed is null, then the TriggerType may be unknown. This may be possible, for example, when no GPS points are available in a threshold window time (e.g., 10 seconds, or other values). If the speed is less than a low threshold speed (e.g., 5 mph, or other values), then it is deemed as a static trigger. Otherwise, it is a dynamic trigger.

In the example process 600 the facility may further generate TripLabel, PulloverLabel. In some embodiments, the facility may also generate EngineFaultLabel by looking at the correlated engine faults and determining whether or not an airbag has deployed or nearly deployed and how many impact-based faults were observed. Once this is determined, data labels may be generated to indicate "Airbag deployed+impact" or "Airbag deployed+multiple impacts" or "Airbag deployed". If there is no match, the label is classified as unknown.

For each of the potential collisions, the facility may further determine a collision score indicative of the likelihood of that potential collision being a collision at block 610. Various embodiments of generating metric values for one or more criteria related to respective non-collision events are described in the present disclosure, such as in FIGS. 1-4. Thus, the facility may generate an overall metric value, e.g., a collision score at block 610.

As a variation of the various embodiments described in the present disclosure, road type feature assessment operation of block 306 of FIG. 3 may be used to further adjust the collision score instead of being used to filter out non-collision events from detected potential collision events. For example, at block 612, the facility may determine whether the result from block 610 indicates that the vehicle is near a certain road surface feature at the time of the potential collision. Operations of determining road surface feature are described in the present disclosure, such as block 306 of FIG. 3. For example, in block 612 the facility may check whether a potential collision happens near loading bays, railway tracks, expansion joints on the highway etc., where these areas are prone to causing acceleration values of vehicles traveling therethrough to be detected as acceleration events. If it is determined that one or more conditions related to the road surface feature assessment are met, the facility may determine that the vehicle was traveling through the road surface feature. Accordingly, the facility may adjust the collision score at block 614. For example, the facility may lower the collision score (e.g., setting the collision score to 0) because the detection of the potential collision may likely be caused by the road surface feature the vehicle was traversing rather than a collision. Then, the facility may output the collision score or display the collision score to a user at block 616. The facility may repeat operations at blocks 610-616 for each of the potential collisions through operation at block 618, until all of the potential collisions are processed.

Figure 7:
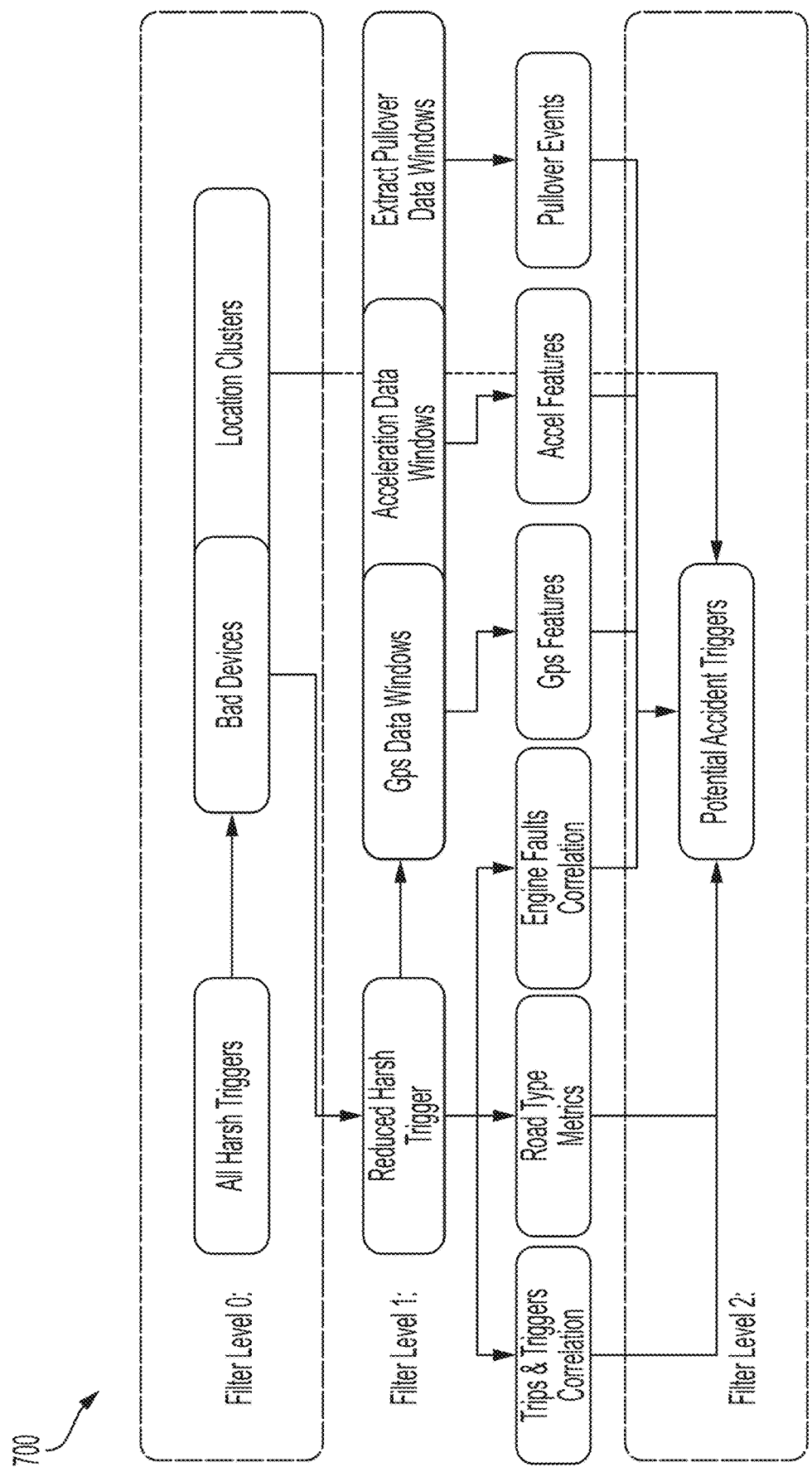
FIG. 7 illustrates a flowchart of an example pipeline process that may be implemented in some embodiments to process harsh acceleration events.

FIG. 7 illustrates a flowchart of an example pipeline process that may be implemented in some embodiments to process "harsh" acceleration events, which may be events with a high acceleration that may be a potential collision. In some embodiments, a harsh events pipeline process ("harsh events pipeline") 700 may be implemented in various systems or processes described in the present disclosure, such as by the collision detection facility (FIG. 1) in connection with processes 200 (FIG. 2A), 250 (FIG. 2B), 300 (FIG. 3), 400 (FIG. 4), 500 (FIG. 5A), 600 (FIG. 6), and/or any sub-blocks thereof. The collision detection facility may reduce the amount of potential collision events from a collision detection point of view and to provide a metric of a potential collision for the filtered down events.

In the example of FIG. 7, the filtering is achieved in multiple stages. For example, the trigger events table in Filter Level 0 includes all events triggered by an acceleration threshold which are then reduced down to the harsh triggers table in Filter Level 1 by excluding excessively logging devices. As such, the false positive triggers are reduced. Only after the first reduction of triggers are the detailed driving data extracted and analyzed. Operations excluding excessively logging devices are described in the present disclosure, such as the telematics monitor assessment depicted in block 302 of FIG. 3. The harsh triggers table may contain information that is then used in the second filtering stage and to generate a potential collision score as shown in the flow chart. The result may be an even more filtered down events table (as shown in Filter Level 2) appended with accident metrics and metadata and a collision score. As a result, the two-stage process as shown in FIG. 7 improves efficiency of the pipeline process and the accuracy of the system.

Figure 8:
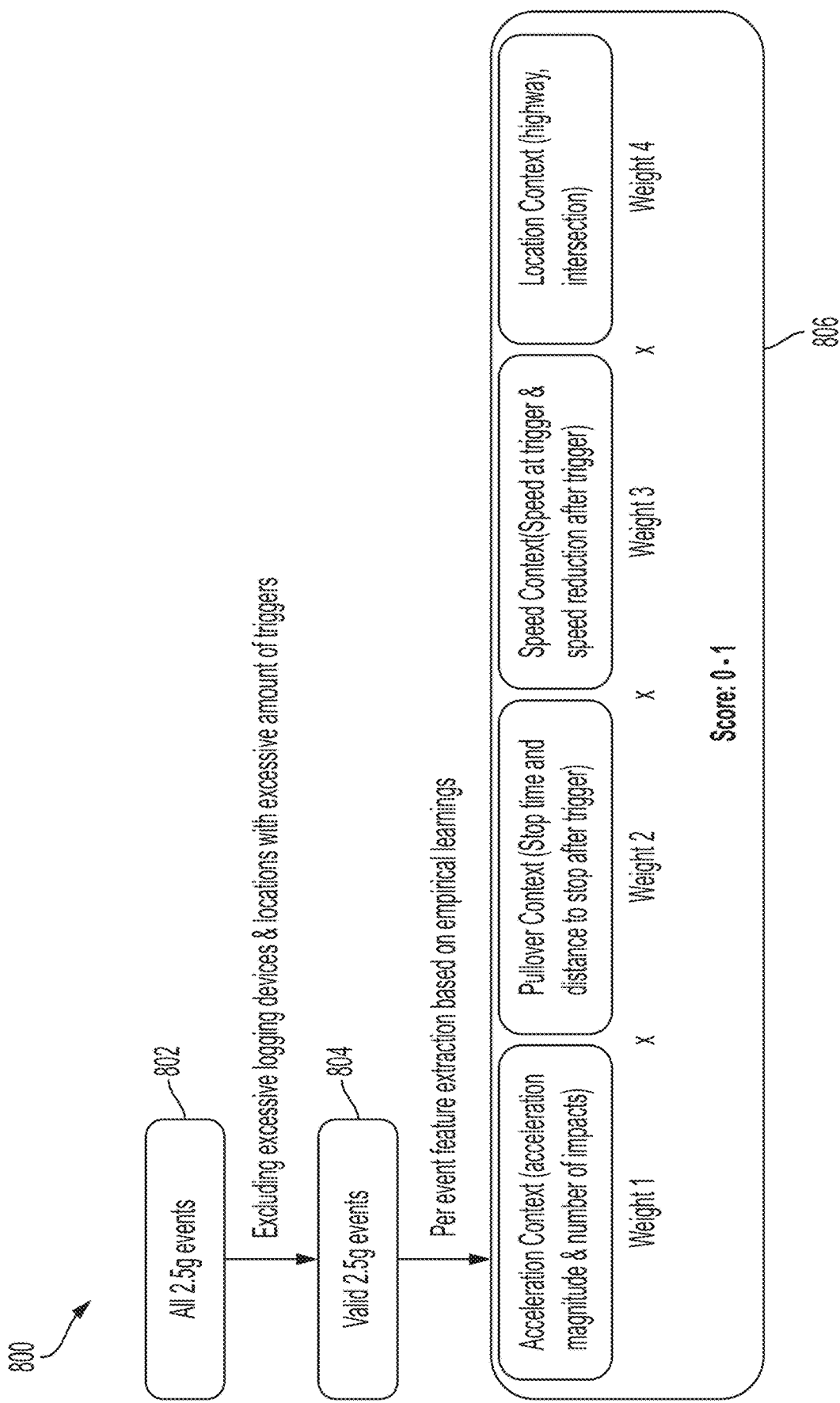
FIG. 8 and FIG. 9 illustrate flowcharts of example rule-based methods that may be implemented in some embodiments to process acceleration events.
Figure 9:
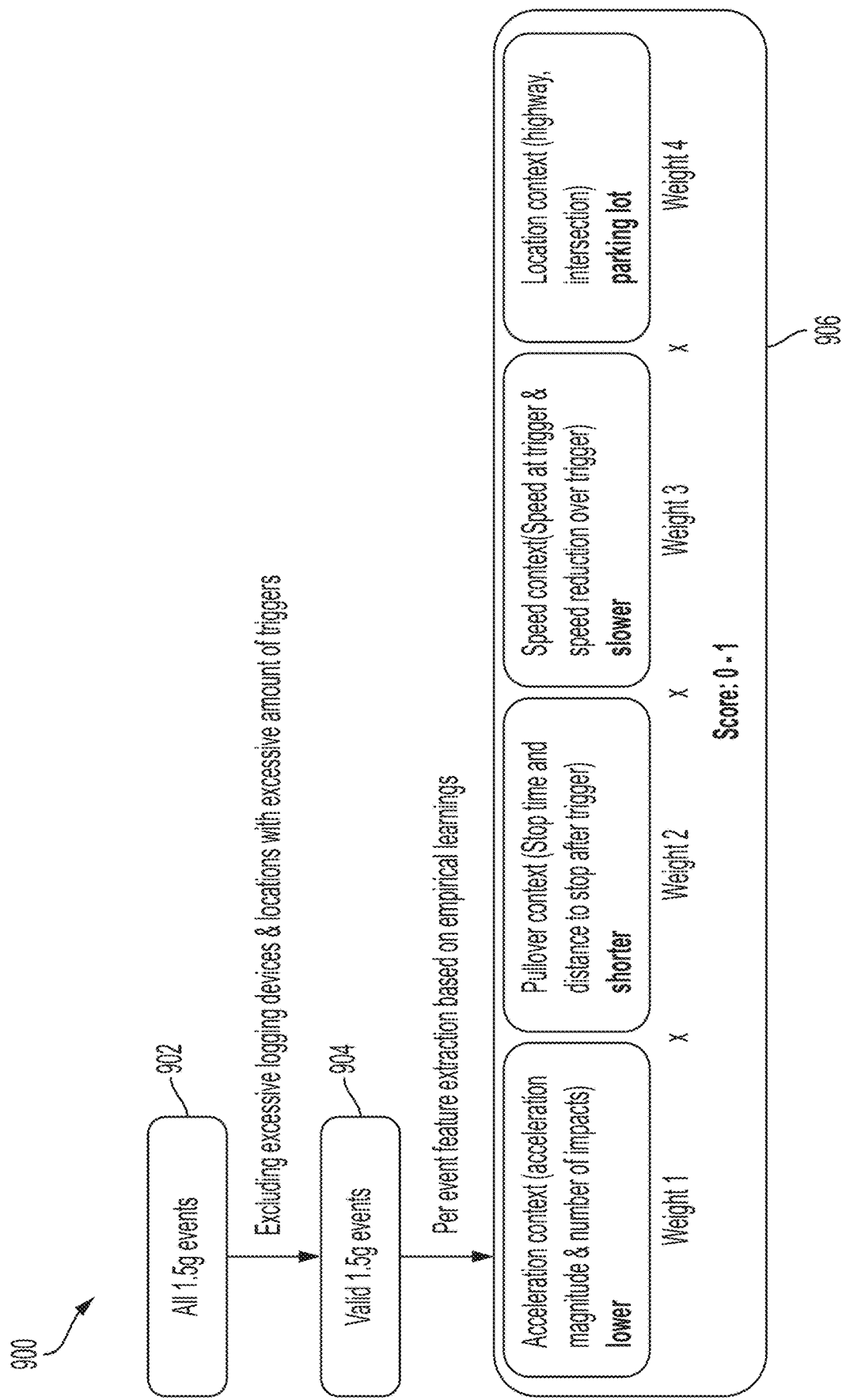

FIGS. 8 and 9 illustrate flowcharts of example rule-based methods that may be implemented in some embodiments to process acceleration events. With reference to FIGS. 8 and 9, process 800 and 900 each may be implemented in various systems or processes described in the present disclosure, such as by the collision detection facility (FIG. 1) in connection with processes 200 (FIG. 2A), 250 (FIG. 2B), 300 (FIG. 3), 400 (FIG. 4), 500 (FIG. 5A), 600 (FIG. 6), or any sub-blocks thereof.

In processes 800 and 900, the collision detection facility may detect potential collisions based on a respective acceleration trigger, validate the detected potential collisions, for example, by analyzing data describing the vehicle against one or more criteria related to non-collision events. With both processes 800 and 900, the facility may generate a metric value by assessing various contexts, such as acceleration context, "pullover" context, speed context, and/or location/road-type context. The output metrics value may indicate the likelihood of each potential collision being an actual collision.

Various blocks in processes 800 and 900 may be implemented in any suitable system or process described in the present disclosure. For example, blocks 802/902 may be implemented in the collision detection facility of FIG. 1, such as in connection with block 202 of FIG. 2A, block 252 of FIG. 2B, block 504 of FIG. 5, or block 602 of FIG. 6. Blocks 804/904 of processes 800/900 may be implemented, for example, by a collision detection facility (FIG. 1) in connection with block 208 of FIG. 2A, block 258 of FIG. 2B, block 300 of FIG. 3, block 400 of FIG. 4, or block 604 of FIG. 6. Blocks 806/906 of processes 800/900 may be implemented, for example, by a collision detection facility (FIG. 1) in connection with block 208 of FIG. 2A, block 258 of FIG. 2B, block 300 of FIG. 3, block 400 of FIG. 4, or block 610 of FIG. 6. Various sub-blocks in 806/906 may also be implemented in, for example, blocks 410, 402, 406, or 412 of FIG. 4. Processes 800 and 900 may be performed in a similar manner, except that in process 800 (FIG. 8), 2.5 g may be used as a threshold to detect potential collisions. In process 900 (FIG. 9), 1.5 g may be used instead as a threshold to detect potential collisions. Thus, process 900 may detect more potential collisions related to driving at a lower speed. As such, one or more conditions associated with various context-related criteria, such as acceleration context, "pull-over" context, speed context and location/road-type context may vary.

Variations of the embodiments described in FIGS. 2-5B may be implemented by the collision detection facility. For example, in some embodiments previously described, data describing the vehicle during a time period of a potential collision may be analyzed to determine a likelihood that the potential collision is a non-collision. If it is determined that the likelihood indicates that the potential collision is not a non-collision, the data describing the vehicle may further be provided to a classifier to determine the likelihood that the potential collision has been an actual collision. Alternatively, the data describing the vehicle during the time period of the potential collision may be provided to the classifier without first determining the likelihood that the potential collision is a non-collision. Such variation, as well as the classifier that may be used in various embodiments, are described in further detail with reference to FIGS. 10-13E.

Figure 10:
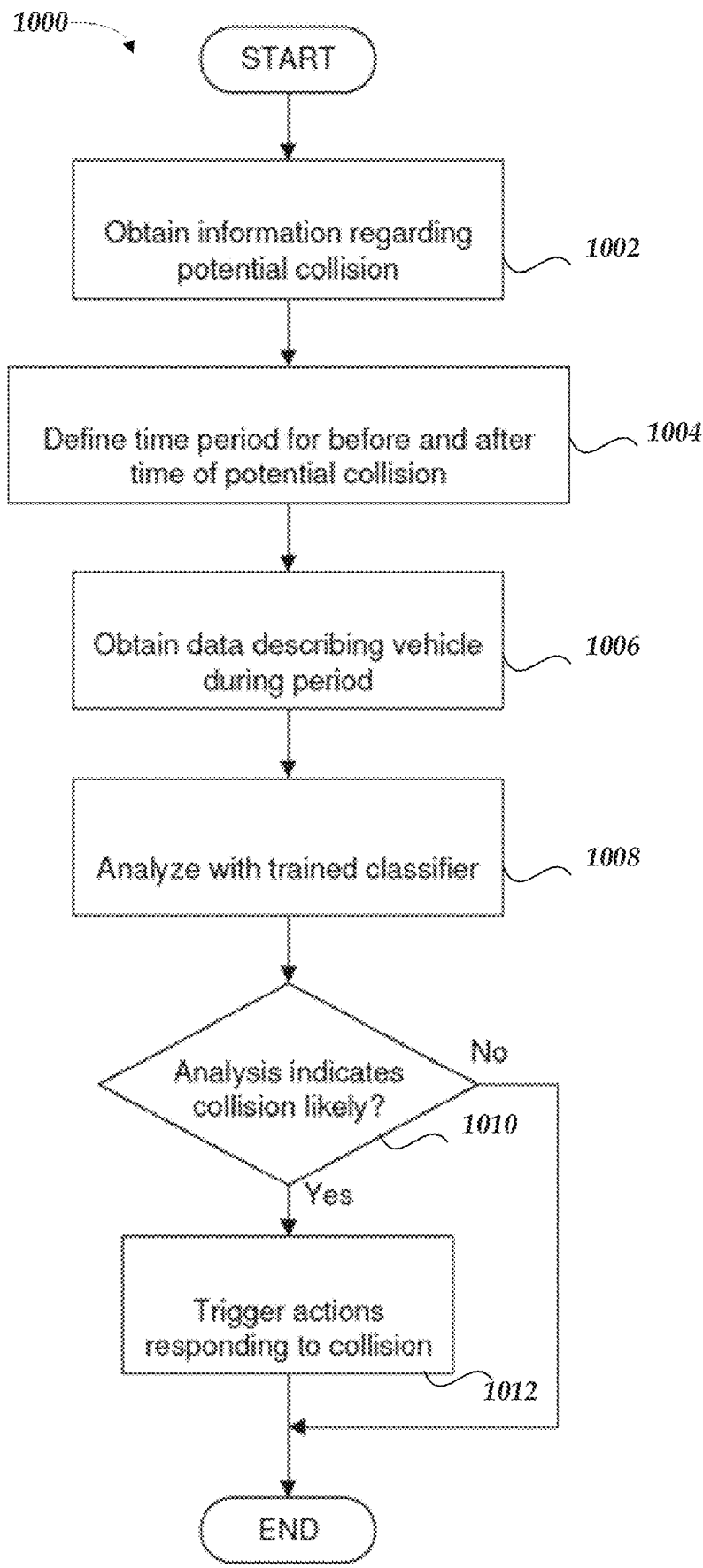
FIG. 10 is a flowchart of a process that may be implemented in some embodiments to characterize a collision using a trained classifier.

FIG. 10 illustrates an example of a process that may be implemented by a collision detection facility in some embodiments. The process of FIG. 10 may be implemented locally to a vehicle (e.g., in a monitoring device of FIG. 1) and/or remote from a vehicle. In some embodiments, for example, part of the process 1000 of FIG. 2 may be implemented local to a vehicle, such as operations of blocks 1002-1006 of the process 1000, while another part of the process 1000 may be implemented from a vehicle, such as operations of blocks 1008-1012.

The process 1000 begins in block 1002, in which a collision detection facility obtains information regarding a potential collision.

In some embodiments, the collision detection facility may obtain information regarding a potential collision by monitoring over time a magnitude of total acceleration experienced by an accelerometer of a vehicle and/or of a monitoring device. The total acceleration may be a value derived from acceleration detected by the accelerometer in different axes. For example, in case the accelerometer is a three-axis accelerometer, the total acceleration may be derived from computation performed on acceleration experienced in each of the three axes. The three axes may be forward-backward, right-left, and up-down in some cases. In some embodiments, the magnitude of total acceleration may be calculated as the square root of the sum of the squares of the acceleration in different directions. For example, if the acceleration in the forward-backward direction is assigned to "x", the acceleration in the right-left direction to "y," and the acceleration in the up-down direction to "z," the magnitude of the total acceleration may be:

$$acc_{total} = \sqrt{x^2 + y^2 + z^2}$$

The magnitude of the total acceleration is a scalar value. This value may be used in block 1002 as part of obtaining information on whether the vehicle has experienced an event that may (or may not be) a collision—a potential collision. It is appreciated that other variations of the acceleration magnitude may also be used. For example, a magnitude of horizontal acceleration (in the x direction) may be used.

For example, in some embodiments, if the vehicle experiences a total acceleration at a time that is above a threshold, this may be taken as a sign of a potential collision that is to be further evaluated to determine whether it is a collision or is not a collision. As should be appreciated from the foregoing, acceleration alone is seldom a reliable indicator of a collision, as other events may also be associated with high accelerations, such as a kick or bump of a monitoring device or the vehicle striking a pothole or other road deformity. Accordingly, the magnitude of total acceleration is not taken as a sign of a collision, but rather used as a sign of a potential collision that is to be investigated further.

Thus, in block 1002 in some embodiments, the collision detection facility determines the total acceleration over time, such as at a time interval. That time interval may be, for example, multiple times per second (e.g., 100 times per second), once per second, or other suitable interval, then determines whether the total acceleration at any time exceeds a threshold. If not, the collision detection process ends. In some embodiments, the collision detection facility may return to block 1002 and continue monitoring the total acceleration over time, or otherwise obtaining information on a potential collision.

It should be appreciated, however, that embodiments are not limited to using a threshold to determine whether a potential collision has occurred, as embodiments may obtain information regarding a potential collision in other ways.

For example, in some other embodiments, an indication of a potential collision may be obtained by identifying a total acceleration that is the largest in a time period. When a magnitude of total acceleration at a time exceeds the magnitude of total acceleration of other times, such as other times within a time window surrounding a time being analyzed, that higher total acceleration may be taken as an indication of a potential collision. This may be the case even if the magnitude of acceleration at that time is lower than the magnitude at other times. In such a case, the collision detection facility may use a sliding time window to, over time, analyze acceleration data within the time window to determine magnitude of total acceleration at times within the time window and to determine the highest magnitude in the window. The time of that highest magnitude may then be taken as a time of a potential collision and taken in block 1002 as information regarding a potential collision.

In some other embodiments, rather than the collision detection facility using a sliding time window to identify a maximum total acceleration within the time window, a sliding time window may be used that determines every successive point in time to be an indication of a potential collision. At each time step, a next acceleration sample may be taken as an indication of a potential collision, and taken in block 1002 as information regarding a potential collision.

Once the collision detection facility obtains information regarding a potential collision in block 1002, then in block 1004 the collision detection facility defines a time period that spans a time before and after the time at which the total acceleration exceeded the threshold. The time may be long enough to last before and after a collision, if the time of the potential collision is at the beginning, during, or at the end of a collision. For example, if collisions are determined to last at least three seconds, the time period may be 6 seconds long: three seconds before the time of the potential collision, and three seconds after. If collisions are determined to last at least 5 seconds, the time period may be 10 seconds. The inventors recognized and appreciated that some collisions may last up to 10 seconds, so a time period of 20 seconds may be advantageous. It should be appreciated, though, that embodiments are not limited to being implemented with any particular time period. Further, while in some embodiments the time period may be symmetrically defined around the time from block 1004, in other embodiments the time period may be asymmetrically defined.

In block 1006, the collision detection facility obtains data describing the vehicle during the time period defined in block 1004. The data that is obtained may be movement data describing movements of the vehicle in the time period. The data describing the movements may be acceleration data indicating an acceleration of the vehicle in three axes at intervals (e.g., the same interval that may be used in block 1002 to obtain acceleration data) during the time period. In some embodiments, the acceleration data may also be processed to determine additional information describing movements of the vehicle in the time period. For example, for each set of acceleration data for each interval, a magnitude of total acceleration may be determined, in the same manner that may have been used, in some embodiments, in block 1002. As another example, the speed of the vehicle at the interval may be determined. In some embodiments, speed information may be determined from calculations performed on accelerations over time, potentially together with location data.

In some embodiments, in addition to or as an alternative to acceleration information, other data describing the vehicle may be obtained. For example, the collision detection facility may obtain data from a vehicle, such as from an ECU or OBD system of the vehicle. The obtained information may include, for example, speed at each of the times for which acceleration data was obtained. The obtained information may additionally or alternatively include messages generated by one or more components of the vehicle, such as information indicating a state of the component(s). The state information may include, for example, whether any of the components of the vehicle have generated a fault message and/or have changed a state, such as, for an air bag system, whether an airbag deployed. The data that is obtained from the vehicle may be information for the time period defined in block 1004.

In block 1008, the information that is obtained in block 1006 is analyzed with a trained classifier of the collision detection facility. As discussed above in connection with FIG. 1, the trained classifier may include multiple different classes that are associated with vehicle data for different scenarios, where the scenarios include whether a collision occurred and/or characteristics of collisions (e.g., severity, angle of impact, etc.).

Each class may be associated with data describing combinations of data (e.g., movement data or other data) that are associated with the scenario described by the class. For example, if a class is associated with a collision having occurred and with a collision that is a severe collision in which the vehicle was rear-ended by another, the class may be associated with characteristics of movement data and/or other data that define such a severe rear-end collision. This information may define the class and be used to determine whether new data (for a potential collision to be analyzed) fits any of the classes.

Each class may be defined by different movement data because each type of collision may be associated with different movements, which allows for differentiating collisions, and because normal vehicle operations (with no collision) may also be associated with movements that differ from movements associated with collisions, which allows for differentiating collisions from normal driving. For example, a straightforward rear-end collision may include movements that are primarily forward-backward movements. A collision in which the vehicle is struck broadside by another vehicle may, on the other hand, be associated with right-left movement data. If data is input for a potential collision, and that data includes primarily forward-backward movements and includes very little right-left movement, it may be more likely that the potential collision is a rear-end collision than that the potential collision is a broadside collision. Severe collisions may also demonstrate different movements than not-severe collisions, and not-collisions may demonstrate different movements than collisions. A comparison of data for a potential collision to data describing different classes of collisions may therefore allow for determining whether a collision occurred and/or for determining one or more characteristics of a collision.

Accordingly, when the data obtained by telematics monitor 104A is analyzed with the trained classifier, the movement data and/or other data may be compared to each of the classes defined by the trained classifier. The collision detection facility may generate a probability indicating a level of match between each of one or more classes and the data. The probability for a class indicates a likelihood that the information associated with that class is an accurate description of the data. For example, for the example class above that is associated with a collision having occurred that is a severe rear-end collision, the input data may be compared to determine whether it matches the data for that class. If the collision actually was a severe rear-end collision, the input data may appear similar to the data for the class and a high probability of match may be generated. If, however, the input data is associated with a not-severe front-end collision, there may not be a high degree of match to the severe rear-end collision class and, accordingly, a low probability of match may be generated by the collision detection facility. In such a case, though, the trained classifier may have another class for a not-severe front-end collision, and there may be a high probability of matching that class. As a result, the collision detection facility may generate a probability of match between the input data and each of one or more classes maintained by the trained classifier.

These probabilities may be used to determine whether a collision occurred and/or characteristics of the collision. For example, a class that has a highest probability may be selected as the accurate answer, and the collision information for that class (whether a collision occurred and/or characteristics of such a collision) may be chosen as the likely correct descriptor of the collision. As another example, the probabilities may be compared to a threshold to determine whether any of the probabilities for any of the classes are above the threshold. If so, all of the classes for which a probability is above a threshold may be reported as potential matches for the potential collision, for a user to review each of the potential matches and the collision information for each of the potential matches. As another example, the probabilities may be compared to determine whether one or more of the probabilities differ from others by more than a threshold amount, such that one or more could be determined to be potential correct matches whereas others are, as compared to those one or more, less likely to be correct. Those one or more that stand out from the others may then be reported as potential matches for the potential collision, for a user to review each of the potential matches and the collision information for each of the potential matches. Embodiments are not limited to any particular manner of analyzing probabilities and selecting one or more potential correct matches from the probabilities.

Accordingly, by comparing the data obtained in block 1006 to the data defining the different classes/scenarios, the trained classifier can determine which of the classes is a likely match or best match for the data obtained in block 1006. The collision detection facility may therefore, in block 1008, determine one or more classes that are a likely or best match to the data obtained in block 1006.

In block 1010, based on the class(es) determined in block 1008, the collision detection facility determines whether the potential collision from block 1002 is likely to be or have been a collision. This may include determining whether the class that best matches the data obtained in block 1006 is a class associated with a collision, or whether any of the classes to which the obtained data is a good match is a class associated with a collision. This may alternatively include determining whether a probability of matching to any class associated with a collision exceeds a threshold, or whether a probability of matching any class associated with no collision exceeds a threshold.

If it is determined in block 1010 that a collision is not likely, then in the embodiment of FIG. 10 the collision detection process may end, or return to block 1002 and continue monitoring acceleration over time or otherwise obtaining information regarding another potential collision.

If, however, the collision detection facility determines in block 1010 that a collision is likely to have occurred, then in block 1012 the collision detection facility triggers actions responding to the collision. This may include notifying an operator of a fleet of vehicles of which the vehicle is a member, notifying roadside assistance, notifying emergency services, attempting to contact a driver of the vehicle, or other actions discussed above. Once the actions are triggered, the collision detection facility may end the process 1000, or continue monitoring in block 1002, with either monitoring the vehicle that experienced the collision or monitoring other vehicles.

In some embodiments, the collision detection facility may evaluate a class identified as the most likely match for a potential collision for which data was received and analyzed by the collision detection facility. If the best match determined by the classifier indicates that a collision is unlikely to have occurred, the collision detection facility may not report the potential collision to the organization 100. If, however, the collision detection facility determines that a collision may have occurred, the facility may report the potential collision to the organization 100. In other embodiments, however, the collision detection facility may report to the organization 100 every potential collision it analyzes, but may report the potential collision to the organization 100 together with a value indicating a probability that the potential collision was a collision. A person at the organization 100 (or a vendor for the organization 100) reviewing the report may then analyze the likelihood that the potential collision was a collision and, based on the probability, determine whether and how to respond.

In one example described above of the implementation of block 1002, the time period is defined in block 1004 to be a time period surrounding a time at which a total acceleration exceeded a threshold, which is one example of a way in which information regarding a potential collision may be obtained. In some embodiments, the time at which a total acceleration exceeds a threshold may trigger an analysis of a time period before and after that time, to identify a maximum total acceleration in the time period. This time period may be the same or different from the length of the time period of block 1004. In some such embodiments, once the maximum total acceleration in the time period is determined, the time period of block 1004 is defined based on a time associated with that maximum total acceleration, and data is obtained in block 1006 for that time period.

The collision detection facility was described in connection with the examples of FIGS. 1, 2B and 10 as implementing machine learning techniques, using a trained classifier. It should be appreciated that embodiments are not limited to implementing the trained classifier or the machine learning techniques in any particular manner.

Figure 11A:
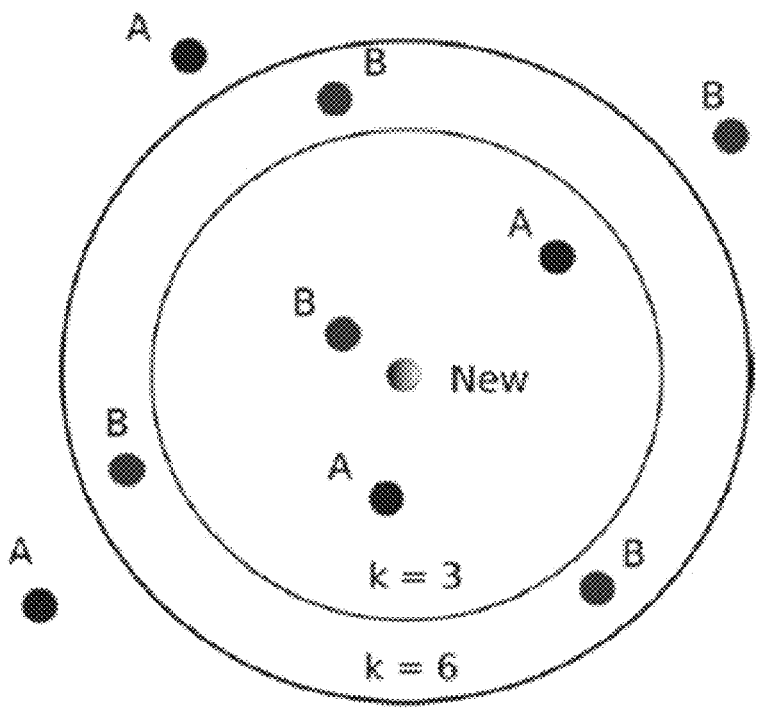
FIGS. 11A-11I illustrate examples of machine learning techniques with which some embodiments may operate.

In some embodiments, machine learning may be implemented using a k-Nearest Neighbor technique. k-Nearest Neighbor (short k-NN) is an example of instance-based learning. This means that the training data is being stored for comparison purposes. New data will be classified by taking a defined number of the closest training data into consideration. The k-NN algorithm is explained in the following example shown in FIG. 11A. The goal is to determine a classification of the "New" data point by considering how similar it is to its neighbors in the graph. The "New" data point is positioned in the graph at coordinates determined by one or more data values associated with the "New" data point. The "k" in the k-Nearest Neighbor algorithm refers to how many other data points are chosen for evaluation. Points are chosen for having a closest linear distance to the "New" data point in the graph. FIG. 11A shows two different options, one with k=3 and one with k=6. When three neighbors are considered, it is seen that two of the three are class "A" while only one is class "B," and thus the "New" data point will be determined to be a member of class "A." On the other hand, in the example where six neighbors are considered, only two of the six are class "A" while the other four are class "B." As such, for the k=6 example, class "B" will be chosen for the "New" data point. k-NN is a good choice for a trained classifier for a small data set with few dimensions, because of its high reliability and computational simplicity in these situations.

Figure 11B:
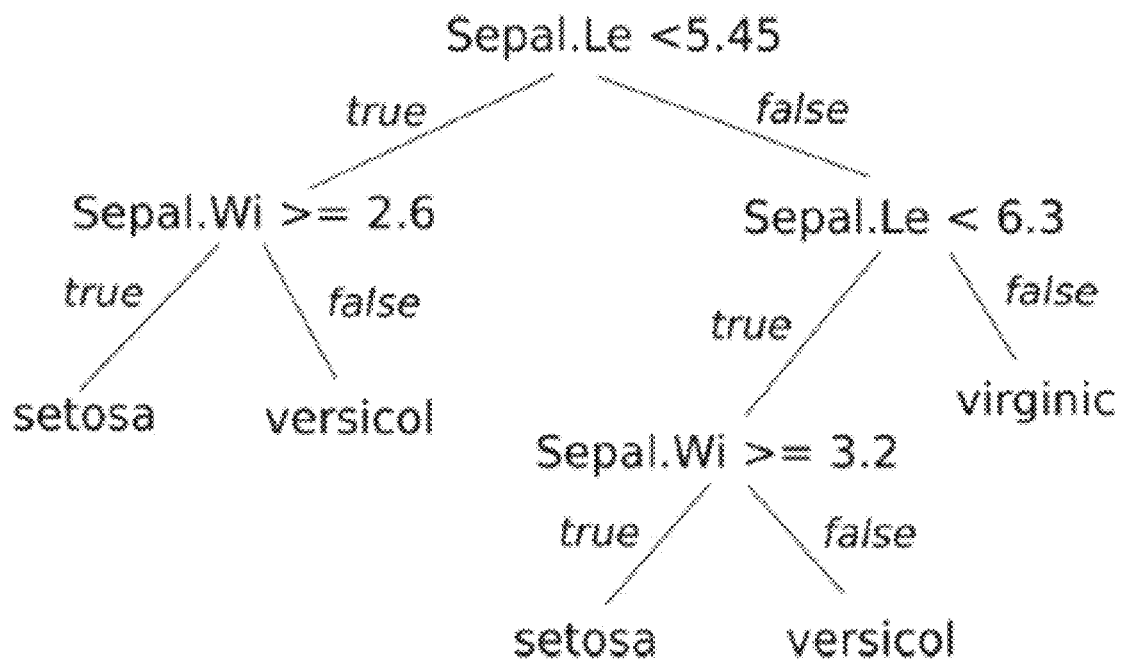
Figure 11C:
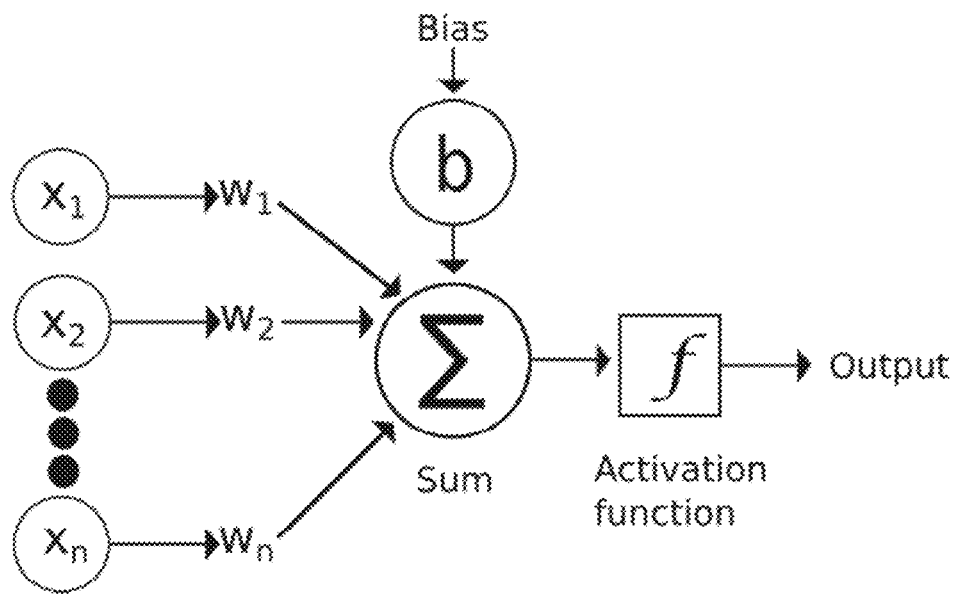

In other embodiments, a Random Forest (RF) technique may be used. RF belongs to the machine learning category called "decision trees" and can be applied to classification tasks. Well-advanced trees which are the foundation of the RF. An RF model is trained by creating a decision tree that can represent most of the training data, by creating paths through the tree to labels reflected in the training data. The tree will then be evaluated for new input data and will output a predicted label at the end of the path. FIG. 11B shows a small decision tree with four branches for classifying specific flowers based on the sepal length and width of the flowers.

One advantage of decision trees is the ease of understanding the model. The predictor space is segmented in a number of simple regions which can be defined by splitting rules. Splitting rules are the basic element of decision trees. One drawback of decision trees, however, is a potentially poor accuracy and a high risk of overfitting the decision tree to the training data. "Overfitting" may occur when a very detailed tree is created with hundreds of nodes that works perfectly on the training data, but has poor results when applied to data not in the training set.

One modification of a standard decision tree algorithm is called "Bagging." This method uses, instead of one decision tree, multiple decision trees. In some cases, hundreds of independent decision trees may be constructed by using a bootstrap sample of the dataset. To classify new input data, the data is processed using all or multiple of the trees and a majority vote is taken over the generated predictions. Bagging can be used for regression and classification tasks.

By adding even more randomness to Bagging, a Random Forest algorithm is implemented. In RF trees, each tree or each node is randomly taking several features of input data into consideration. The random feature selection creates independence around the trees compared to regular Bagging. Most times the algorithm obtains better results than Bagging, because of better variance and bias tradeoffs. Extremely randomized trees take this even further.

In other embodiments, the trained classifier may be advantageously defined using a neural network, such as a convolutional neural network (CNN). The inventors have recognized and appreciated that in some cases, a CNN may provide for higher reliability and accuracy than other machine learning techniques.

Neural networks are implemented as mathematical models that are viewed as something of a metaphor for or simulation of functions of neurons of an organic brain. Some neurons inside of a brain perform a simple task equivalent to outputting an electric signal when the input into the neuron exceeds a predetermined threshold. Warren McCulloch and Walter Pitts designed the first computational model in 1943 that simulated a neuron with the help of mathematics and a threshold logic for the activation. The basic structure of a neuron is displayed in the FIG. 11C. The inputs x1, x2, ..., xn are multiplied with weights named w1, w2, ..., wn. These are then added together with a bias node called b. This value is passed through an activation function. The type of function chosen depends on the use case and implemented layer. A reason to add a bias is for example to shift the activation function, in which case only higher x values would produce an output. The output can be represented as a value z with the following formula:

$$z = b + \sum_{i=1}^{n} w_i x_i$$

Figure 11D:
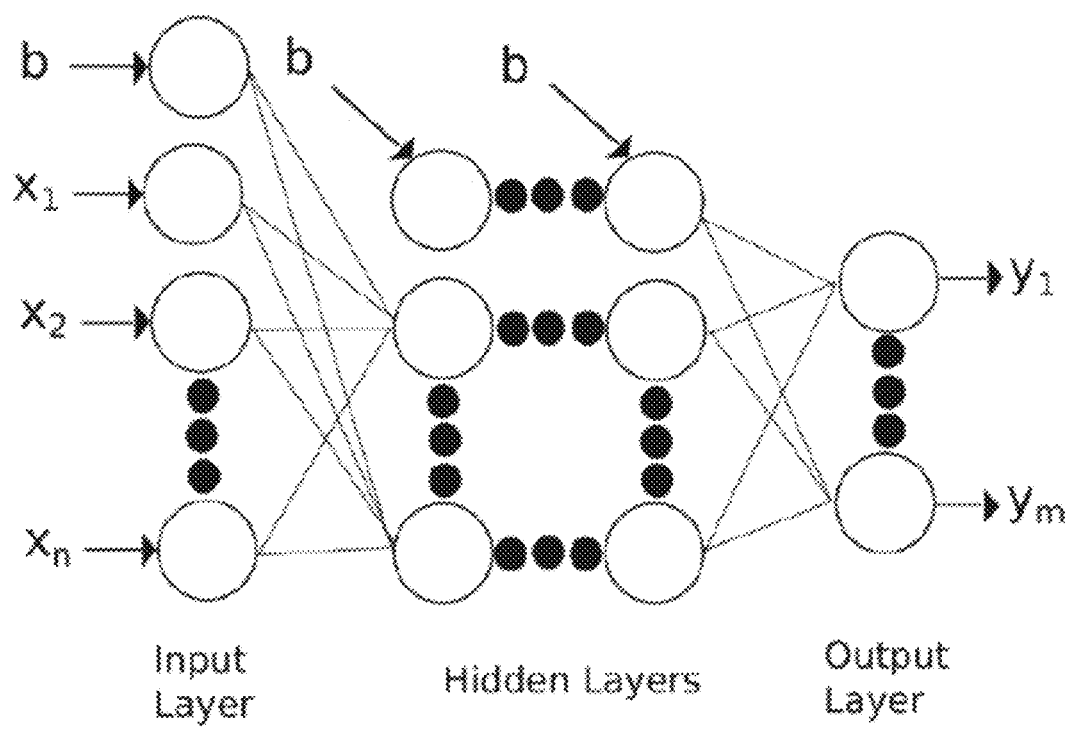

Neural networks have multiple layers of connected neurons, which represent complex nonlinear relationships between inputs and outputs. An example structure of a neural network is displayed in FIG. 11D. The architecture of a fully connected neural network consists of an input layer, hidden layer, and output layer. The number of neurons in each layer can be adjusted. Feed-forward neural networks are the simplest of its kind with information moving in only one direction. The movement starts from the input nodes, goes through the hidden layers, and ends in the output nodes. By implementing multiple hidden layers the NNs are most commonly referred to as Deep Neural Networks (DNN). The example of FIG. 11D is a DNN.

The realization of such complex models is possible through strong computation power and a sufficient amount of data. Adjusting the parameters of the network influences the activation logic behind each neuron. While the network is being trained, the weights of each neuron are adjusted to meet a desired representation of the provided dataset. One training technique, called Gradient Descent (GD), works by finding a minimum of a cost function in an iterative manner A learning rate is defined before and specifies the size each step will take to the minimum. This means that a large learning rate might end up causing a bouncing optimization while, on the other hand, a very small learning rate might take a long time to arrive at the desired representation. During learning, a change in the cost function is analyzed at each step. Once the cost function is not decreasing (or not decreasing substantially) and/or remains on the same level, it is determined that the problem has converged and the NN is trained.

Training Neural Networks can result in perfect representations of the provided training datasets which means bad accuracies for the test dataset. One possibility to prevent Neural Networks from overfitting is called dropout. This technique drops a defined number of neurons inside of the network. Dropout can be implemented at the last layer of the network or between every layer for example.

Another way of improving the network is to change activation functions. Each neuron can be influenced by different types of activation functions. One known example is the sigmoid function. The function's output is always between 0 and 1. The mathematical representation is the following:

$$f(t) = \frac{1}{1 + e^{-t}}$$

In other layers it might be more advantageous to gain only values which are between −1 and 1. This activation function can be realized by the hyperbolic function tanh. It is represented by the following formula:

$$\tanh \tanh(x) = \frac{2}{1 + e^{-2x}} - 1$$

Saturating functions can result in optimization problems, as the gradient equals 0 at large and small x values. Non-saturated activation functions turn out to solve an exploding or vanishing gradient and accelerate the convergence speed. The Rectified Linear Unit, short ReLU, is another activation function. Its output remains 0 for all negative values and does not change for positive values. The ReLU function is represented by the following mathematical formula:

$$f(x) = \max(0, x)$$

The early successes to solve new complex tasks cleared the way to develop new categories of Neural Networks. Compared to early Neural Networks, models available in 2018 are far more advanced and can substitute more and more work done by humans.

When time-series data is to be input to a Neural Network (such as in some embodiments described herein), this may present complexities in Neural Networks. Training simple NNs on time series data would be inefficient, because the network would adjust its parameters on values given to particular time steps. Instead it is more efficient for the network to look for patterns in the structure of the data represented Taking this into consideration, one specific type of Neural Network may be an advantageous option in some embodiments.

Convolutional Neural Networks (CNNs) are a subclass of Neural Networks. With the amount of collected data in some scenarios (e.g., for image recognition), a Neural Network can get very complex and hard to train. CNNs can produce very close accuracies and use less connections as well as parameters. This makes them very powerful and easier to train.

The main difference between a CNN and a standard NN is that the sum presented in the neural formula for the NN is substituted by a convolutional operation. These layers are called convolutional layers. Furthermore, CNNs often have layers that reduce the resolution of the data, referred to as pooling layers. The architecture of the network is separated into at least convolutional layers, pooling layers, and an output layer.

Convolutional layers determine which inputs are fed into each neuron, potentially with the help of filters applying filter parameters. These filters can be constructed using different sizes, defined by a kernel variable. The purpose of a filter is to evaluate data and multiply each filter parameter with a respective value in the input, which may be considered akin to element-by-element multiplication of matrices.

Figure 11E:
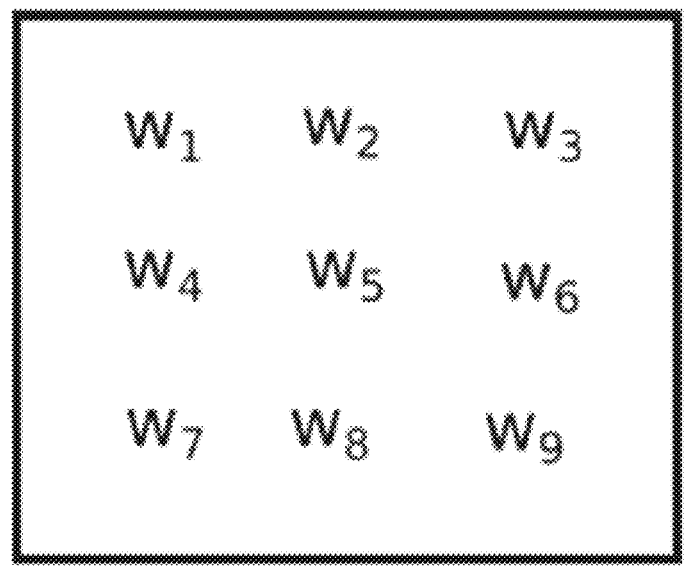

The filter will typically create exactly one output for each portion of input data. The manner in which the filter evaluates the input data can be defined by changing the "stride value." A stride of 1 would mean the filter moves one data value at a time. The result of all operations creates new data having the same data size as the input data. One example filter with the dimensions 3×3 is shown in FIG. 11E. The parameters inside the filters are randomly chosen before training the network.

Figure 11F:
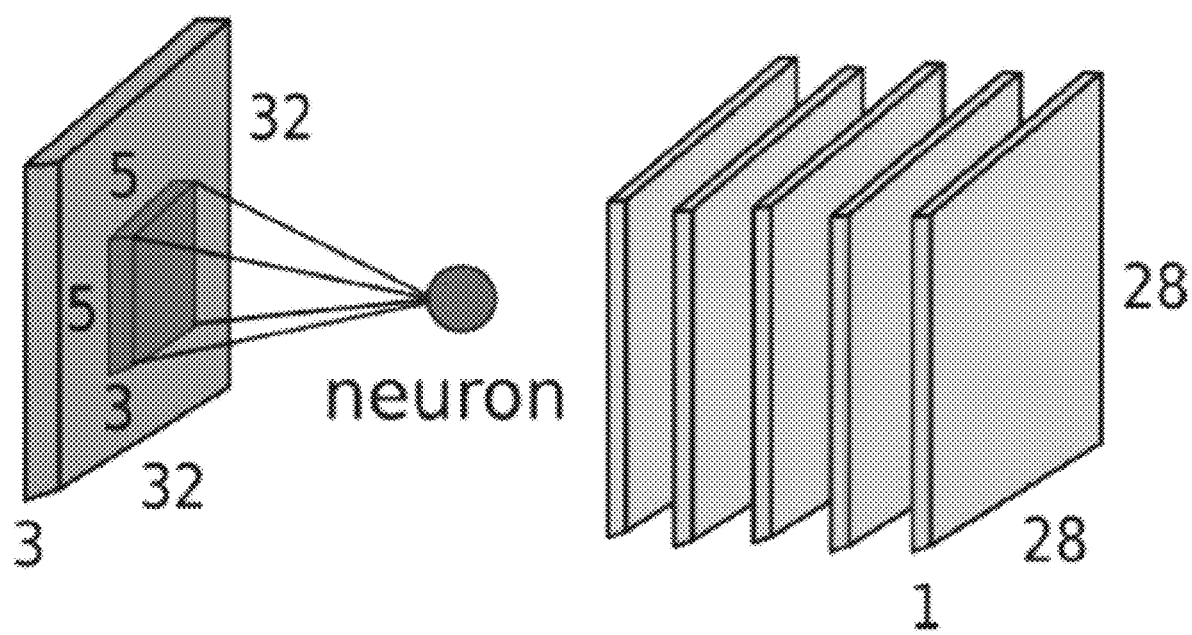

FIG. 11F represents input data having dimensions of 32×32×3. The input data has data dimensions of 32×32×3. The filter is defined with dimensions of 5×5×3, and is displayed in FIG. 11F in the middle of the input data. The filter convolves over the image with defined steps, called strides, to process each grouping of input data with the filter. Since in this case the filter only moves one step at a time, the stride is equal to one. The output will be of size 28×28 times the number of filters used. In this example, 5 filters are used. Therefore, the output would be 28×28×5. In this first layer, each filter would include 76 parameters, resulting from the size 5*5*3 dimensions and one bias parameter. This adds up to a total of 380 parameters used across five filters. Training the network would mean changing the values of the 380 parameters in a way that the network could better differentiate the different labeled data.

The output of each neuron in CNNs may also depend on the type of activation function used. The activation function tan h, discussed above, converges much more slowly during training, because of the saturating nonlinearity. ReLUs may show faster training. As a result, it may be advantageous to use ReLUs as the activation function in some or all layers, or in some embodiments in all layers except the last layer.

Figure 11G:
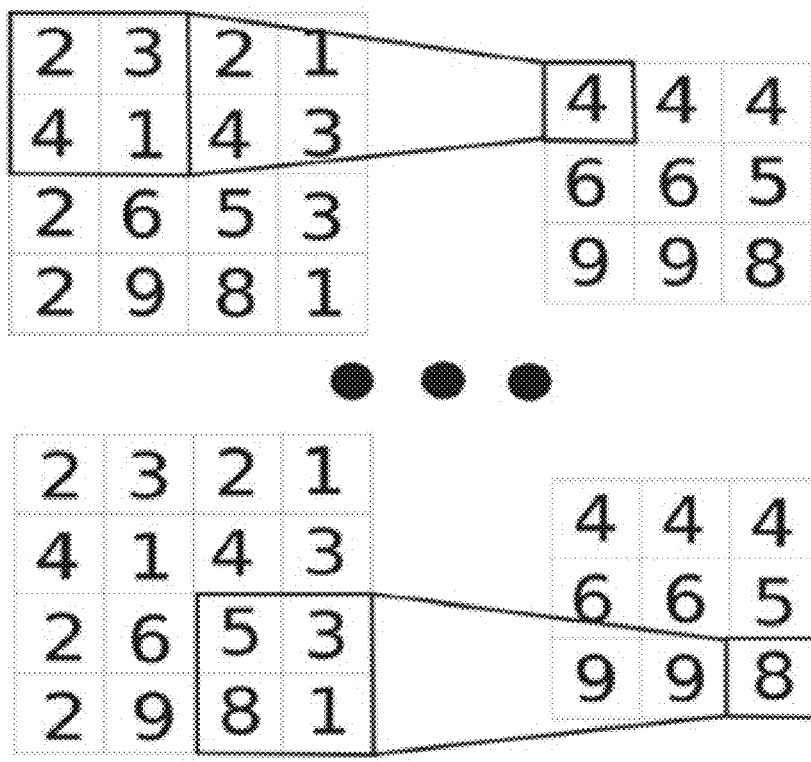

Convolutional layers are often followed by pooling layers, which decrease the resolution of the data. One example is shown in FIG. 11G, with a pooling layer performing a reduction from 2×2 values to only one value, to reduce overall data from dimensions of 4×4 to dimensions of 3×3. This is done by choosing the maximum value of the 4 values identified by a pooler. Other pooling techniques take the average of all values for reduction. This pattern of convolutional layers and a followed pooling layer may be repeated several times in architectures of some embodiments.

The last layer, called the output layer, will flatten the data, and use each data value as an input for a fully connected neural network layer, which is a common layer of a NN, as discussed above. A SoftMax activation function may be used to make sure that, for a classification problem, the different prediction likelihoods for different classes sum to 1. The mathematical representation of this method is represented by the following formula:

$$\sigma(z)_j = \frac{e^{z_j}}{\sum_{k=1}^{m} e^{z_k}}$$

Figure 11H:
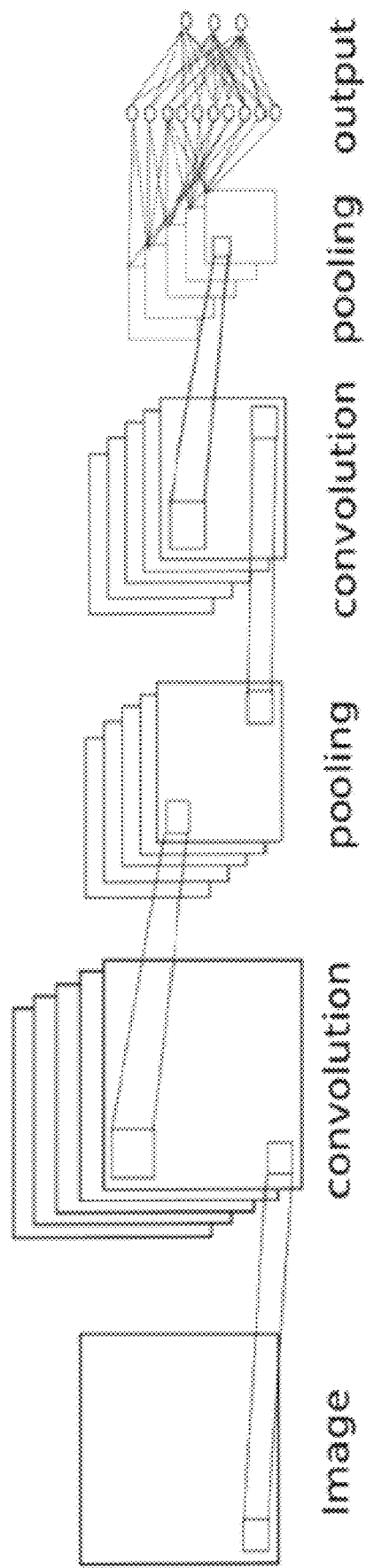

FIG. 11H shows an example of a CNN architecture with two convolutional layers and two pooling layers.

For training a CNN, one technique called mini-batch stochastic gradient descent may be used. The method can be described in 4 steps that are sequenced in each iteration:
1) Take a sample of data, defined as batch
2) Forward propagate the input through the network to receive the loss
3) Use backpropagation to calculate the gradient
4) Update the parameters by a defined learning rate using the gradient This procedure is repeated for all batches. Epochs that were also defined before setting the amount of training of the Neural Network may also be used to successively train the network on the input data, with an epoch being a complete pass of all the training data through the CNN. In particular, in each iteration of an epoch, a number of samples of training data equal to a batch size are processed. An epoch may include multiple iterations, to process all of the training data during the epoch. By training the neural network in multiple epochs, the training data may be input to the neural network multiple times.

In some embodiments operating in accordance with techniques described herein, a CNN may be trained (e.g., using Gradient Descent or another technique) to identify different classes of vehicle data, associated with whether a collision occurred and/or with different characteristics of collisions (e.g., severity, angle of impact, etc.). In some such embodiments, a batch size of 150 may be chosen, and the CNN may be trained over 200 epochs. The CNN of some embodiments may include an input layer followed by four sets of layers, where each set includes two convolutional layers followed by a pooling layer that reduces the data dimensions by two and a dropout of 25% to mitigate risk of overfitting, and a fully-connected output layer that flattens and combines all dimensions with a SoftMax function to ensure the likelihoods for the set of classes/predictions sum to 1.

CNNs are mostly used in image classification problems. Such networks are configured for use with data (e.g., image pixels) with defined positions. Transferring this thinking to a time series, the time series also has values that happen to a certain point in time. This can create a requirement, though, that the time series be uniformly sampled, to have fixed positions in time. In some embodiments, input data may include a time series with five dimensions (acceleration in x, y, z; magnitude of total acceleration; and speed) which each have values for every 10 ms over a time frame of 20 seconds. The CNN may be trained with this data to find patterns automatically, which can be used to classify other data.

When implementing the convolution, it is possible to convolve over the time series with a one-dimensional filter that will create another time series. In some embodiments, the filter may be chosen to have a kernel size of 5. This means that the filter will consider five steps, which is equal to 50 ms over the time series. Since the input data has five channels (the acceleration in x, y, z; the magnitude; and speed), the filter of this example will be of size 5×5. That means every filter contains 25 parameters, which may be initialized with a random number and change through the training process. One formula to calculate the number of parameters per layer may be the following:

total_params_per_layer=(filter_width*channels+ 1)*number_of_filters

The number one that is added inside of the bracket represents a bias that is included in every neuron.

Figure 11I:
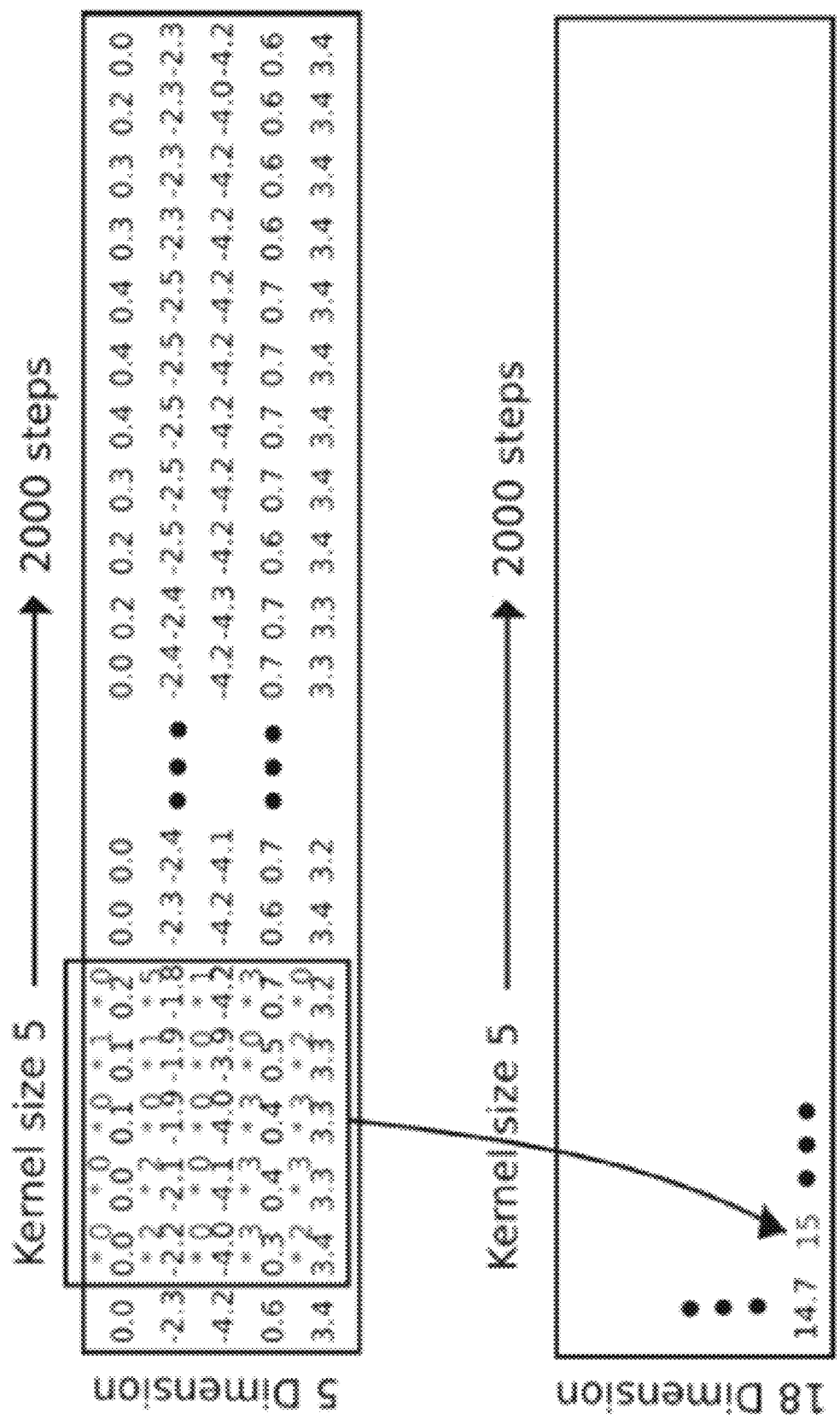

The process of convolving over the time series is described in FIG. 11I for the first convolutional layer. The filter that starts from the left with the size 5×5 is doing an elementwise multiplication and writes the result into the next time series below. With a padding defined as the same, the size of the time series that is created will be equal to the original one. This is done by adding zeros to the end of the time series and convolving over these as well. By using 18 filters the resulting output will be a time series of 2,000 steps with 18 channels.

The number of filters chosen will determine the number of new channels for the input of the next layer. In some embodiments, 18 filters may be chosen for the first layer. This means the second convolutional layer will take a time series as input which consists of 18 dimensions. Using another kernel size of 5 will create a new filter which has dimensions 5×18. For this filter 90 parameters are trained for each filter.

As discussed above, in some embodiments the CNN architecture may include four parts, in which each has a one-dimensional convolutional layer followed by another one-dimensional convolutional layer without decreasing the step size and, after these two layers, a pooling layer that decreases the step size by two and addition of a dropout of 25% that prevents the network from overfitting. These four parts are connected in sequence and feed into a fully connected layer that combines all dimensions and a SoftMax returns three predictions for the three defined classes.

Figure 12:
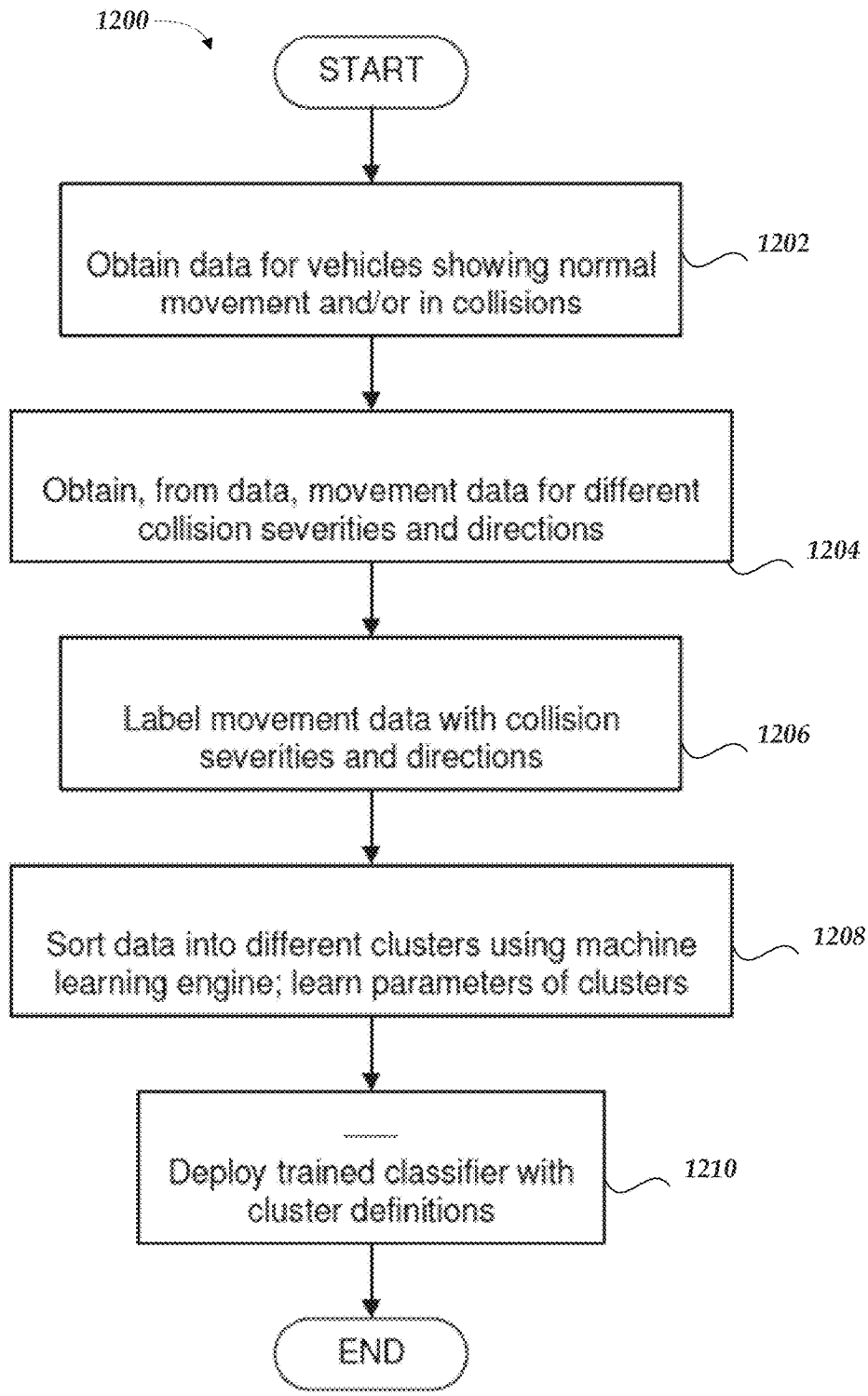
FIG. 12 is a flowchart of a process that may be implemented in some embodiments to train a classifier.

FIG. 12 illustrates one or more techniques that may be implemented in some embodiments to train a neural network (e.g., a CNN) to implement a classifier that may be used by a collision detection facility, in accordance with techniques described herein.

The process 1200 of FIG. 12 may be performed during a configuration phase, in which a collision detection facility is configured prior to use such as in the process 250 of FIG. 2B and the process 1000 of FIG. 10. The configuration may be performed by an administrator, such as a human administrator, setting up the collision detection system for the subsequent use.

The process 1200 of FIG. 12 begins in block 1202, in which data describing vehicles moving in normal movements and/or data describing vehicles engaged in collisions is obtained. Data describing normal movements may be used to train a classifier to recognize data that is associated with movements that are not collisions, to define one or more classes associated with normal driving or otherwise not-collisions. Data describing vehicles engaged in collisions may be used to train the classifier to recognize data that is associated with collisions or with different types of collisions, such as with collisions of different severities or collisions with different impact angles. The data that is obtained in block 1202 may include acceleration data or other movements of movement data described above (magnitude of total acceleration, speed), or other data describing a vehicle (e.g., ECU or OBD data). The data that is obtained may be for a time period that matches the time period used by the collision detection facility (e.g., that was defined in block 1004 of FIG. 10, or block 254 of FIG. 2B).

The data obtained in the process 1200 may not be labeled or curated data, and may not be arranged in a way that a classifier could be clearly trained on. For example, the data may be mixed together, with data for different scenarios not labeled or differentiated. To train the classifier, it may be helpful to at least differentiate and train the data, as there may be some advantages to supervised or semi-supervised training rather than relying solely on unsupervised learning.

Accordingly, in block 1202, the data describing vehicles engaged in collisions may be separated out in block 1204, such that data associated with different collision scenarios is separated. This process may be manual or automatic, depending on what data is available as a basis for which to conduct a differentiation. Data associated with not-collisions may not be differentiated in some embodiments, resulting in one class being trained that has features for all different types of normal movements. In other embodiments, though, different classes of not-collisions may be defined to aid in more reliably identifying not-collisions.

Once the data is separated in block 1204, in block 1206 the different categories of collisions or other information may be labeled with whether they reflect a collision or characteristics of the type of collision they reflect (e.g., severity, angle of impact). In block 1208, the labeled data may then be separated into clusters by a machine learning engine and features identified with each cluster identified by the machine learning engine, to define the clusters and define the classes. It is these features that will then be used to subsequently match data for a potential collision to a class, by looking for a potential match between the data. To repeat an example from above, a straightforward rear-end collision may include movements that are primarily forward-backward movements, while a collision in which the vehicle is struck broadside by another vehicle may be associated with primarily right-left movement data. The trained classifier may, based on the labeled data from block 1206, draw these same conclusions by observing that the rear-end collision is associated largely with forward-backward movement data while a broadside collision is largely associated with right-left data.

Based on these learned parameters of each of the clusters, a trained classifier is created that includes each of the classes defined from the clusters. The trained classifier may then be used by a collision detection facility, such as in the manner described above.

While not discussed above in connection with FIG. 12, it should be appreciated that it would be advantageous if, when movement data is obtained in block 402 that is for a time period, the data would include samples generated at the same time scale (e.g., same interval), and over the same period of time, as the data that will be collected by a collision detection facility for a potential collision. Including the data for the same length of time period and for the same interval may ease classification of the data input for a potential collision, as the input data will be temporally aligned with the training of the classifier. In some embodiments, the time period may be 20 seconds and the sampling rate for the movement data may be 10 ms, meaning there are 100 samples per second.

In some cases, the data that is obtained in block 1202 to be used in training a system may not be aligned in this manner with the data that will be collected by a collision detection facility. For example, the data may be for a shorter or longer time period, or may include samples generated at a different interval. The movement data may therefore be prepared for training in some embodiments, by generating data for the same time period and at the same interval. If the input data is for a longer time period, the data may be truncated to match the desired time period length. If the time period is shorter, additional data may be generated by interpolating the available data. As another example, if the input data includes samples at a different interval than the data will later be collected by a collision detection facility, such as a slower or faster sampling rate, the input data will be sampled and/or interpolated to generate data at the desired time intervals and for the desired time period. For example, data points in the input data that are adjacent to a time at which a data point is desired (for a time that aligns with the desired sampling rate) will be interpolated to generate the desired data point.

In some embodiments, Dynamic Time Warping (DTW) is used to process input time series data and prepare it for analysis using the trained classifier.

In some embodiments, the magnitudes of input data points may also be normalized based on the scale of input training data, to yield values that are on a similar scale.

In this manner, a classifier can be trained based on collision data to generate information on whether a collision has occurred and, if so, one or more characteristics of that collision.

FIGS. 13A-13E illustrate examples of data with which some embodiments may operate, as an example of how techniques described herein may be implemented in some embodiments.

Figure 13A:
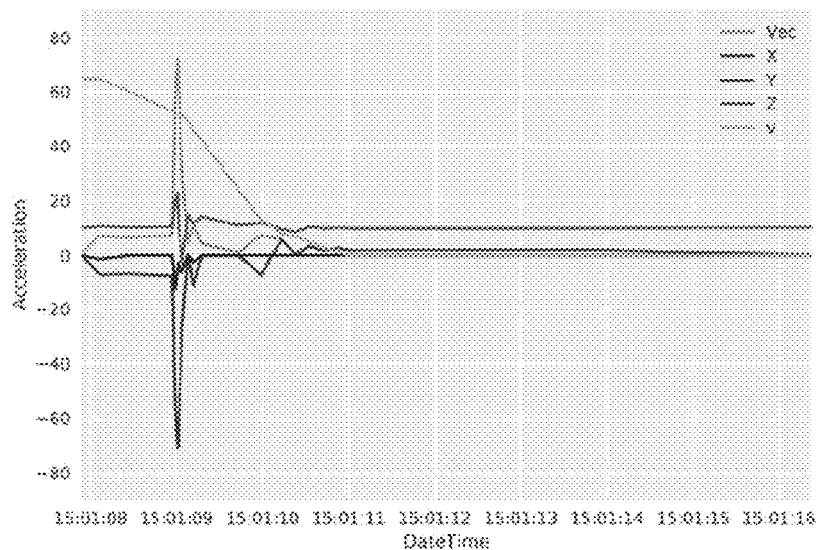
FIGS. 13A-13E show values associated with an illustrative implementation of some techniques described herein.
Figure 13B:
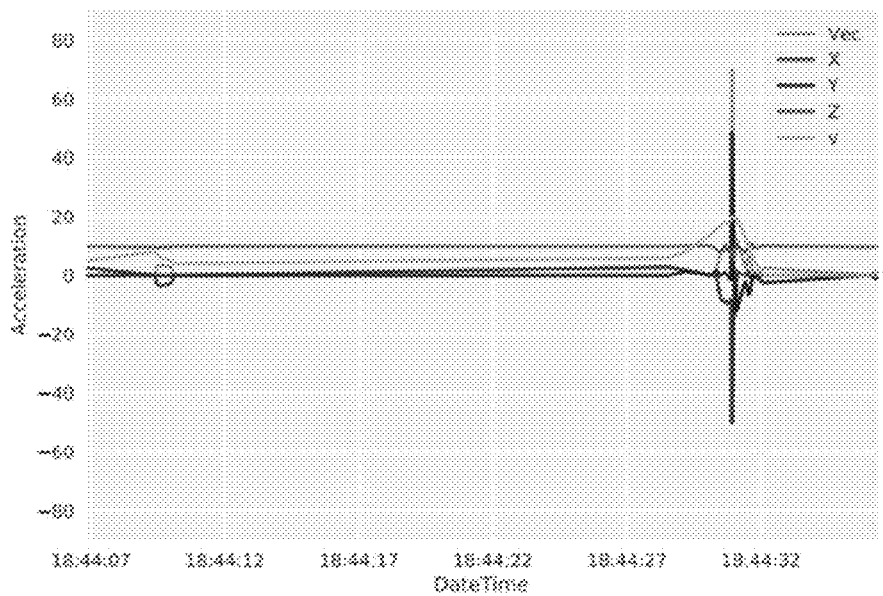
Figure 13C:
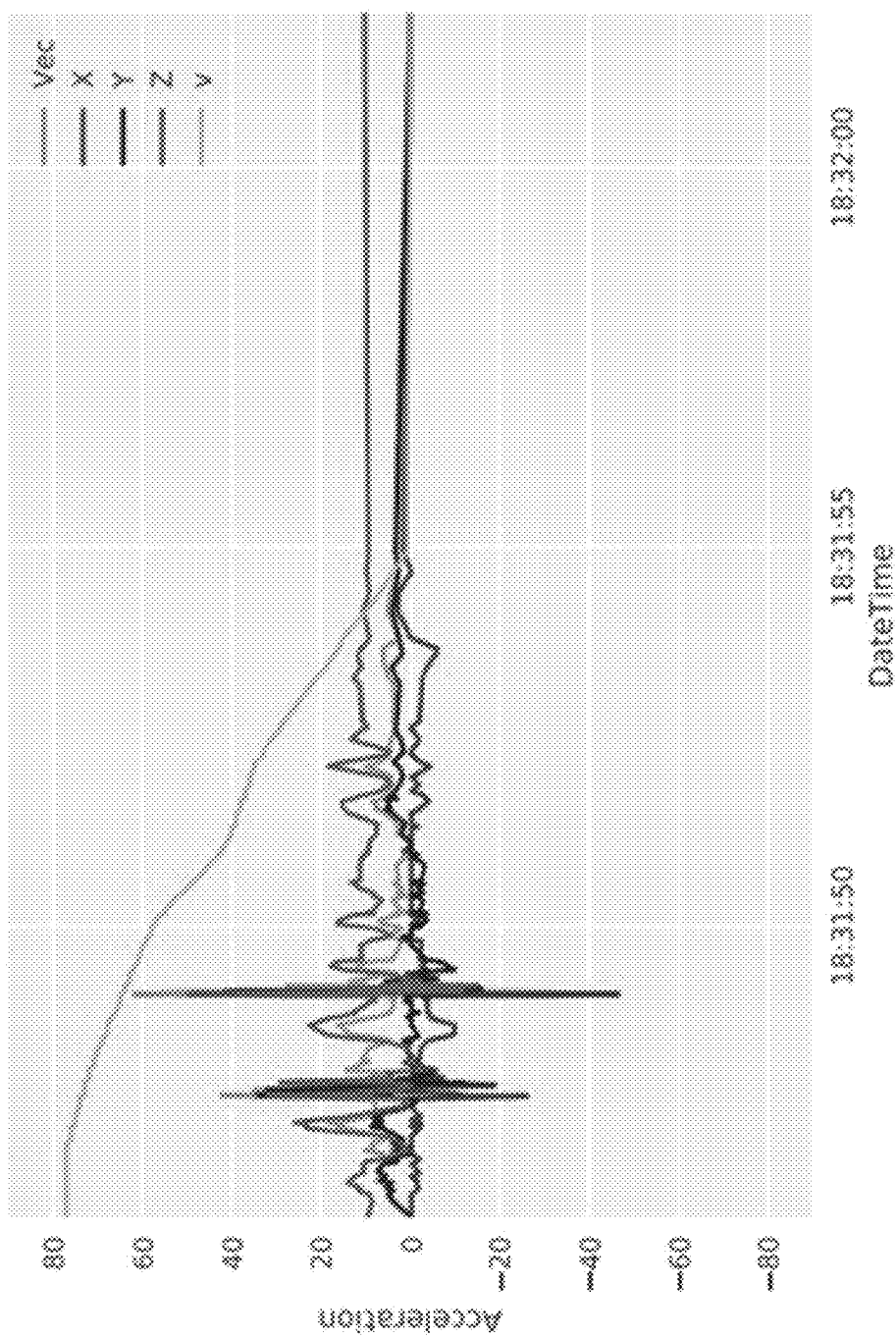

FIGS. 13A-13C illustrate examples of graphs of movement data that may be used to train a classifier or that may be compared to a trained classifier to determine whether a collision occurred and/or to characterize the collision. The example of FIG. 13A is associated with collisions in which a vehicle is rear-ended or hits an object (e.g., another vehicle, or an obstacle) straight on with its front end. These are forward-backward collisions. The graph of FIG. 13A includes lines for accelerations in x (forward-backward), y (right-left), and z (up-down) directions for the vehicle, as well as a magnitude of total acceleration at a time ("vec"), and a speed v. The x-axis of this graph is a time period for a collision, such as the time period discussed above in connection with block 1004 of FIG. 10 or 254 of FIG. 2B, with the time between each point representing the sampling interval. As can be seen from the graphs of the x, y, and z accelerations, the collision included little y (right-left) or z (up-down) acceleration and instead largely consists of negative acceleration (deceleration) in the x direction (forward-backward). This is because, in a typical forward-backward collision like a rear-ending, most of the acceleration change is in the forward-backward direction. The classifier may learn that pattern and subsequently identify situations in which the change in acceleration is largely in the x direction as forward-backward collisions like a rear-ending.

FIG. 13B illustrates an example of a graph in which a vehicle was struck from an angle, not from a forward-backward direction. The graph of FIG. 13B includes the same lines for the same variables as the graph of FIG. 13A. The graph of FIG. 13B demonstrates that in angled collisions, there is change in acceleration in both the x direction (forward-backward) and the y direction (right-left), though little change in the z direction (up-down).

FIG. 13C illustrates an example of a graph in which a vehicle, as part of a collision, left the road. The graph of FIG. 13C includes the same lines for the same variables as the graphs of FIGS. 13A and 13B. As can be seen in the graph of FIG. 13C, when the vehicle leaves the road, there may be substantial changes not only in the x and y directions, but also in the z direction (up-down). In each of these lines, there is substantial change over time, showing that the vehicle moved quite a bit as part of this accident.

Figure 13D:
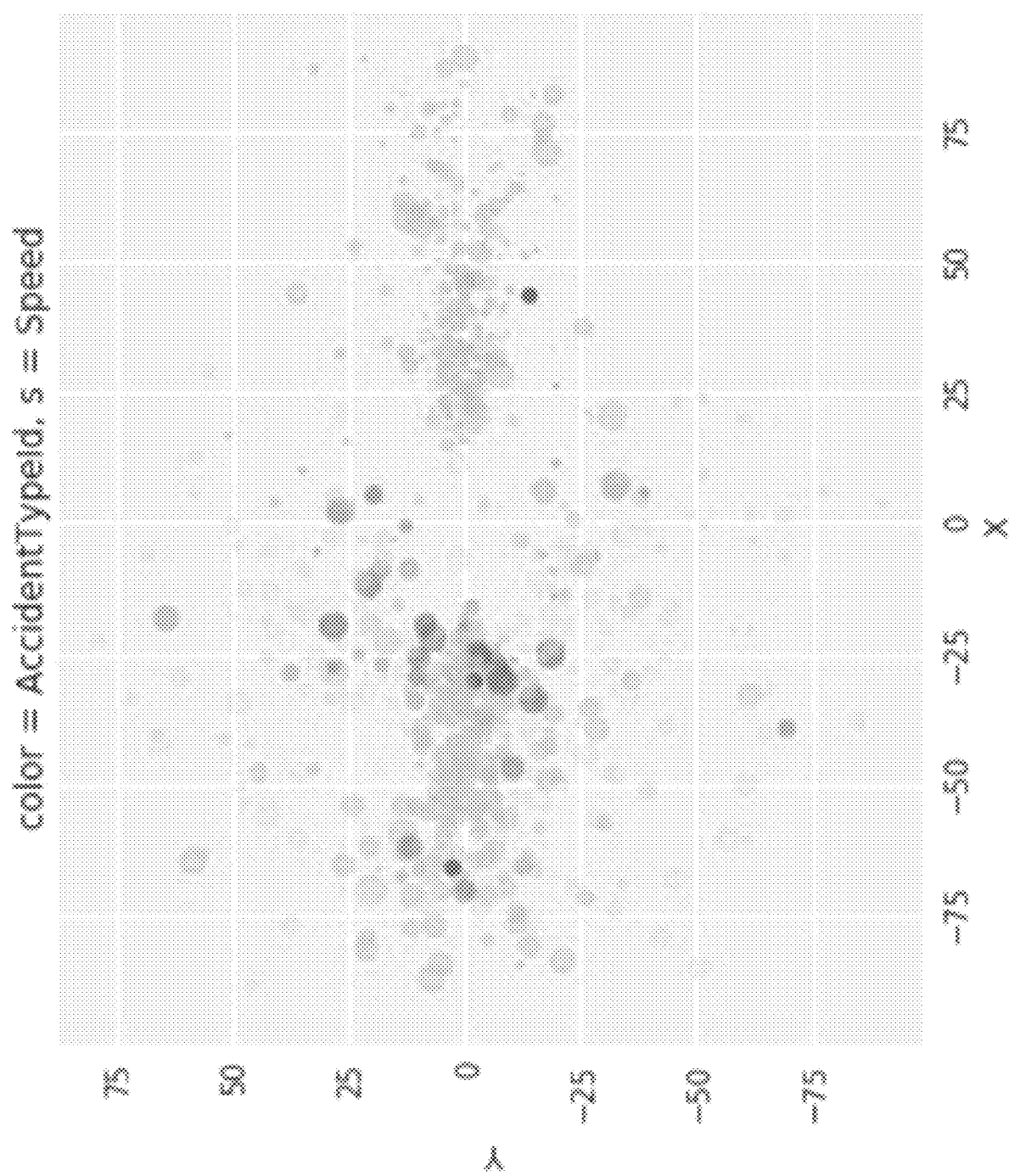

Data for different forms of collisions is illustrated in FIG. 13D, formatted as a scatterplot based on the x and y accelerations with color of the dot indicating accident type and size of the dot indicating speed. A collection of bright blue dots is spread throughout the middle of the graph, clustered in a band around the 0 value on the y-axis but spread throughout the x axis. These are dots associated with different forward-backward collisions, confirming again that a forward-backward collision has little change in the y direction (right-left). The green dots, however, show varying values for change in the y direction (right-left) and are all associated with negative change (deceleration) in the x direction (forward-backward). These are points associated with angled impacts, where there is substantial change in the right-left direction and the vehicle slows down substantially in the forward-backward direction.

Figure 13E:
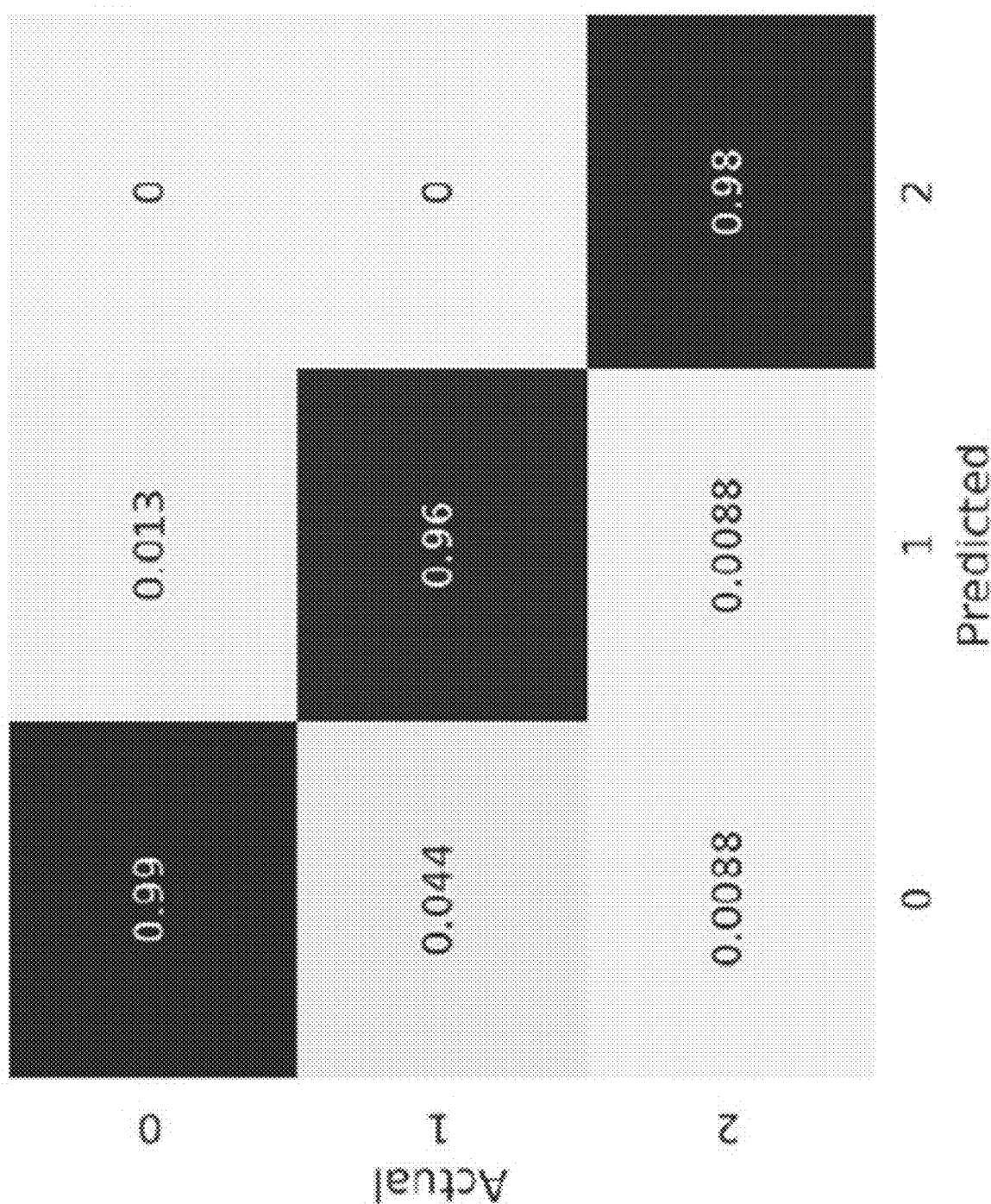

As discussed above, attempting to detect or characterize a collision using only acceleration data from a single point during an accident is unreliable. Using techniques described herein, which obtain longitudinal movement information for a time period surrounding an event associated with a potential collision, or other information obtained for a vehicle for that time period, may be highly reliable. FIG. 13E shows a chart demonstrating this high reliability, with low false positions or false negatives. In the chart, a "1" category is not a collision, a "2" category is a forward-backward collision, and a "3" category is an angled impact collision. The graph shows the predictions generated by a system trained using the data of FIG. 13D, compared with the actual scenario. As shown by the chart, the trained classifier will accurately determine, in 98.7% of cases, that no collision occurred when there was, in reality, no collision. The classifier never identifies data related to a not-collision as reflecting an angled-impact collision, and only 1.3% of the time, incorrectly identifies the not-collision as being a forward-backward collision. Similarly, the trained classifier properly identifies, in 95.6% of cases, that a forward-backward collision is a forward-backward collision, with the remaining cases limited to misidentifying the scenario as a not-collision. Lastly, the trained classifier correctly concludes, in 98.2% of cases, that an angled-impact collision is an angled-impact collision, with the misidentifications evenly spread, in less than 1% of cases, between not-collisions and forward-backward collisions.

Accordingly, the trained system is highly reliable in determining whether a collision occurred and, if so, in characterizing an angle of impact of the collision. The collision detection facility of some embodiments described herein can therefore be reliably used to determine whether a collision has occurred and, if so, characteristics of the collision, to determine an appropriate response to the collision.

Techniques operating according to the principles described herein may be implemented in any suitable manner Included in the discussion above are a series of flow charts showing the steps and acts of various processes that determine whether a collision occurred and/or, if so, to characterize a collision. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1406 of FIG. 14 described below (i.e., as a portion of a computing device 1400) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

Figure 14:
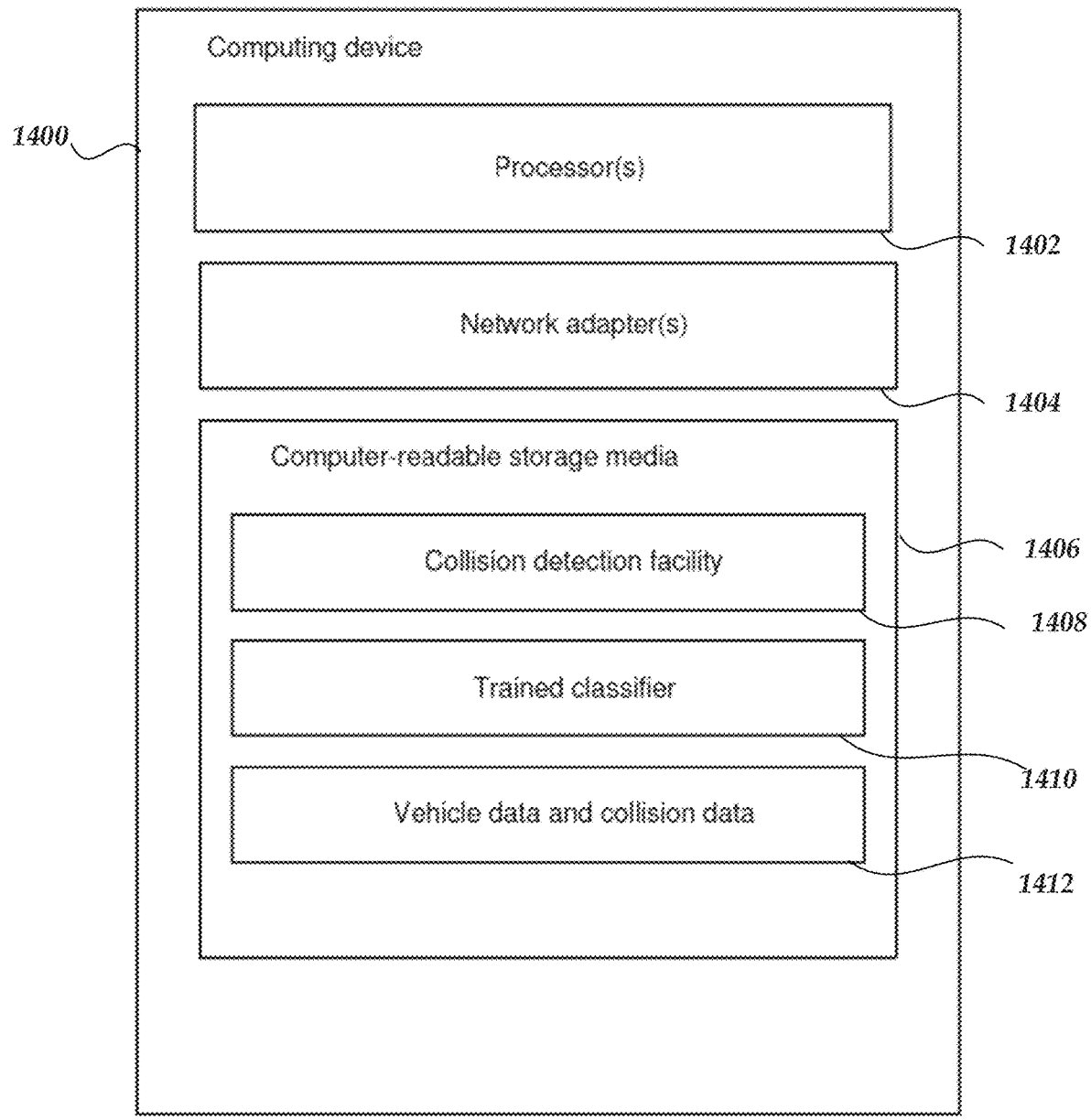
FIG. 14 is a block diagram of a computer system with which some embodiments may operate.

FIG. 14 illustrates one exemplary implementation of a computing device in the form of a computing device 1400 that may be used in a system implementing techniques described in FIGS. 1-13E, although others are possible. It should be appreciated that FIG. 14 is intended neither to be a depiction of necessary components for a computing device to operate a collision detection facility in accordance with the principles described herein, nor a comprehensive depiction.

Computing device 1400 may comprise a processor 1402, a network adapter 1404, and computer-readable storage media 1406. Computing device 1400 may be, for example, a desktop or laptop personal computer, a personal digital assistant (PDA), a smart mobile phone, a server, or any other suitable computing device. Network adapter 1404 may be any suitable hardware and/or software to enable the computing device 1400 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable storage media 1406 may be adapted to store data to be processed and/or instructions to be executed by processor 1402. Processor 1402 enables processing of data and execution of instructions. The data and instructions may be stored on the computer-readable storage media 1406.

The data and instructions stored on computer-readable storage media 1406 may comprise computer-executable instructions implementing techniques which operate according to the principles described herein. In the example of FIG. 14, computer-readable storage media 1406 stores computer-executable instructions implementing various facilities and storing various information as described above. Computer-readable storage media 1406 may store a collision detection facility 1408, a trained classifier 1410 for the collision detection facility 1408 (including definitions of classes for the classifier), and data 1412 that includes vehicle data, collision data, driver behavior data, which may be collected for a potential collision and analyzed by the collision detection facility 1408 and/or used to train the classifier 1410 for subsequent use in analyzing data regarding a potential collision.

While not illustrated in FIG. 14, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Acceleration Direction Frame of Reference

Figure 15:
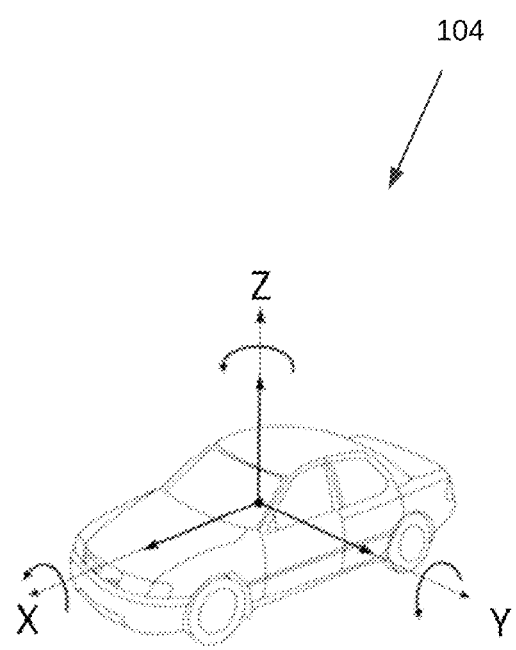
FIG. 15 shows a vehicle along with a frame of reference for acceleration in cartesian coordinates.

FIG. 15 depicts an axis frame of reference for a vehicle 104. As shown, the X axis is along the longitudinal axis of the vehicle 104, the Y axis is perpendicular to the X axis and together therewith lie in the horizontal plane of the vehicle 104 when the vehicle 104 is being driven on a road. The Z axis is in the vertical direction and is perpendicular to the horizontal plane of the vehicle 104, when the vehicle 104 is being driven on a road.

Medium and High Acceleration Events

Acceleration events having acceleration values ranging from 1 g to 2.5 g are considered "medium acceleration events" with a potential of being indicative of "minor collisions". Examples of "minor collisions" include impacts received by a vehicle while the vehicle is parked, and low-speed impacts. Medium acceleration events occur more often than "high acceleration events" having acceleration values of 2.5 g and higher. High acceleration events having acceleration values of 2.5 g and higher are typically major collisions. The harsh events pipeline 700 of FIG. 7 has a low granularity of acceleration data captured and recorded therein. As such, the harsh events pipeline 700 does not allow for reliable detecting of minor collision events effectively.

A pipeline based on high-rate data not only allows detecting minor collisions, but has also been shown to detect high acceleration events having acceleration values of 2.5 g with higher accuracy and increased confidence. This will be explained in detail below.

Acceleration Sampled at a High Rate Vs Acceleration Sampled at a Low Rate

Figure 16A:
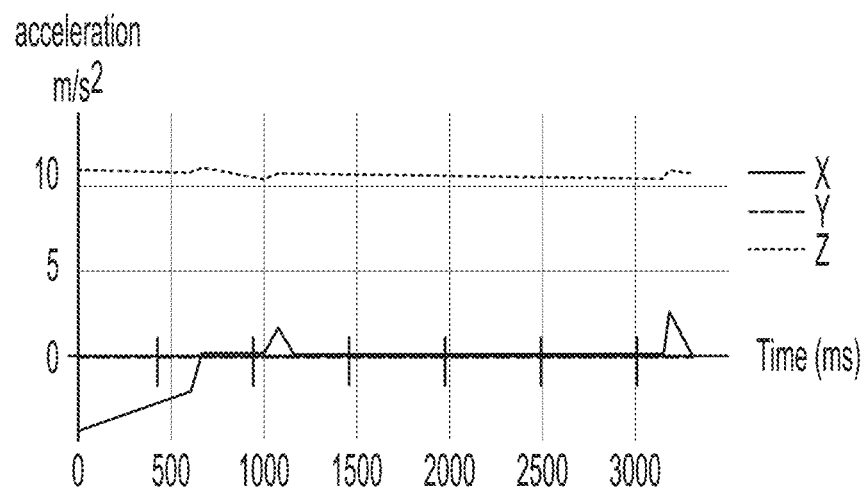
FIG. 16A is a graph showing compressed or smoothed acceleration values for an event captured at a low-rate.
Figure 16B:
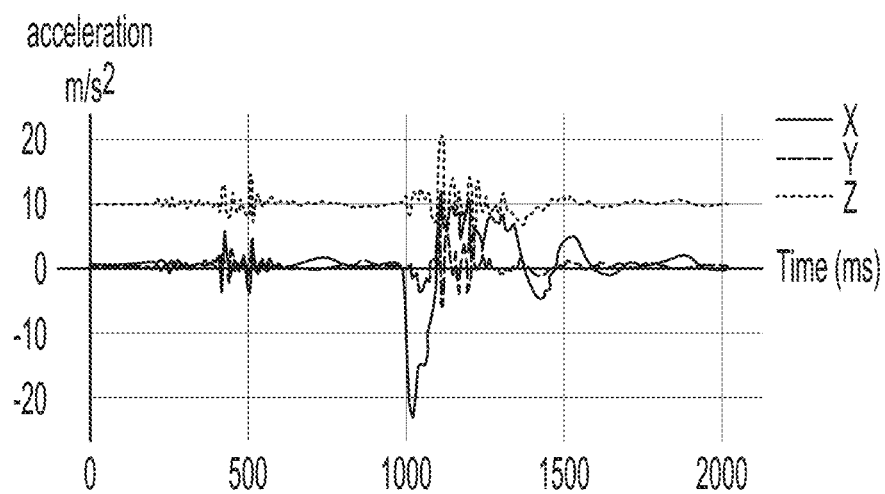
FIG. 16B is a graph showing raw acceleration values for another event captured at a high rate.

Telematics data is generally compressed in order to efficiently store and transmit large amounts of records. The compression, however, when applied to acceleration data can flatten the acceleration data such that some collision events may be missed. This is especially the case for minor collisions (i.e., collisions which cause minimal or minor damage). Minor collisions are characterized by acceleration points having relatively low values, which can be as low as 1 g. When acceleration data is sampled at a low rate, such as 10 Hz, some acceleration values are missed (not sampled), and the compression algorithm may flatten out the acceleration curve such that minor collisions are missed (removed by the flattening/smoothing algorithm). Implementing a captured logic that is capable of capturing high frequency (i.e., 100 Hz) provides acceleration data having a high enough granularity for capturing minor collision events. FIG. 16A shows the acceleration data captured at a low capture rate (i.e., a low sampling frequency such as 10 Hz), and smoothed out using a compression algorithm. FIG. 16B shows acceleration data captured at a high capture rate (i.e., a high frequency such as 100 Hz). As can be seen, there are many acceleration events that are not captured when the accelerometers of a telematics monitor are not sampled at a higher rate. For example, FIG. 16A shows no events of interest, whereas FIG. 16B shows significant events. Specifically, the high-rate acceleration data in FIG. 16B shows that the vehicle has reached an acceleration in the X direction of over 2 g (i.e., 19.6 m/s2), whereas the low-rate data of FIG. 16A indicates that no event of interest has occurred at all. This demonstrates the need to use a higher frequency dataset for detecting collisions.

Detecting and Characterizing Minor Collisions

One problem that the inventors attempt to solve in this disclosure is detecting minor collisions by using high-rate acceleration data. By using the high-rate acceleration data, acceleration triggers that would not otherwise be detected when using low-rate acceleration data are captured. As such, potential minor collisions that would not otherwise be detected are detected. Additionally, as will be described below, the high-rate acceleration data facilitates improving the "acceleration context" described above and which is used to better characterize collisions, using classifiers for example.

False Positives

Figure 17A:
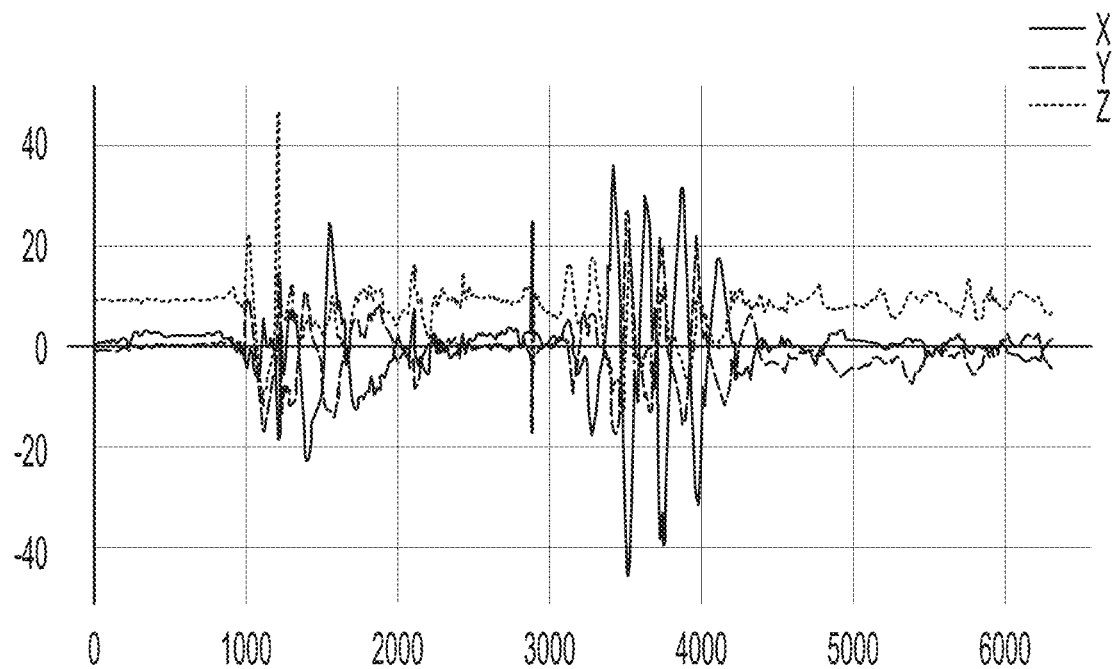
FIG. 17A is a graph showing a noisy acceleration profile captured by a badly installed telematics monitor.
Figure 17B:
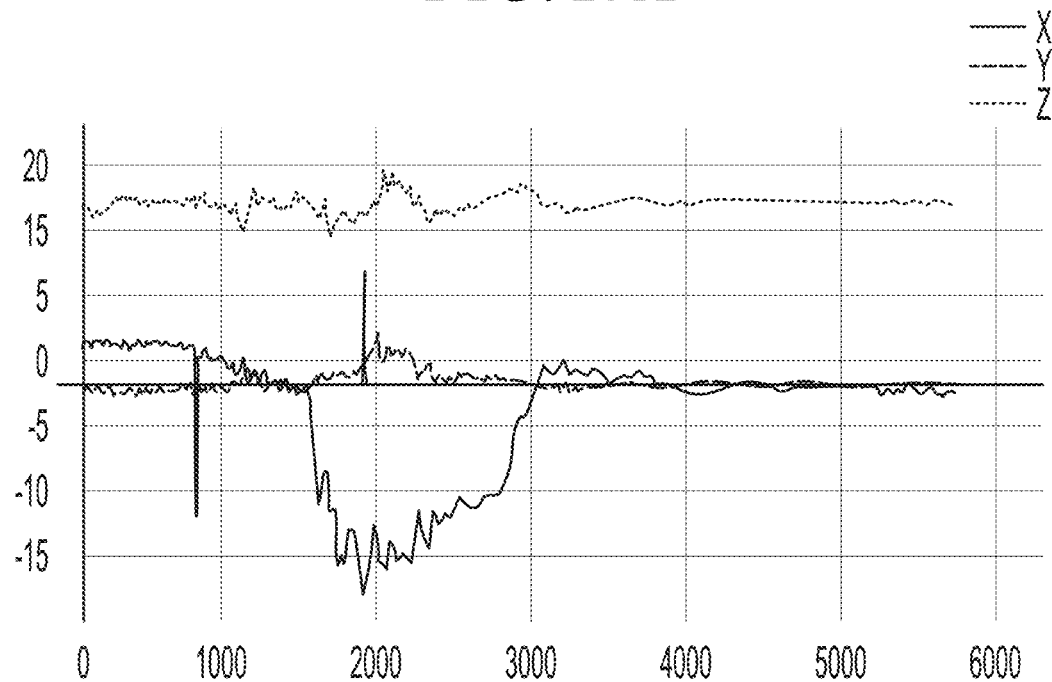
FIG. 17B shows an acceleration profile for a harsh braking event.
Figure 17C:
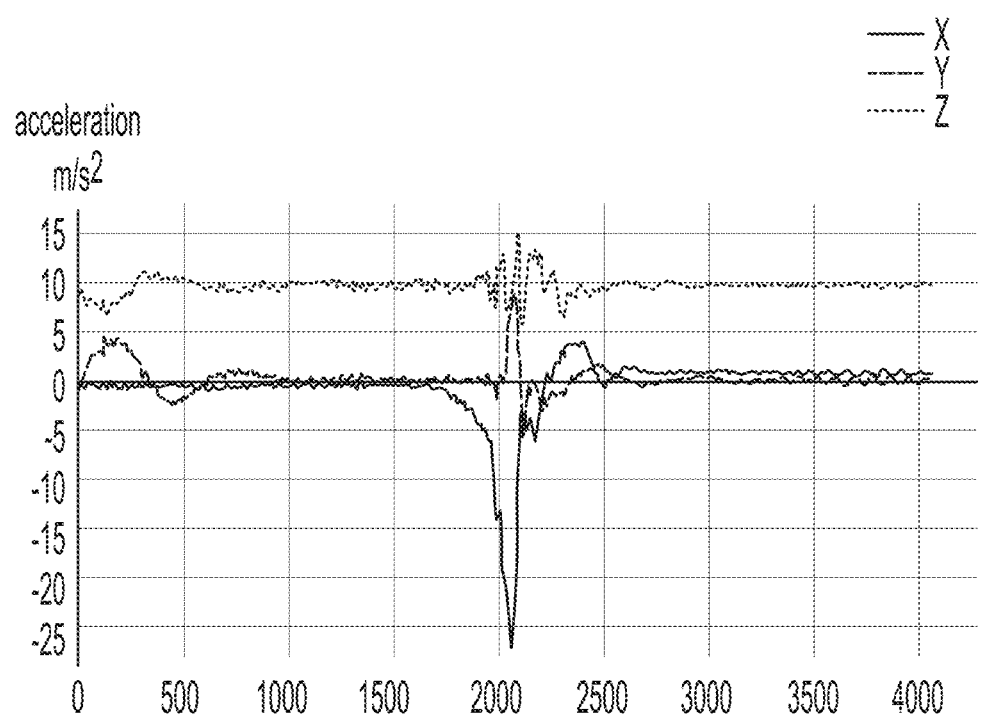
FIG. 17C shows an acceleration profile for a collision event.

Another problem that the inventors attempt to solve in this disclosure is reducing or eliminating false positives when detecting collisions. False positives may be in the form of noisy data (caused by bad device installations, such as loose or dangling telematics monitors) or harsh braking events. FIG. 17A shows a noisy acceleration profile. As can be seen, there are acceleration spikes in all three X, Y, and Z directions. FIG. 17B shows an acceleration profile for a harsh braking event. Both acceleration profiles of FIG. 17A and FIG. 17B contain acceleration values that are above 1 g, and therefore may be falsely characterized as minor collisions when they are not. FIG. 17C shows a collision event featuring a high acceleration (greater than 2 g) in the X direction. In this disclosure, the characteristics which distinguish a collision event will be used to better identify a collision event from other events such as harsh braking events.

Dataset Size Challenge

Since capturing acceleration at a high rate is relatively new, a high-rate acceleration dataset is relatively small as most data captured by the telematics monitor and stored in the datastore is captured at a low rate. The relatively small size of the high-rate acceleration dataset may limit the types of analysis that may be conducted thereon. For example, there may not be enough training data to utilize supervised learning approaches, at least for the short-term.

High-Rate Acceleration Dataset

In this disclosure, a high-rate acceleration dataset is created based on captured high-rate acceleration data and corresponding data describing the vehicle. It is a purpose of the high-rate acceleration dataset to provide a set of significant events (or triggers) that show a spike in acceleration based on the exception logic of the horizontal (combined X and Y) acceleration magnitude being higher than acceleration threshold of 1 g at any given point in time. The spike in acceleration represents a "triggered event". As described above with respect to FIG. 2A and FIG. 2B, the collision detection facility determines a time period before and after the time of the triggered event. The collision detection facility then obtains data describing the vehicle during the determined time period. The telematics monitor provides the data describing the vehicle to the server 108 where it may be stored in the datastore 108A. The data describing the vehicle are stored in tables, for example in the datastore 108A, and are part of the high-rate acceleration dataset.

The high-rate acceleration dataset is based on raw acceleration data and GPS data captured by the telematics monitor and stored in the datastore 108A, for example. The high-rate acceleration dataset is different from the harsh acceleration dataset mainly due to the frequency of acceleration data being captured. In this disclosure, a high rate of capturing acceleration is about 100 times per second. A low rate of capturing acceleration data is about 10 times per second. In some embodiments, acceleration data sampled at a rate of 5 times per second to 20 times per second is considered low-rate acceleration, whereas acceleration data sampled at a rate of 50 times per second or higher is considered high-rate acceleration data.

High-rate acceleration data is raw. No filtering or averaging is done on the data. The raw data is supplied to the detection logic that detects potential collisions. As such, the true magnitudes of acceleration events that are deemed significant (for example, greater than 1 g for minor collisions) are represented. With the increased rate of capture (e.g., a hundred times per second), the event durations and impacts are better estimated. Furthermore, it has been found that minor collisions can be captured, wherein minor collisions are characterized by an acceleration threshold of 1 g, as opposed to low-rate data which could only reliably capture harsh collisions having a threshold of 1.5 g or even 2 g.

The high-rate acceleration dataset streamlines the data extraction process of the events and data for high-rate acceleration events, including both minor and major collisions. The high-rate acceleration dataset consists of a plurality of tables. At least some of the tables contain acceleration values captured by a telematics monitor at an increased acceleration capture frequency. Other tables contain related data describing the vehicle within a certain time variable window around a triggered event.

The tables provide quick access to the high-rate acceleration events ("triggered events") and related vehicle dynamics data ("data describing the vehicle") within a certain variable time window for further analysis. The analysis may include safe driving metrics, accident detection and reconstruction, bad installations, and issues related to the telematics monitor. The high-rate acceleration dataset may provide information useful for fleet customers, municipalities, and anyone interested in public safety and urban infrastructure. Accordingly, it is anticipated that the tables of the high-rate acceleration dataset will be eventually used to develop products for customers in areas including, but not limited to, driver safety, accident detection, accident reconstruction, device installation, firmware, public safety, and urban infrastructure.

High-Rate Acceleration Data Pipeline Logic & Workflow

A data pipeline similar to the pipeline of FIG. 7, but based on high-rate acceleration data is created. The high-rate acceleration data pipeline ("high-rate acceleration pipeline") generates trigger events and extracts various data windows. The trigger events are based on an acceleration threshold of 1 g in the X-Y plane (horizontal plane).

One objective of the high-rate acceleration pipeline is to reduce the amount of high-rate acceleration events from a collision point-of-view. This is done by filtering, as will be described below.

Another objective of the high-rate acceleration pipeline is to provide a metric for the filtered down events.

Figure 18:
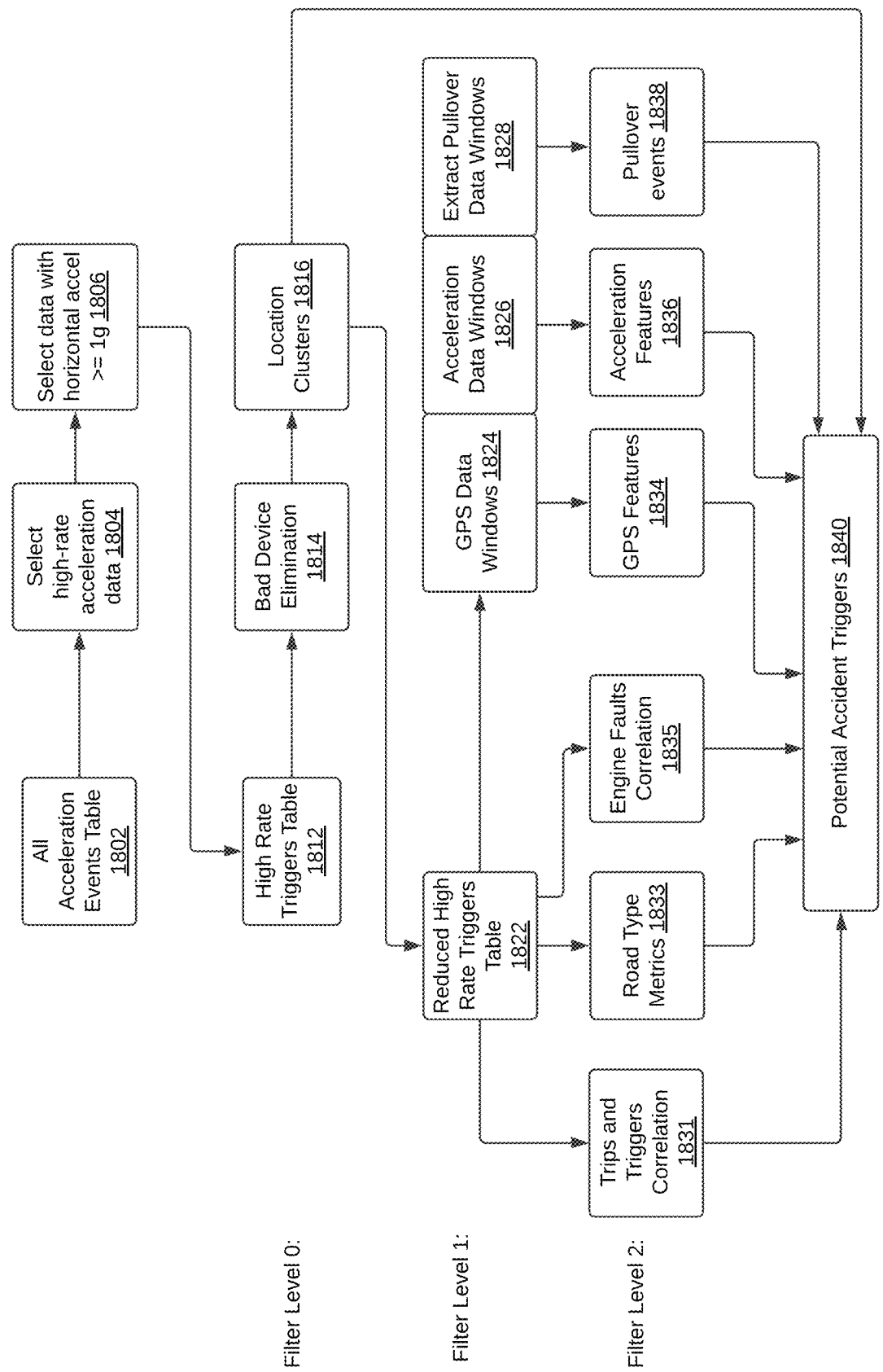
FIG. 18 illustrates a flowchart of an example pipeline process that may be implemented in some embodiments to process high-rate acceleration events.

FIG. 18 depicts a high-rate events pipeline 1800, similar to the harsh events pipeline 700 of FIG. 7, but using high-rate acceleration data, in accordance with embodiments of the present disclosure. The goal of the high-rate events pipeline 1800 is to determine potential accident triggers 1840.

The high-rate events pipeline 1800 starts with an All Acceleration Events Table 1802 containing all acceleration data. The All Acceleration Events Table contains all acceleration data from a plurality of telematics monitors deployed in a plurality of vehicles. The first step in creating a high-rate triggers table 1822 is to select high-rate acceleration data that is above a particular threshold from the All Acceleration Events Table 1802. In the depicted embodiment, at block 1804 high-rate acceleration data is selected. For example, for every row in the All Acceleration Events Table 1802, there may be a field indicating whether the acceleration data was gathered at a regular rate or at a high rate. Records (rows) containing acceleration data, which were not captured at a high rate are ignored and not selected. Of the selected rows that contain high-rate acceleration data, only rows containing a horizontal acceleration that is greater than a particular threshold are selected. For example, at block 1806, only rows with a horizontal acceleration of 1 g or greater are selected. The resulting table is a high-rate triggers table containing acceleration trigger events that are captured at the high-rate, such as 100 Hz, and are greater than at particular threshold, such as 1 g.

Combining Events in Close Proximity in Time

In some embodiments, generating the High-Rate Triggers Table 1812 involves additional steps. Events are defined as a plurality of successive acceleration points having acceleration values above a trigger threshold within a time duration. For example, when acceleration values begin rising above the trigger threshold, that marks the start of an event. Conversely, when acceleration values drop below the trigger threshold, that marks the end of the acceleration trigger event. Acceleration trigger events which are in close proximity in time may be combined. For example, when a multi-vehicle collision takes place, a single vehicle may encounter more than one impact. Accordingly, in some embodiments the collision detection facility defines a time window of a particular duration that is used to combine multiple acceleration trigger events that are proximate in time. This is described in reference to FIG. 19, wherein two acceleration trigger events, namely the first acceleration trigger event 1910A and the second acceleration trigger event 1910B are combined into a merged acceleration trigger event 1910. A third acceleration trigger event 1910C is considered a separate acceleration trigger event.

Figure 19:
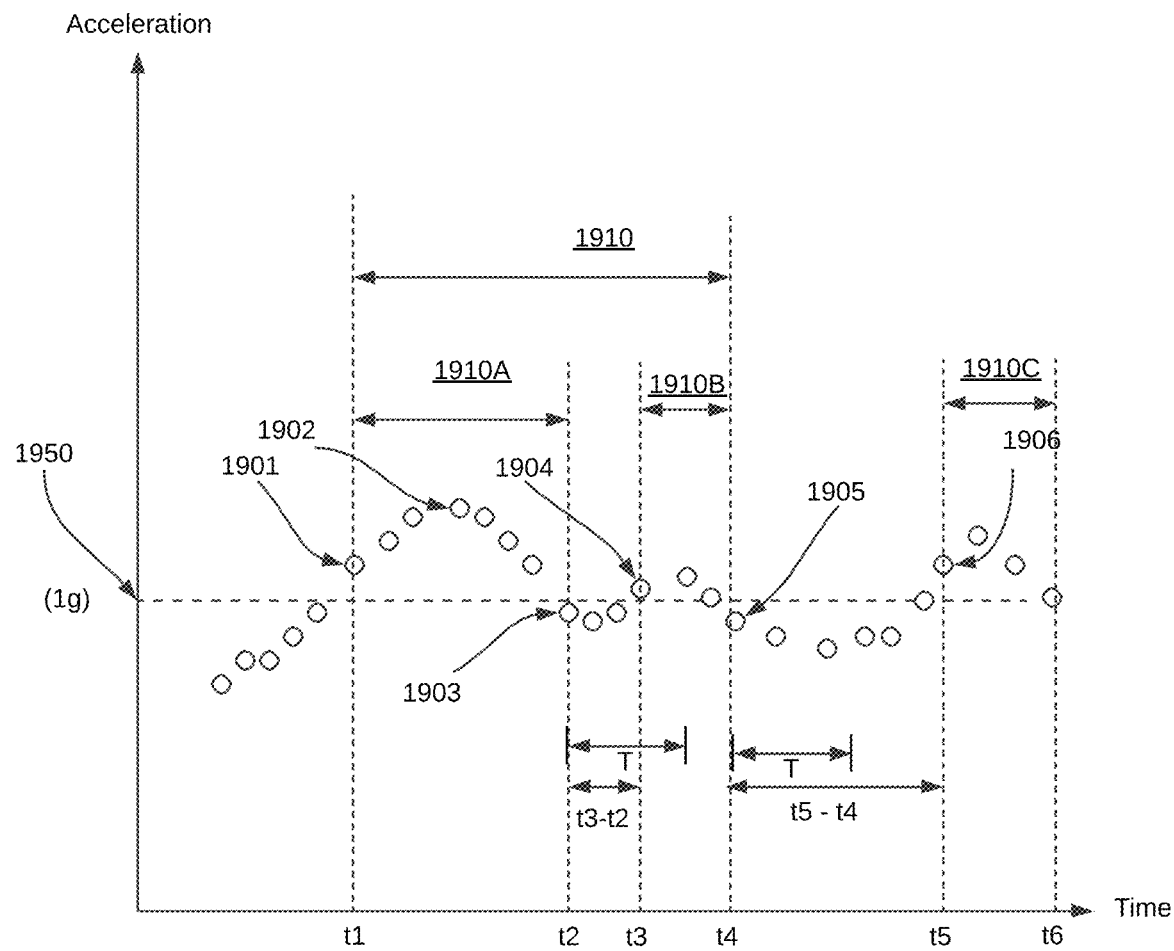
FIG. 19 is a graph that illustrates merging adjacent acceleration trigger events, in accordance with embodiments of the present disclosure.

The first acceleration trigger event 1910A starts at time (t1) when the first acceleration point 1901 has an acceleration value that is higher than the trigger threshold 1950, represented by the horizontal dashed line, which in the depicted example happens to be at 1 g. The first acceleration trigger event 1910A ends at the acceleration point timestamp (t2) as the acceleration value of the acceleration point 1903 is lower than the trigger threshold 1950. Between the acceleration point timestamp (t2) and the acceleration point timestamp (t3), the acceleration value is below the trigger threshold 1950. The second acceleration trigger event 1910B starts at acceleration point timestamp (t3) when the acceleration value of the acceleration point 1904 is higher than the trigger threshold 1950. The second acceleration trigger event 1910B ends at acceleration point timestamp (t4) when the acceleration value of the acceleration point 1905 is lower than the trigger threshold 1950. To decide whether or not to combine the successive acceleration trigger events, i.e., the first acceleration trigger event 1910A and the second acceleration trigger event 1910B, the collision detection facility executes an algorithm. After the conclusion of the first acceleration trigger event 1910A, the collision detection facility checks for acceleration points having acceleration values higher than the trigger threshold 1950 within a particular time window (T) of the acceleration point timestamp of the last acceleration point in the first event. For example, within T seconds of the acceleration point timestamp (t2) of the last acceleration point (i.e., acceleration point 1903), the collision detection facility checks for any acceleration points having an acceleration value that is higher than the trigger threshold 1950. In the depicted embodiment, the acceleration point 1904 is at acceleration point timestamp (t3) which is within (T) seconds of the end of the first event (i.e., acceleration point timestamp t2). Since an acceleration point having an acceleration value that is above the threshold has been detected after the end of the first event but within the time window (T) of the last acceleration point timestamp (t2) of the first event, the collision detection facility extends the first event to encompass the acceleration value 1904, which is part of the second acceleration trigger event 1910B. As such, the collision detection facility merges the first acceleration trigger event 1910A and the second acceleration trigger event 1910B to form a merged acceleration trigger event 1910. The merged acceleration trigger event 1910 extends until an acceleration point subsequent to the acceleration point 1904 drops in value below the trigger threshold 1950. With reference to FIG. 19, the first acceleration point after the acceleration point 1904 that has a value below the trigger threshold 1950 is the acceleration point 1905 at acceleration point timestamp (t4). As such, by the acceleration point timestamp (t4), the second acceleration trigger event 1910B and accordingly the merged acceleration trigger event 1910 ends.

Other acceleration values are captured after acceleration point timestamp (t4). The first acceleration point after the acceleration point timestamp (t4) that is higher in value than the trigger threshold 1950 is the acceleration point 1906 having the acceleration point timestamp (t5). The acceleration point 1906 marks the beginning of a third acceleration trigger event 1910C.

For a time window of (T) after the acceleration point timestamp (t4) of the last acceleration point (i.e., acceleration point 1905) of the second acceleration trigger event 1910B, there are no acceleration points having values that are above the threshold. The first acceleration point having a value that is above the trigger threshold 1950 is the acceleration point 1906 at the acceleration point timestamp (t5). The collision detection facility determines that the time since the end of the second acceleration trigger event is greater than the time window T. In other words, the difference between the acceleration point timestamp of the first acceleration point in the new event and the acceleration point timestamp of the last acceleration point in the previous event is greater than a predetermined time window (T). For the depicted embodiments, t5−t4>T. Accordingly, the collision detection facility does not merge the third acceleration trigger event 1910C with the merged acceleration trigger event 1910. As a result, the first acceleration trigger event 1910A and the second acceleration trigger event 1910B are combined into a merged acceleration trigger event 1910 extending between (0) and (t4). The merged acceleration trigger event 1910 is given an event identifier. The collision detection facility determines the start and end times of the high-rate acceleration trigger event (0 and t4, for the depicted example).

The collision detection facility also generates latitude, longitude, and speed data for a time window extending before and after the trigger windows. For example, the collision detection facility may join the High Rate Triggers Table with a table containing GPS data with a 10 second time window, 5 seconds before the acceleration trigger event and 5 seconds after the acceleration trigger event. The location (latitude and longitude) as well as the speed data provide context to the trigger event as will be described below. In some embodiments, the latitude/longitude may not be available at the exact timestamp of the trigger points in the trigger window. In such cases, the latitude/longitude are calculated by taking latitude/longitude from the closest GPS points (in time) to the trigger point times. The speed is calculated by taking an average of the GPS points.

Turning back to FIG. 18, the High-Rate Triggers Table 1812 is filtered, to eliminate or at least reduce false positives. First, by removing acceleration data from bad devices (telematics monitors), which are excessively logging. As discussed above, a device that is hanging loosely will generate an excessive amount of acceleration data in all axes. In some embodiments, the bad devices have been identified and stored in a bad devices table. The bad devices table contains device identifiers for devices that are known to be excessively logging. For example, a bad device may be defined as one that generates more than 6 harsh acceleration events per day or 70 harsh acceleration events per month. The Bad Device Elimination block 1814 involves identifying the device identifiers for the bad devices from the bad devices table, and deleting acceleration data from the High-Rate Triggers Table 1812 for such devices. Deleting the acceleration data corresponding to the bad devices may be limited to a period of time, such as the past 4 weeks.

Another type of filtering done at Filter Level 0, is to eliminate data in some location clusters. This is done in the Location Cluster Elimination block 1816. Location analysis is conducted to identify location/areas such as road impediments, railway tracks, expansion joints on the highway, which are prone to generating high acceleration events which turn up as false positives.

The resulting table from filtering out the data at the Bad Device Elimination block 1814 and at the Location Cluster Elimination block 1816 is a "Reduced High-Rate Triggers Table" 1822.

Downstream Tables

After filtering, the collision detection facility may generate a number of downstream tables, namely the GPS data windows table 1824, the Acceleration Data Windows table 1826, and the extract pullover data windows table 1828. The generated tables may be used by the collision detection facility to extract or determine a number of features and/or events that are used to determine a potential accident trigger 1840.

GPS Data Windows Table

The GPS data windows table 1824 (which may also be referred to as the high-rate trigger window GPS) is generated by joining trigger events from the reduced high-rate triggers table 1822 with a table containing GPS data to get the event's corresponding GPS, speed, bearing, and ignition data based on the trigger time and device identifier of the telematics monitor. In some embodiments, the GPS Data Window table consists of a plurality of aggregated arrays.

Acceleration Data Windows Table

The acceleration data windows table 1826 is generated by joining triggered events from the reduced high-rate triggers table 1822 with a table containing raw accelerometer data and a table of interpolated data. The raw accelerometer data table contains corresponding x-acceleration, y-acceleration, and z-acceleration values. The interpolated data table contains interpolated GPS, bearing, and engine data for times where the raw data is unavailable at the time stamp of the trigger events. As a result of joining the tables, the collision detection facility generates the Acceleration Data Windows table 1826 (also referred to as the high-rate trigger windows acceleration table) containing x-acceleration, y-acceleration, z-acceleration, speed, location, bearing, and ignition data based on the trigger time and device identifier of the telematics monitor. In some embodiments, the generated acceleration data windows table 1826 is generated as a plurality of aggregated arrays.

Pullover Data Windows

A pullover is defined as a prolonged stopover event where the vehicle, in which the telematics monitor is installed, shows limited to no movement from a GPS point. A pullover investigation aims to identify instances where the acceleration event is likely an accident. An accident typically leads to the vehicle slowing down and coming to a halt either due to the accident or if the driver stops the vehicle to inspect the damage caused by the accident. The first step of a pullover investigation involves creating the pullover data windows table 1838 from raw data points around the trigger point timestamp. In some embodiments, GPS data from as early as 15 minutes before the trigger point timestamp and as late as 15 minutes after the trigger point timestamp are considered.

Correlations and Metrics

The collision detection facility may obtain data from the reduced high-rate triggers table 1822 for use in determining the potential accident triggers 1840. For example, the data in the reduced high-rate triggers table 1822 may provide trips and triggers correlation 1831, road type metrics 1833, and engine faults correlation 1835, which have been discussed earlier in this disclosure.

Features and Events

The generated tables are used to determine features and events which in turn help determine potential accident triggers 1840. Some of the features and/or events used to determine potential accident triggers 1840 are GPS features, acceleration features, and pullover events. The GPS features 1834 are determined based on the GPS data windows table 1824. The acceleration features are determined based on the acceleration data windows table 1826. The pullover events are determined from the extract pullover data windows table 1828.

Pullover Events

The pullover events are determined based on the GPS location and the speed profile of the vehicle following an acceleration trigger event. As discussed above, the first step of a pullover investigation was to create the pullover data windows table 1838. The second step is to create a heuristic-based model. The steps of creating the model are outside the scope of the disclosure, but they include identifying stationary and non-stationary events followed by grouping and calculating features/metrics for the groups of features and metrics. Based on the aforementioned steps, the collision detection facility generates a profile for each individual trigger, the profile representing the activity of the vehicle around the trigger point. As an example, a vehicle pullover profile may indicate that the vehicle slowed down and came to a halt after a trigger point, and then the vehicle started moving again afterwards.

Acceleration Features

A collision may have multiple impacts. As such each impact needs to be identified and extracted. An impact is rarely longer than 150 ms. An impact window is a time zone during which acceleration data values gathered represent a single impact. Once an impact window is defined, the acceleration data values within that window are further analyzed. Two methods of specifying an impact window are described.

Constant Length Impact Window

Figure 20A:
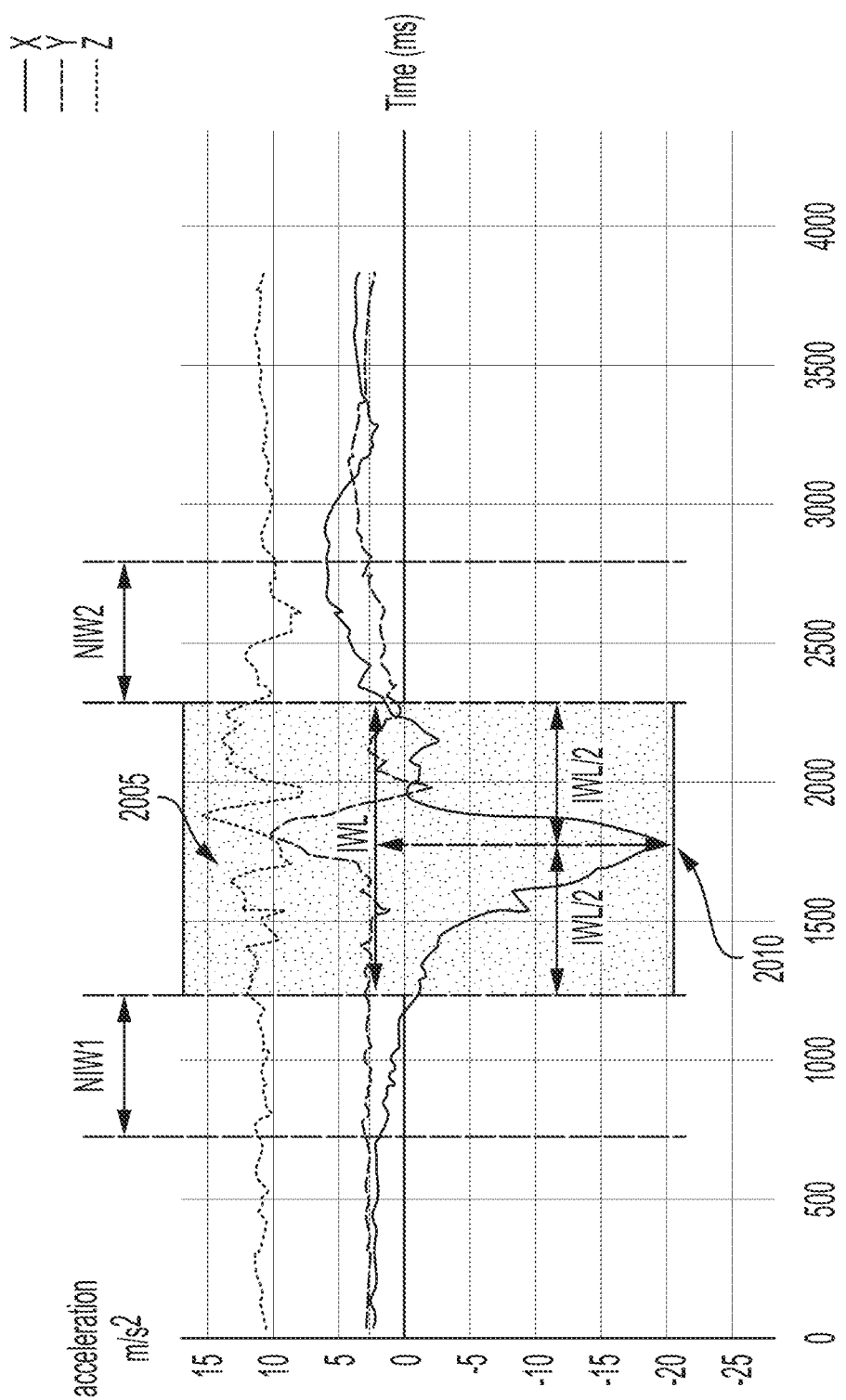
FIG. 20A is a graph illustrating a fixed-length impact window around the point of maximum acceleration for a high-rate acceleration event, in accordance with embodiments of the present disclosure.

The first method of specifying an impact window is a constant length impact window centered around the acceleration point that has the largest magnitude. For example, with reference to FIG. 20A, the acceleration point with the largest magnitude is the acceleration point 2010 having an acceleration value of about −20 m/s2 or approximately −2 g. Once the largest magnitude acceleration point is determined, the impact window is defined as a time window starting from a constant time prior to the time of the maximum acceleration point and ending a constant time after the time of the largest magnitude acceleration point. In FIG. 20A, the impact window extends from IWL/2 before the time of the largest magnitude acceleration point, to IWL/2 after the time of the largest magnitude acceleration point. Since an impact is rarely longer than 150 ms, in some embodiments an impact window that is 300 ms in length is used. In other words the Impact Window Length (IWL) is 300 ms. A 300 ms impact window contains acceleration values that took place 150 ms before the time of the largest magnitude acceleration point and acceleration values that took place 150 ms after the time of the largest magnitude acceleration point.

Variable Length Impact Window

Figure 20B:
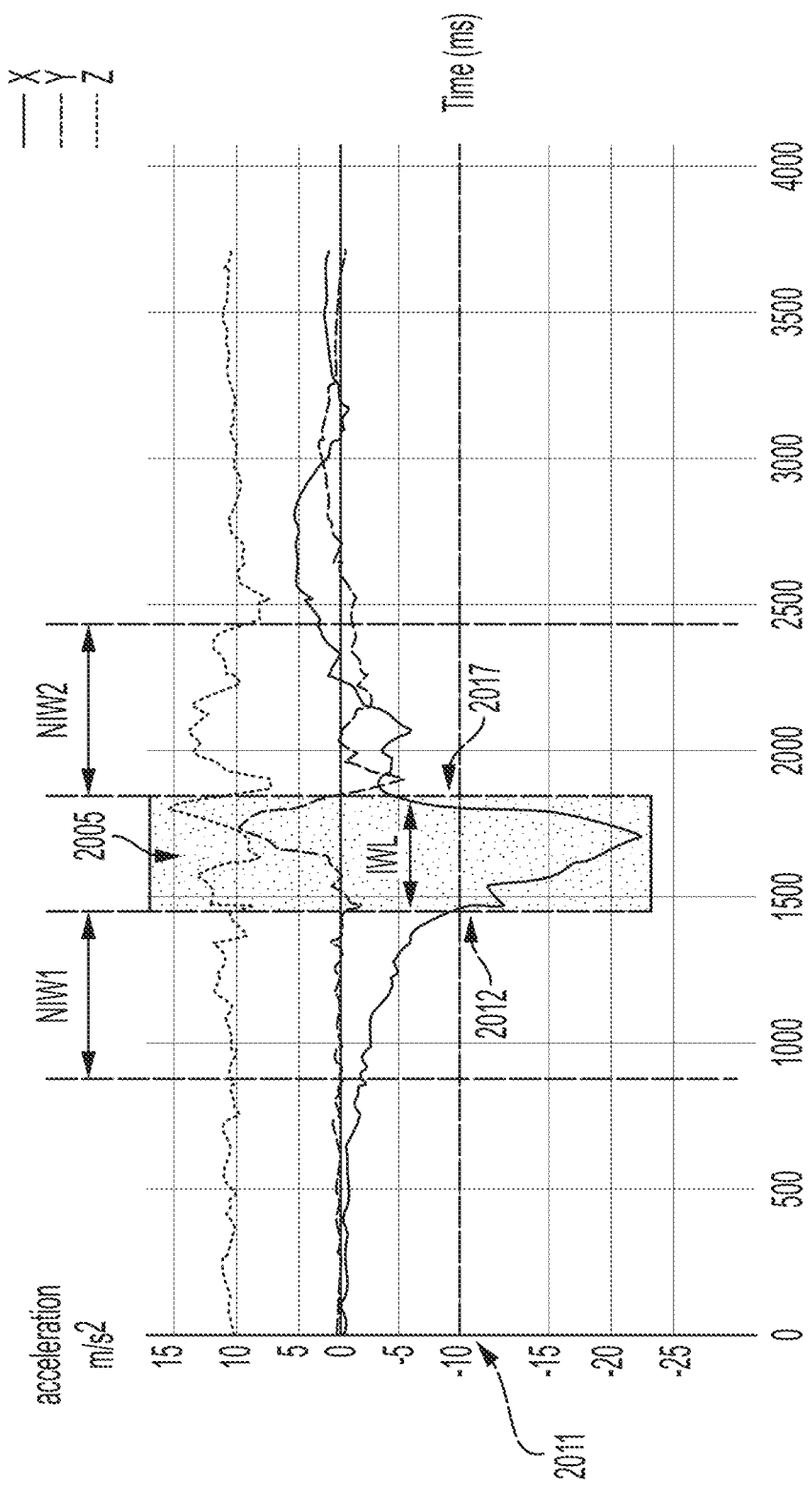
FIG. 20B is a graph illustrating a variable-length impact window based on a threshold acceleration value, in accordance with embodiments of the present disclosure.

The second method of specifying an impact window is a threshold-based method, as shown in FIG. 20B. In this method, an impact window acceleration threshold is defined. The impact window begins when the magnitude of the acceleration points of an acceleration profile exceed the impact window acceleration threshold. The impact window ends when the magnitude of the acceleration points drops below the impact window acceleration threshold. The impact window is defined as the duration between the time of the first acceleration value whose magnitude exceeds the impact window acceleration threshold and the time of the last acceleration value whose magnitude is above the impact window acceleration threshold. Alternatively, the impact window could end at the acceleration point timestamp of the first acceleration point that has a magnitude which is below the impact window acceleration threshold. In the FIG. 20B, any acceleration below −1 g is of interest and specifies the start of the impact window. Any acceleration higher than −1 g (i.e. a negative acceleration but having a magnitude that is less than 1 g in the negative direction) is not of interest causing the collision detection facility to close the impact window. Accordingly, the impact window obtained from the threshold-based method is variable in length as it depends solely on whether the detected acceleration has exceeded the threshold.

Features Determined for Impact Windows

Figure 24:
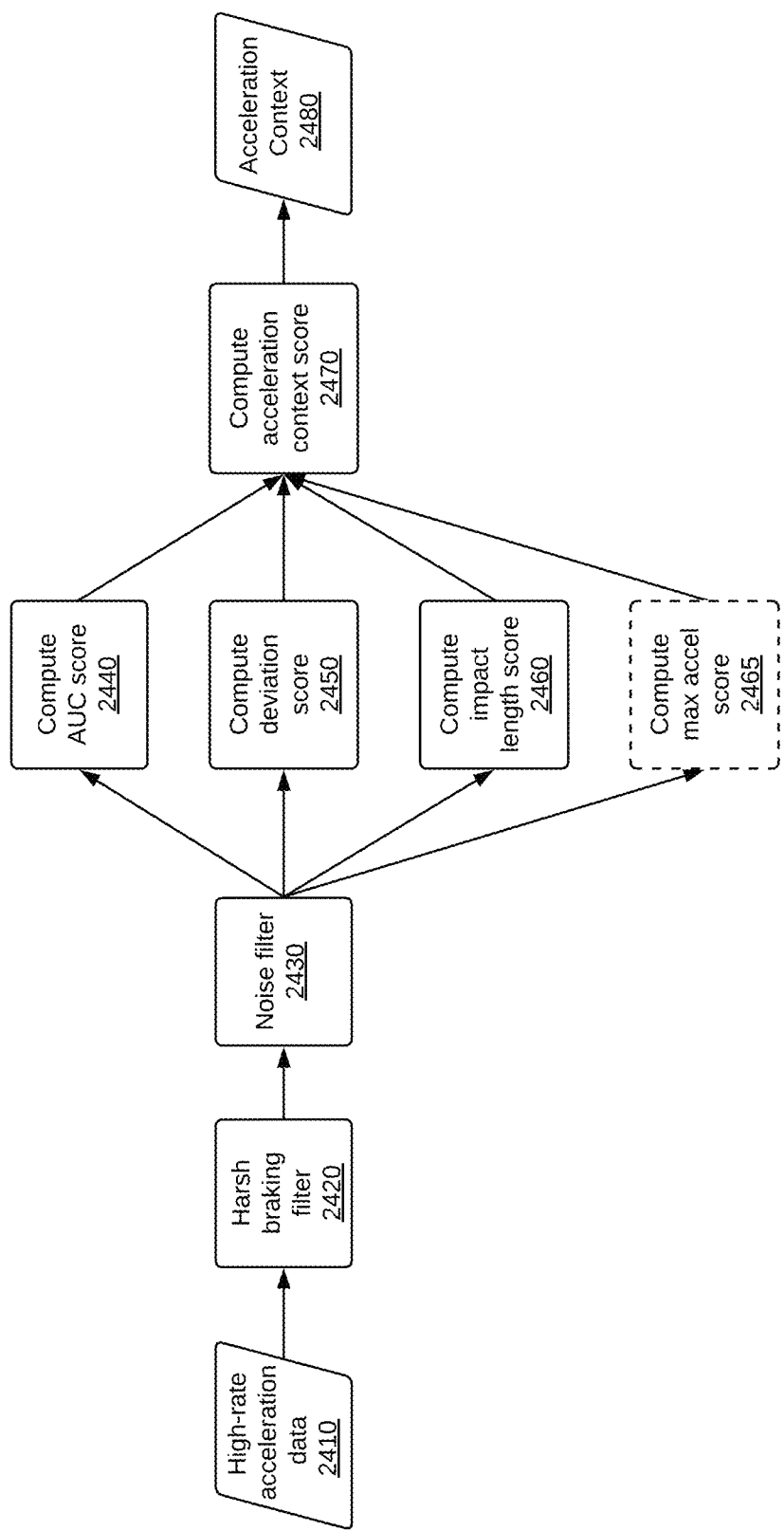
FIG. 24 depicts an acceleration context design process, in accordance with embodiments of the present disclosure.
Figure 25:
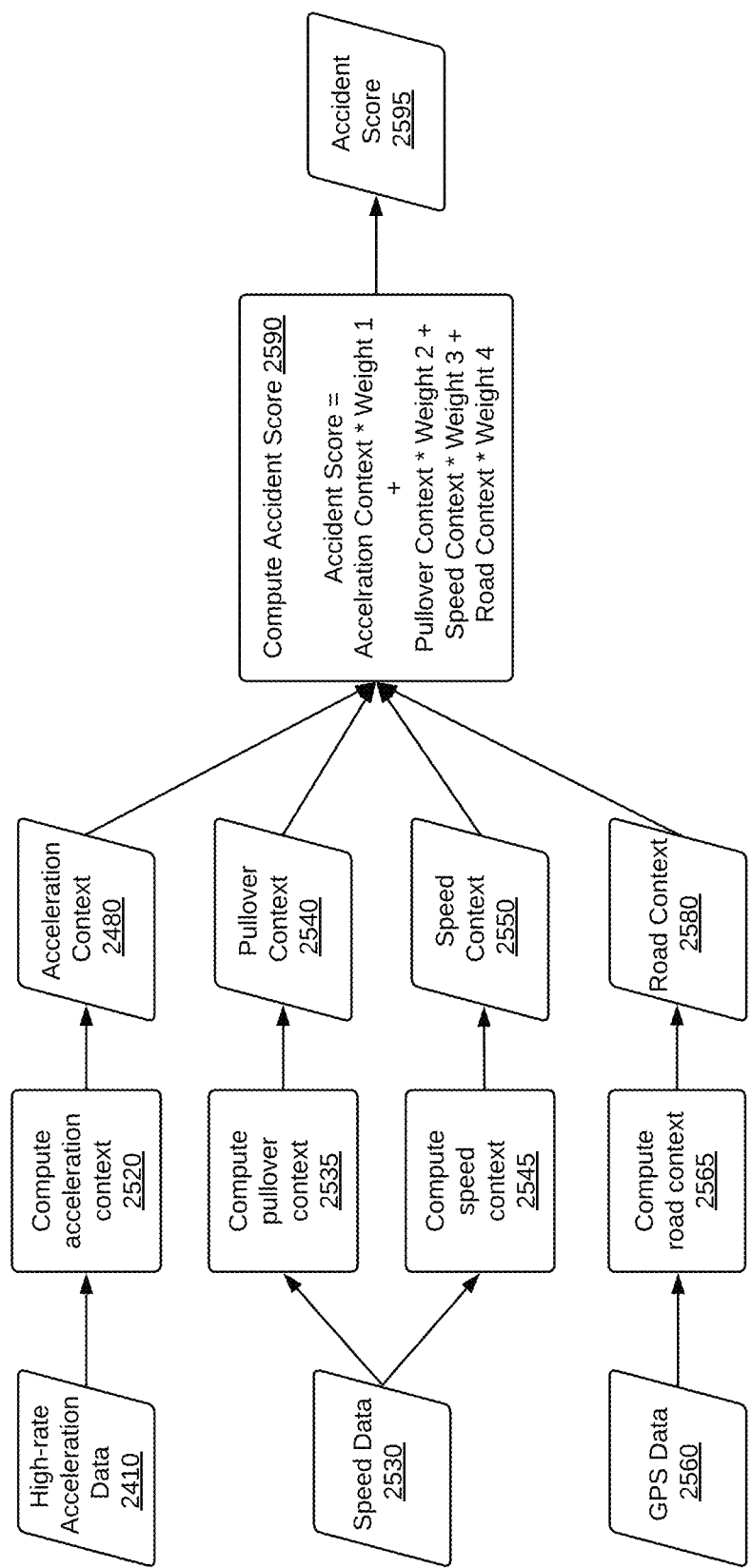
FIG. 25 depicts a method of computing an accident score, in accordance with embodiments of the present disclosure.

Once the impact window is defined, a plurality of features are computed and used to characterize the acceleration event, and compute an acceleration context. The acceleration context is used, along with the pullover context, speed context, and road context, to compute an accident score as shown in FIG. 25. The acceleration context is determined from a plurality of features namely, the area-under-the-curve (AUC) context score, the deviation score, the impact length score, and the maximum acceleration score, as shown in FIG. 24.

a) Area-Under-the-Curve Context Score

Figure 21A:
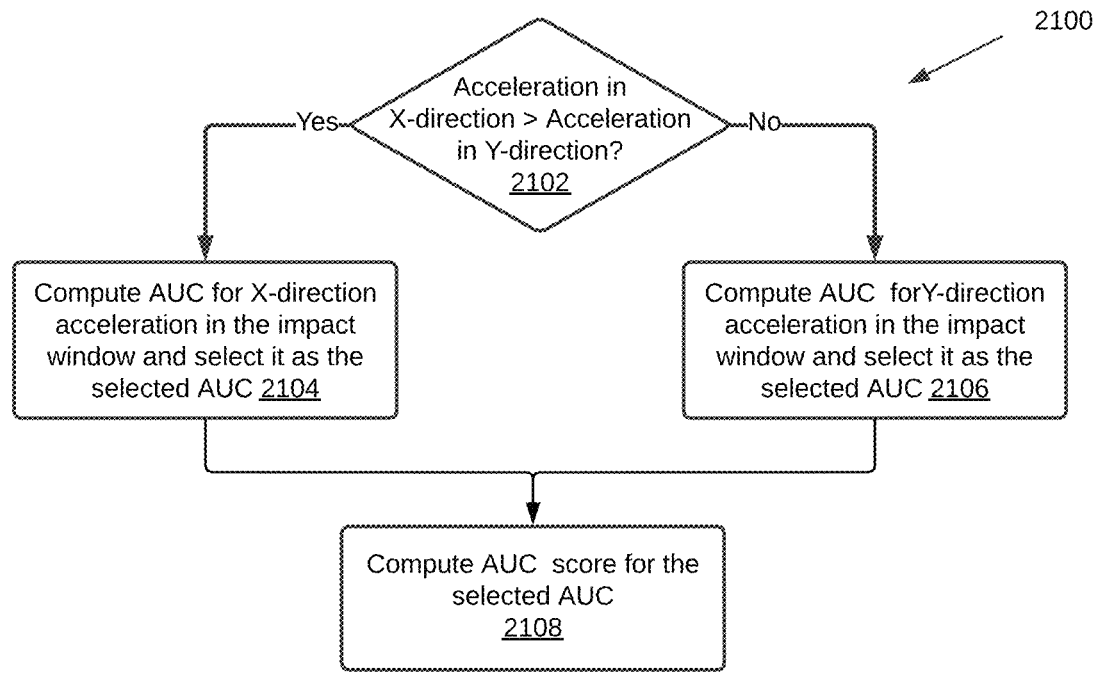
FIG. 21A is a flowchart depicting a method of selecting an acceleration direction for computing an area-under-the-curve (AUC), in accordance with embodiments of the present disclosure.

The first feature is the area under the acceleration curve context score. The AUC for the acceleration curve represents the change in velocity of the vehicle containing the telematics monitor during the collision. The AUC context score feature is computed, within an impact window, for the direction having the highest maximum acceleration value. For example, with reference to FIG. 21A, there is a method 2100 that computes the AUC context score for either the X-direction or the Y-direction depending on the highest magnitude of the acceleration values in each of the X-direction and the Y-direction. The method 2100 starts at step 2102.

At step 2102, the collision detection facility determines whether the highest magnitude of the acceleration in the X-direction ("X-direction maximum acceleration"), within an impact window, is greater than the highest magnitude of the acceleration in the Y-direction ("Y-direction maximum acceleration"). When the X-direction maximum acceleration is greater than the Y-direction maximum acceleration, control goes to step 2104. When the Y-direction maximum acceleration is greater than the X-direction maximum acceleration, control goes to step 2106.

At step 2104, the collision detection facility computes the AUC under the X-direction acceleration curve ("X-direction AUC") in the impact window, and selects the X-direction AUC as the selected AUC that is to be used to compute the AUC score. Control then goes to step 2108.

At step 2106, the collision detection facility computes the AUC under the Y-direction acceleration curve ("Y-direction AUC") in the impact window, and selects the X-direction AUC as the selected AUC that is to be used to compute the AUC score. Control then goes to step 2108.

At step 2018, the AUC score is computed from the selected AUC.

Figure 21B:
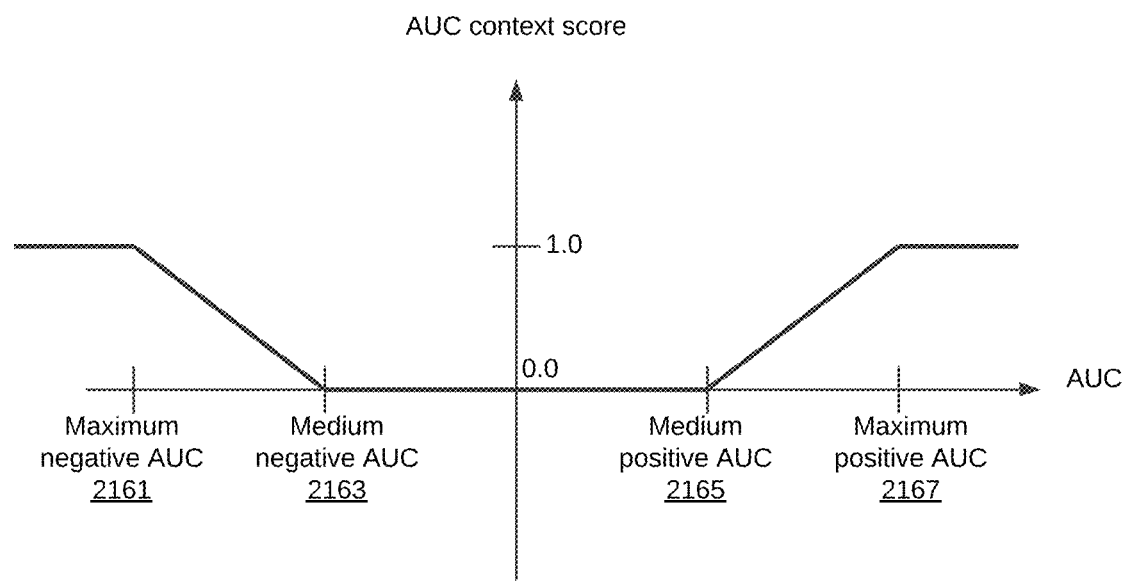
FIG. 21B is a graph illustrating mapping AUC values to an AUC score, in accordance with embodiments of the present disclosure.

The AUC context score ("AUC score") is a score between 0 and 1. FIG. 21B illustrates how the AUC for an X-direction acceleration curve or a Y-direction acceleration curve is mapped to an AUC context score, in accordance with embodiments of the present disclosure.

With reference to FIG. 21B, a number of thresholds for the AUC are defined: a maximum negative AUC 2161, a medium negative AUC 2163, a medium positive AUC 2165, and a maximum positive AUC 2167.

As can be seen from the graph, a positive AUC that is higher than the maximum positive AUC or a negative AUC that is lower (i.e. greater in magnitude and thus more negative) than the maximum negative AUC both yield an AUC context score of 1. Since the AUC is indicative of the energy of the acceleration event, a high AUC means a collision is highly likely and therefore an AUC context score of 1 is appropriate.

A positive AUC that is lower than the medium positive AUC 2165 or a negative AUC that is higher (i e smaller in magnitude and thus more positive) than the medium negative AUC 2163 both yield an AUC context score of 0. Since the AUC is indicative of the energy of the acceleration event, a low AUC means a collision is highly unlikely, and therefore an AUC context score of 0 is appropriate.

A negative AUC that is between the maximum negative AUC 2161 and the medium negative AUC 2163 causes the collision detection facility to generate a linear AUC context score between 1 and 0. When the negative AUC is closer to the maximum negative AUC 2161, the AUC context score is close to 1. When the negative AUC is closer in value to the medium negative AUC 2163, the AUC context score is close to 0. The formula used to determine the linear AUC context score for a negative AUC between the maximum negative AUC 2161 and a medium negative AUC 2163 is described below.

A positive AUC that is between the medium positive AUC 2165 and the maximum positive AUC 2167 causes the collision detection facility to generate a linear AUC context score between 0 and 1. When the positive AUC is closer to the medium positive AUC 2165, the context score is close to 0. When the positive AUC is closer in value to the maximum positive AUC 2167, the AUC context score is close to 1. The formula used to determine the linear AUC context score for a positive AUC between the medium positive AUC 2165 and a maximum positive AUC 2167 is described below.

Figure 21C:
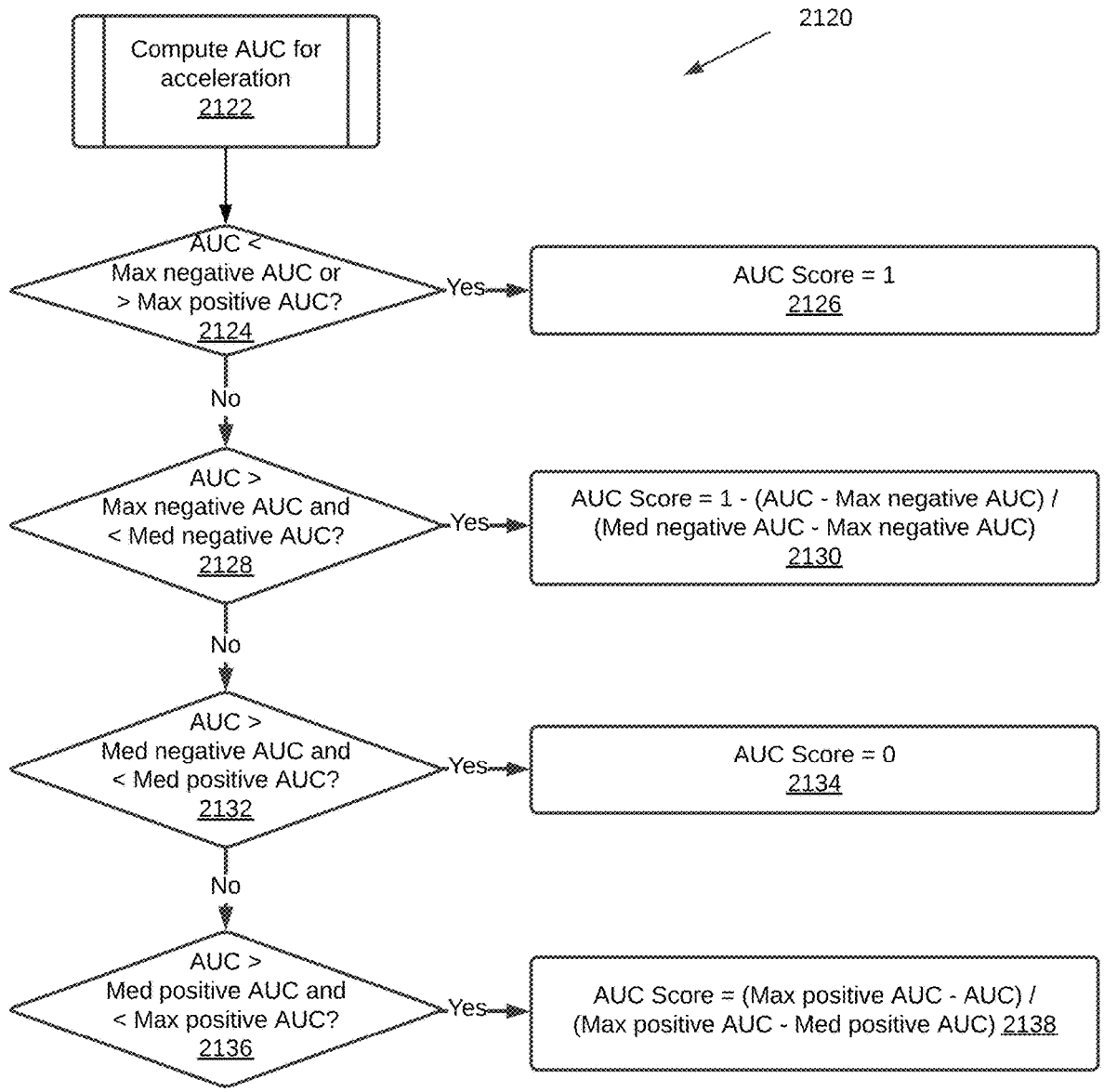
FIG. 21C is a flowchart depicting a method for mapping AUC values to an AUC score, in accordance with embodiments of the present disclosure.

FIG. 21C depicts a method 2120, by a collision detection facility, for mapping an AUC under an acceleration curve to an AUC context score, in accordance with embodiments of the present disclosure.

The method 2120 takes place after an X-direction or a Y-direction acceleration curve has been selected as described in step 2102 of the method 2100.

The method 2120 begins at step 2122. At step 2122 the AUC of an acceleration curve within an impact window is computed. For example, for the impact window defined in FIG. 20B, the AUC is for the X-direction acceleration curve between the first acceleration point 2012 and the second acceleration point 2017. Since the X-direction acceleration curve is negative, the AUC is between the acceleration curve and the horizontal time axis, i.e. it is above the curve, nevertheless it is termed the AUC (when in fact it is above the curve!). Computing the AUC of any curve is known in the art.

At step 2124, the collision detection facility determines whether the AUC (computed for the impact window) is less than a maximum negative AUC 2161 or greater than a maximum positive AUC 2167. If so, control goes to step 2126. If not, control goes to step 2128.

At step 2126, the acceleration event is known to contain high energy, and the collision detection facility assigns the event an AUC context score of 1.

At step 2128, when the collision detection facility determines that the AUC is higher than the maximum negative AUC 2161 and lower than the medium negative AUC 2163, control goes to step 2130. Otherwise, control goes to step 2132.

At step 2130, the collision detection facility computes the AUC context score by the formula:

AUC Score=1−(AUC−Max negative AUC)/(Med negative AUC−Max negative AUC)

As can be seen from the above formula, when the AUC is equal to the maximum negative AUC, the AUC score=1. As the AUC increases in value, the AUC score linearly decreases. When the AUC is equal to the medium negative AUC, the AUC score=1.

At step 2132, when the collision detection facility determines that the AUC is greater than the medium negative AUC 2163 and smaller than the medium positive AUC 2165, control goes to step 2134. Otherwise, control goes to step 2136.

At step 2134, the collision detection facility has determined that the acceleration event, within the impact window, has low energy. Accordingly, the collision detection facility sets the AUC context score to 0.

At step 2136, the collision detection facility determines that the AUC is greater than the medium positive AUC 2165 and is smaller than the maximum positive AUC 2167, and control goes to step 2138. Since there is no other possibility, the decision at step 2136 has no "No" path.

At step 2138, the collision detection facility determines the AUC context score using the formula:

AUC Score=(Max positive AUC−AUC)/(Max positive AUC−Med positive AUC)

The computed AUC score may be combined with other feature scores, such as the deviation score, the impact length score, and the maximum acceleration score, to compute at an acceleration context, as shown in FIG. 24.

b) Change in Standard Deviation

The second feature developed is the change in standard deviation from the non-impact portion of the acceleration profile to the impact window. A standard deviation is known and is computed using the formula:

$$SD = \sqrt{\frac{\sum |x - \mu|^2}{N}}$$

where $\Sigma$ means "sum of", x is an acceleration value in a dataset, $\mu$ is the mean of the dataset, and N is the number of points in the dataset. The standard deviation is computed for the impact window in which case the dataset is a plurality of acceleration values in the impact window. The standard deviation is also computed for a non-impact window surrounding the impact window for the same trigger event.

For example, with reference to FIG. 20A and FIG. 20B, the impact window standard deviation is computed for a plurality of acceleration points within the impact window 2005 that has a fixed width of IWL. The non-impact window standard deviation is computed for a plurality of acceleration points within the non-impact window (NIW1 and NIW2). The non-impact window portion NIW1 begins at a predetermined duration before the start of the impact window. The non-impact window portion NIW2 begins a predetermined duration after the impact window and ends at some predetermined duration NIW2 after the end of the impact window. In some examples, the non-impact window portions begin 1 second before the impact window and end 1 second after the impact window.

The deviation change is computed as a ratio between the standard deviation inside the impact window and the standard deviation outside the impact window but within the non-impact window portion, in both the X-direction and the Y-direction. The deviation change in the X direction is the ratio of the deviation of X acceleration points included in the impact window to the deviation of X acceleration points not included in the impact window but present in a window surrounding the impact window. Similarly, the deviation change in the Y direction is the ratio of the deviation of Y acceleration points included in the impact window to the deviation of Y acceleration points not included in the impact window but present in a window surrounding the impact window. The deviation change in the X-direction may be referred to as the X-direction deviation change, and the deviation change in the Y-direction may be referred to as the Y-direction deviation change.

It has been observed that the acceleration profile has a much larger standard deviation within the impact window when the event captured is a collision. If the event captured is a harsh braking event, then the standard deviation is relatively constant within and outside the impact window. As such, the change in standard deviation may be used, among other features, to determine whether an event is a collision event or a harsh braking event as will be described below. The deviation change is thus used, among other feature values, to filter out harsh braking events as will be described below.

Figure 21D:
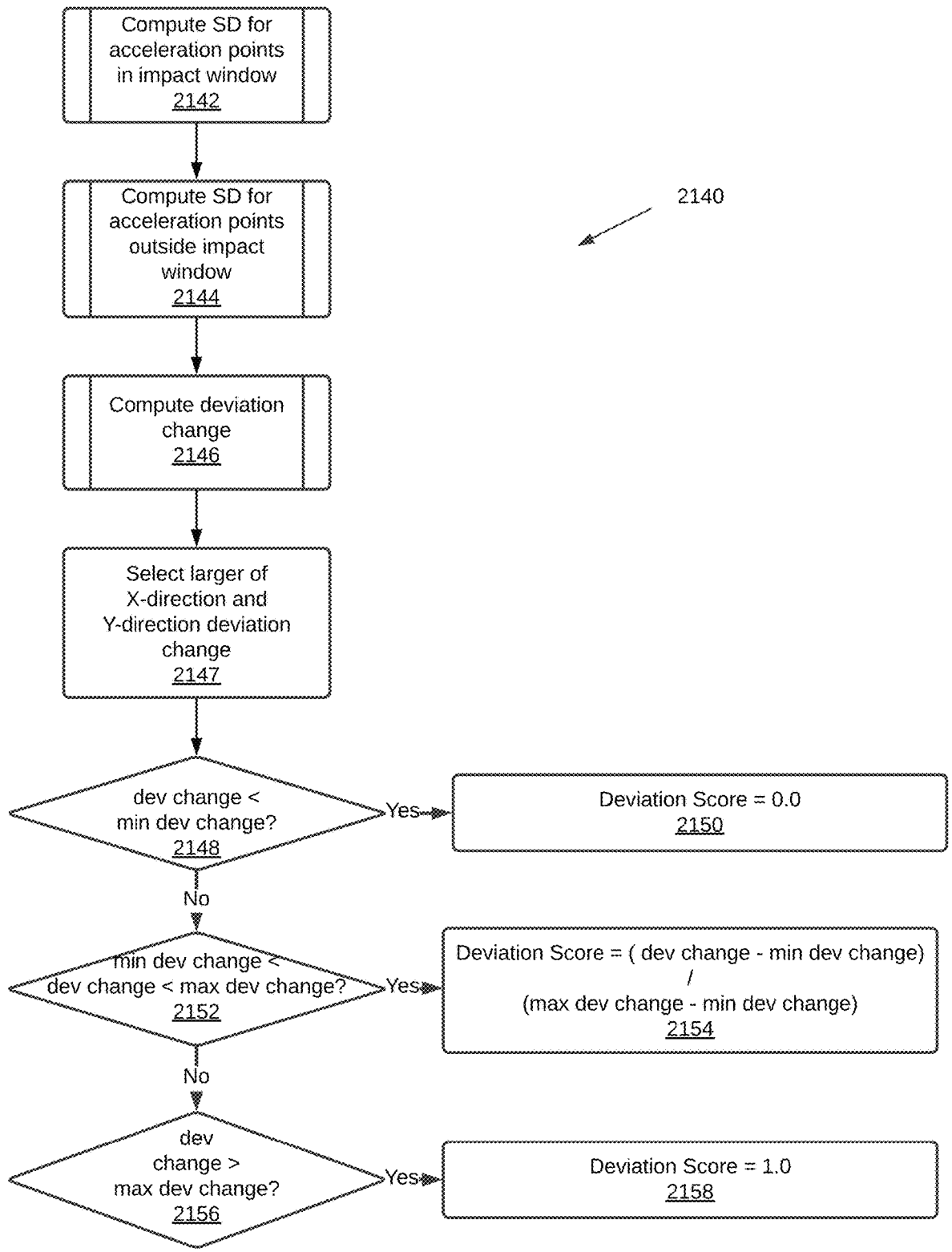
FIG. 21D is a flowchart depicting a method for computing a deviation score based on the change in standard deviation, in accordance with embodiments of the present disclosure.

Primarily, however, the deviation change is used to compute a deviation change score ("deviation score"). As with the AUC, the deviation score is computed in the direction with the greater deviation change (of the X-direction and the Y-direction). FIG. 21D depicts a method 2140 for computing a deviation score, in accordance with embodiments of the present disclosure.

At step 2142, the collision detection facility computes the standard deviation (SD) for a plurality of acceleration points within an impact window. The SD is computed for acceleration points within the impact window in both the X-direction and the Y-direction.

At step 2144, the collision detection facility computes the standard deviation (SD) for a plurality of acceleration points outside an impact window but within non-impact window portions of the acceleration profile that are outside the impact window. The SD is computed for acceleration points outside the impact window in both the X-direction and the Y-direction.

At step 2146, the collision detection facility computes the deviation change by dividing the SD computed for the acceleration points inside the impact window by the SD computed for the acceleration points outside the impact window. The collision detection facility computes the deviation change for both the X-direction and the Y-direction, i.e., the X-direction deviation change and the Y-direction deviation change.

At step 2147, the collision detection facility selects the higher deviation change of the X-direction deviation change and the Y-direction deviation change. The rest of the method uses the selected deviation change for computing the deviation score.

At step 2148, the collision detection facility checks whether the selected deviation change is lower than a minimum deviation change. As an example, the minimum deviation change may be 1.5. When the deviation change is lower than the minimum deviation change, control goes to step 2150. Otherwise, control goes to step 2152.

At step 2150, the deviation score is set to 0.

At step 2152, the collision detection facility checks whether the selected deviation change is higher than a minimum deviation change and lower than a maximum deviation change. As an example, the maximum deviation change may be 2.5. When the selected deviation change is higher than a minimum deviation change and lower than a maximum deviation change, control goes to step 2154. Otherwise, control goes to step 2156.

At step 2154, the deviation score is set as a linear value between 0 and 1, given by the equation:

$$\text{Deviation score} = (\text{dev change} - \text{min dev change}) / (\text{max dev change} - \text{min dev change})$$

At step 2156, the collision detection facility checks whether the selected deviation change is higher than the maximum deviation change. This check is unnecessary since that is the only possibility if the above conditions are not satisfied but is provided for clarity. When the selected deviation change is greater than the maximum deviation change, control goes to step 2158.

At step 2158, the deviation score is set to 1.

The deviation score is combined with other computed scores to arrive at an acceleration context, as depicted in FIG. 24.

c) Number of Zero Crossings

A third feature developed is the number of zero crossing, i.e., the number of times in which the X-acceleration or the Y-acceleration crosses the axis within the impact window. If the number of zero crossings, within the impact window, exceeds a noise zero-crossings threshold, that indicates noise in the acceleration. This is utilized as a method step in the noise identification method of FIG. 22C. For example, it has been observed that if the number of zero crossings in the impact window is greater than 5, then that increases the possibility of the acceleration event being a noise event. Accordingly, the number of zero crossings are used for noise filtering, such as in the noise filter stage of computing the acceleration context as shown in FIG. 24.

d) Maximum Acceleration Points

Another feature that is used for collision detection is the maximum acceleration point value in each axis in the impact window. It has been observed that low maximum acceleration point values are an indication that the corresponding acceleration event is a harsh braking event. As such, the maximum acceleration point value feature is used in the implementation of a harsh braking filter of FIG. 24. The operation of the harsh braking filter is described with reference to the method described in FIG. 22B.

Figure 21E:
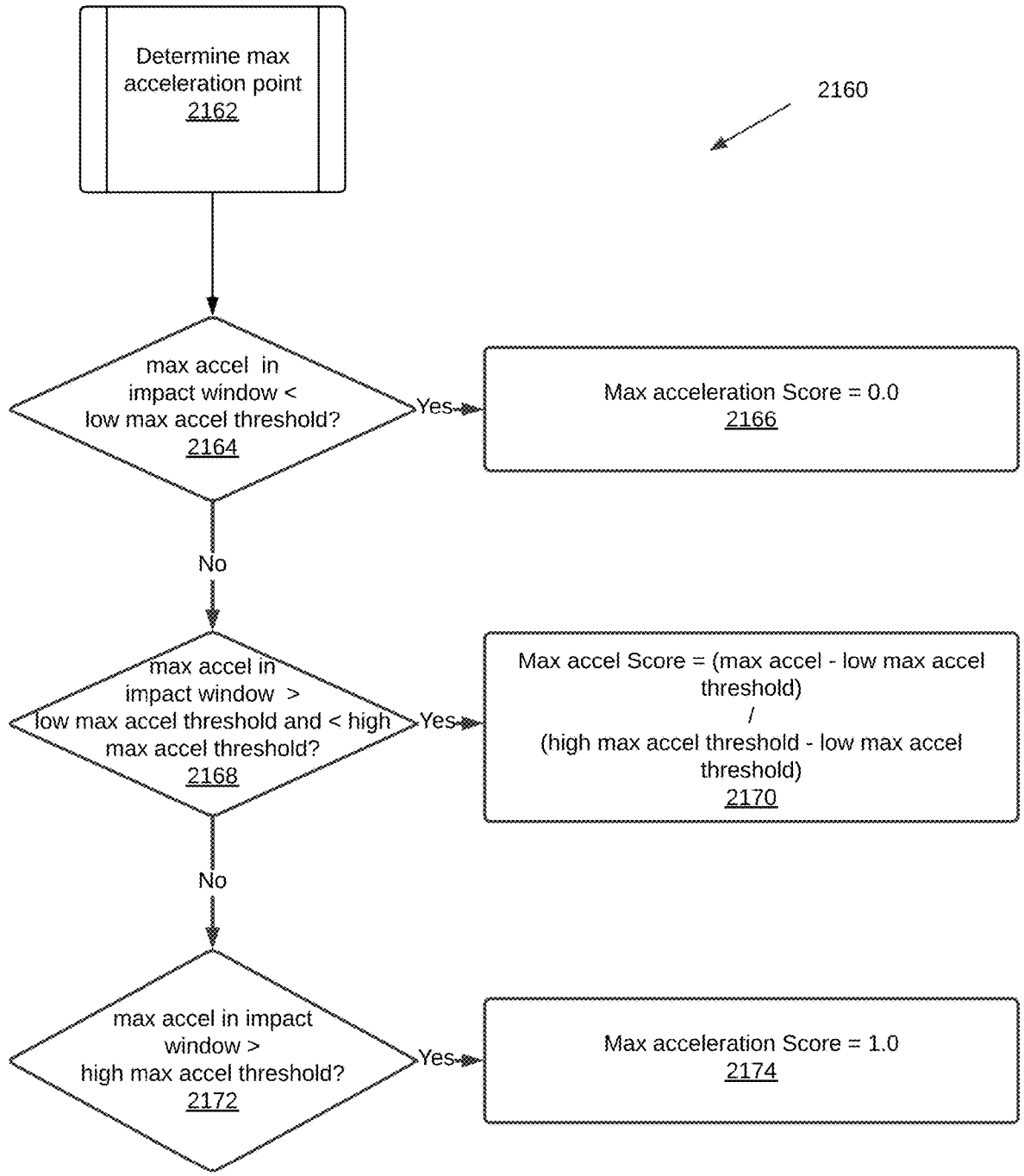
FIG. 21E is a flowchart depicting a method for computing a maximum acceleration score based on a maximum acceleration value, in accordance with embodiments of the present disclosure.

The maximum acceleration point in an impact window is also used to compute a maximum acceleration point score ("maximum acceleration score"), which is used to compute the acceleration context in FIG. 24. In computing the maximum acceleration score, the collision detection facility uses a mapping method similar to the one used for computing the deviation score. A method 2160, by a collision detection facility, for computing a maximum acceleration score is depicted in FIG. 21E.

At step 2162, the collision detection facility determines the point of maximum acceleration ("maximum acceleration point") within the impact window.

At step 2164, the collision detection facility checks whether the maximum acceleration point in the impact window has a maximum acceleration point value that is lower than a low maximum acceleration threshold. By way of example, a low maximum acceleration threshold may be 16 m/s$^2$ in the X-direction or 18 m/s$^2$ in the Y-direction. When the maximum acceleration point is lower than the low maximum acceleration threshold, control goes to step 1266. Otherwise, control goes to step 1268.

At step 2166, the maximum acceleration score is set to 0.

At step 2168, the collision detection facility checks whether the maximum acceleration point in the impact window has a maximum acceleration point value that is higher than the low maximum acceleration threshold and lower than a high maximum acceleration threshold. As an example a high maximum acceleration point may have a value of 35 m/s² in the X-direction or 25 m/s² in the Y-direction. When the maximum acceleration point has a value that is higher than the low maximum acceleration threshold and lower than the high maximum acceleration threshold, control goes to step 2170. Otherwise, control goes to step 2172.

At step 2170, the maximum acceleration score is set as a linear value between 0 and 1, given by the equation:

$$\text{Max accel Score} = (\text{max accel} - \text{low max accel threshold})/(\text{high max accel threshold} - \text{low max accel threshold})$$

At step 2172, the collision detection facility checks whether the maximum acceleration point is higher than the high maximum acceleration threshold. This check is unnecessary since that is the only possibility if the above conditions are not satisfied but is provided for clarity. When the maximum acceleration point is higher than the high maximum acceleration threshold, control goes to step 2174.

At step 2174, the maximum acceleration score is set to 1.0.

The maximum acceleration score may be used as an optional score to compute the acceleration context, as shown in FIG. 24.

e) Impact Window Length

Methods of specifying an impact window have been described above with reference to FIG. 20A and FIG. 20B. While FIG. 20B uses a fixed-length impact window, FIG. 20B uses a variable length impact window. The variable length impact window method yields a different impact window length for each high-rate acceleration trigger event based on when the acceleration profile crosses the acceleration threshold used to define the impact window. The impact window length is a feature that is also used to determine an impact length score which is combined with other scores to arrive at an acceleration context, per FIG. 24.

Figure 21F:
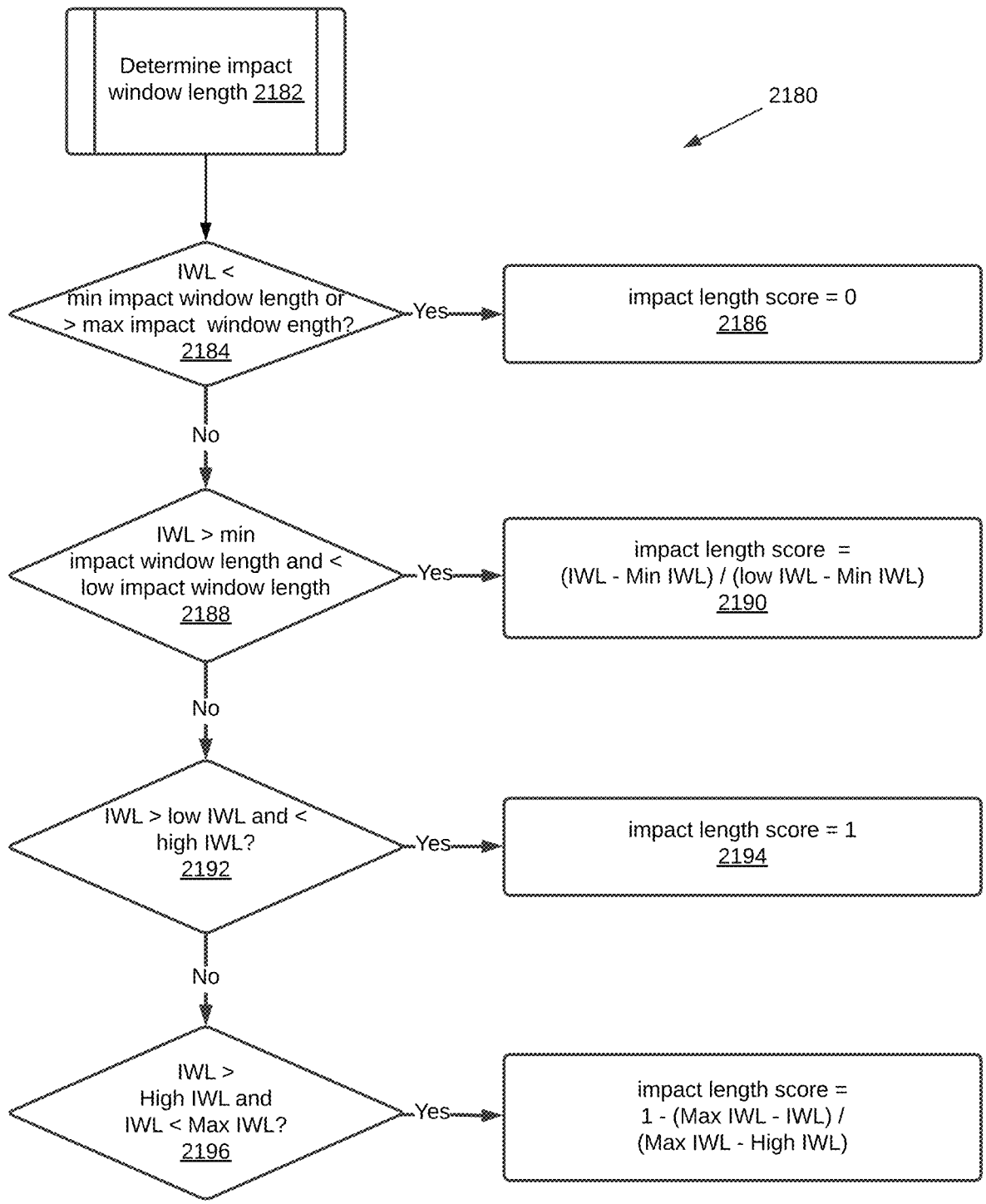
FIG. 21F is a flowchart depicting a method for computing an impact length score based on an impact window length, in accordance with embodiments of the present disclosure.
Figure 21G:
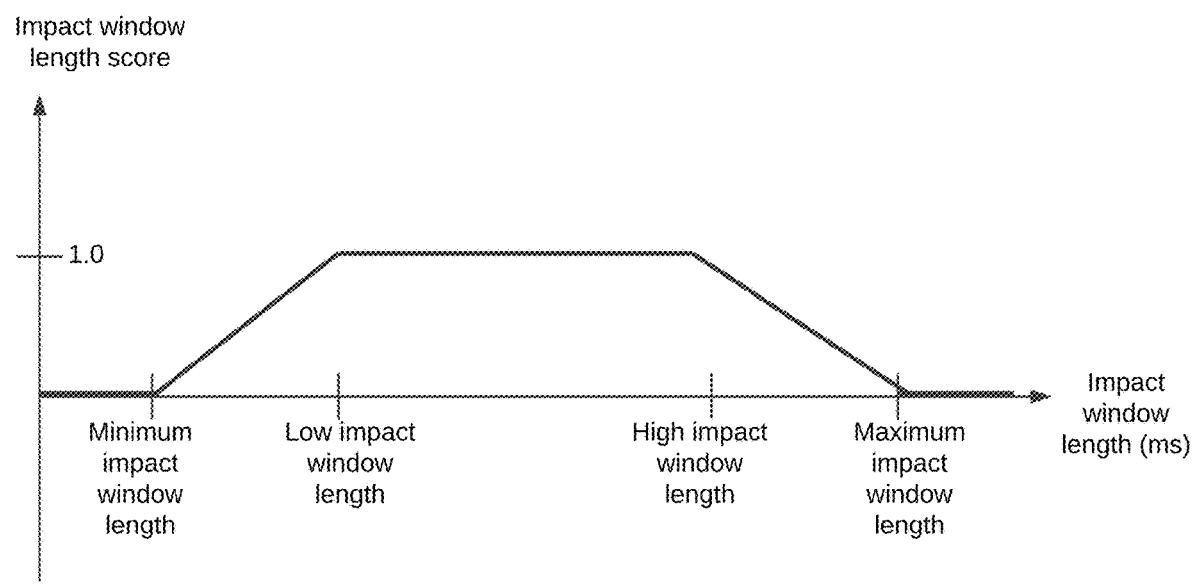
FIG. 21G is a graph illustrating the mapping of impact window length to an impact window length score, in accordance with embodiments of the present disclosure.

FIG. 21F depicts a method 2180 by which the collision detection facility computes an impact length score based on the impact window length, in accordance with embodiments of the present disclosure. FIG. 21G depicts a graph representation of the impact length score as a function of the impact window length.

The method 2120 begins at step 2182. At step 2182, the collision detection facility determines the impact window length. For a fixed length impact window, the step is trivial as the length is predetermined. For a variable-length impact window, as shown in FIG. 20B, the impact window length extends between the first acceleration point 2012 in the impact window at which the magnitude of the acceleration exceeds an impact window trigger threshold 2011 and the second acceleration point 2017 in the impact window, at which the acceleration magnitude drops below an impact window trigger threshold 2011. In the depicted embodiment, the impact window trigger threshold is 1 g in magnitude. The impact window trigger threshold is thus an unsigned quantity. It may be exceeded in the positive direction by a positive acceleration profile and may be exceeded in the negative direction by a negative acceleration profile. The collision detection facility determines the impact window length by subtracting the timestamp of the first acceleration point in the impact window from the timestamp of the last acceleration point in the impact window.

At step 2184, the collision detection facility determines whether the impact window length is less than a minimum impact window length or greater than a maximum impact window length. For example, the minimum impact window length may be 50 ms, and the maximum impact window length may be 200 ms. When the impact window length is less than the minimum impact window length or greater than the maximum impact window length, control goes to step 2186. Otherwise, control goes to step 2188.

At step 2186, the collision detection facility sets the impact length score to 0. A very narrow impact window (i.e., having a length below the minimum impact window length) does not contain a significant amount of energy to be a significant collision. A very wide impact window (i.e., having a length greater than the maximum impact window length) is likely another event as an impact does not last that long, such as greater than 200 ms.

At step 2188, the collision detection facility determines whether the impact window length is greater than the minimum impact window length and smaller than a low impact window length. For example, the minimum impact window length may be 50 ms and the low impact window length may be 75 ms. If the impact window length is greater than the minimum impact window length and smaller than the low impact window length, control goes to step 2190. Otherwise control goes to step 2192.

At step 2190, the collision detection facility computes the impact length score using the formula:

$$\text{Impact length score} = (\text{impact window length} - \text{minimum impact window length})/(\text{low impact window length} - \text{minimum impact window length})$$

As can be seen from the above formula and FIG. 21G, the impact length score is 0 when the impact window length is at the minimum impact window length. As the impact window length increases in value, the impact length score linearly increases. When the impact window length is equal to the low impact window length, the impact length score=1.

At step 2192, the collision detection facility checks whether the impact window length is greater than the low impact window length and is smaller than a high impact window length. For example, the low impact window length may be 75 ms and the high impact window length may be 130 ms. When the collision detection facility determines that the impact window length is greater than the low impact window length and is smaller than the high impact window length, control goes to step 2194. Otherwise, control goes to step 2196.

At step 2194, the collision detection facility has determined that the impact window is not too narrow as to have no energy and is not too wide as to not have a focused amount of energy characteristic of a collision. An impact window having a length within the range specified in step 2192 very likely is characteristic of a collision. Accordingly, the collision detection facility sets the impact length score to 1.

At step 2196, the collision detection facility determines whether the impact window length is greater than the high impact window length and is smaller than the maximum impact window length. If the impact window length is greater than the high impact window length and is smaller than the maximum impact window length, control goes to step 2198. Since there is no other possibility, the decision at step 2196 has no "No" path.

At step 2198, the collision detection facility determines the AUC context score using the formula:

$$\text{Impact Length Score} = 1 - (\text{Max IWL} - \text{IWL})/(\text{Max IWL} - \text{High IWL})$$

In accordance with the formula, as the impact window gets wider, it decreases the likelihood that the acceleration event comprises a collision so the impact length score decreases when the IWL exceeds the high IWL and drops to 0 when the IWL reaches the maximum IWL.

The computed impact length score may be combined with other feature scores, such as the deviation score, the impact length score, and the maximum acceleration score, to compute at an acceleration context, as shown in FIG. 24.

f) Non-Acceleration Features

The inventors have also included features derived from GPS and speed data, obtained from the low-rate events pipeline of FIG. 7. Those features included vehicle pullovers, general speed statistics, and road contexts.

Using the AUC to Characterize High-Rate Acceleration Events

Figure 22A:
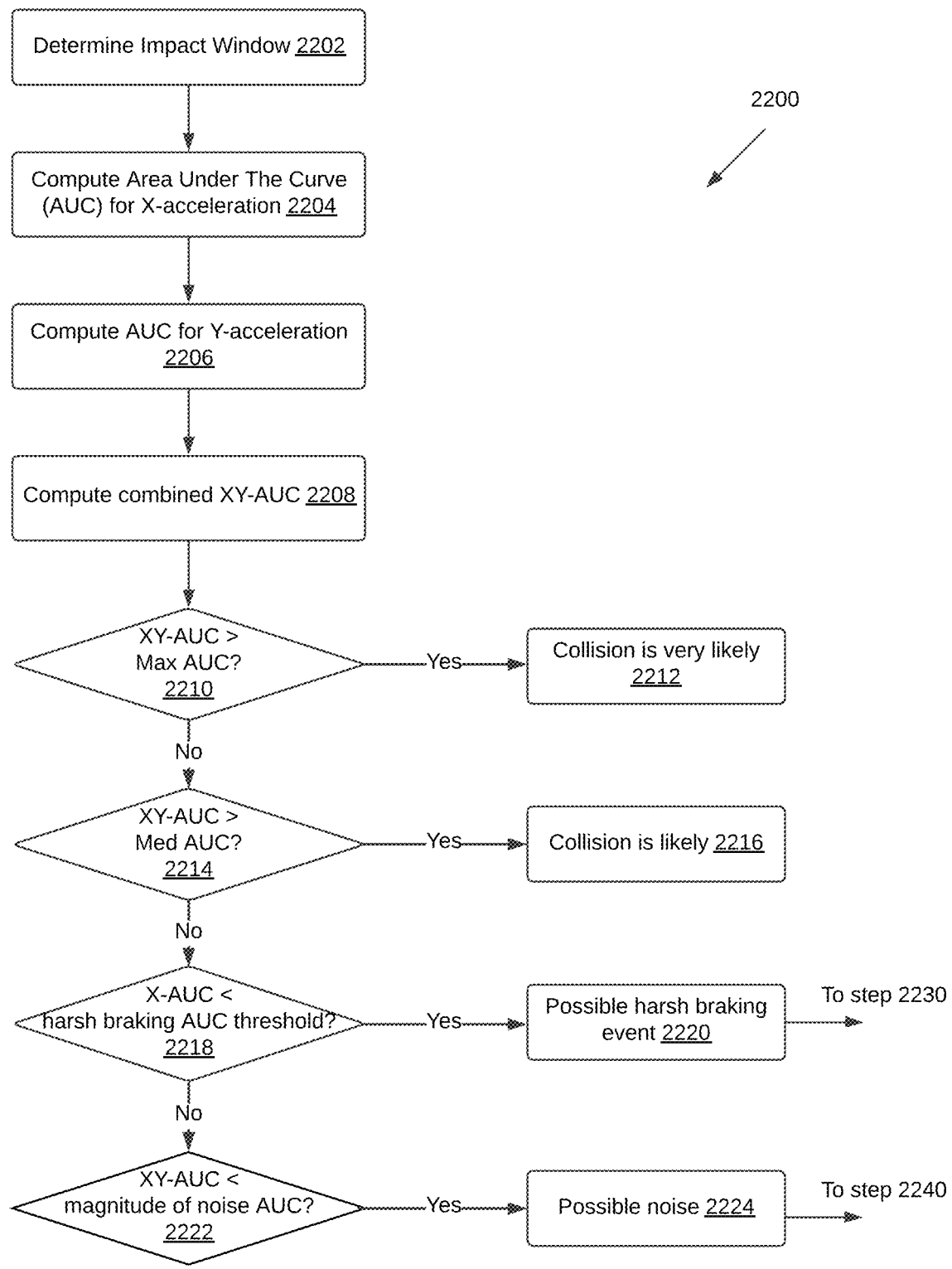
FIG. 22A is a method of characterizing a high-rate acceleration event using the area-under-the-curve (AUC) feature, in accordance with embodiments of the present disclosure.

The AUC can provide indications as to whether the acceleration event is a collision event, a harsh braking event, or noise. This characterization is part of the steps of filtering out events relating to harsh braking or noisy installations of the telematics monitor. FIG. 22A shows a method 2200, by a collision detection facility, for characterizing an acceleration event using the AUC feature for an impact window, in accordance with embodiments of the present disclosure. The method 2200 starts at step 2202 wherein the impact window is determined. The impact window may be determined using the fixed-length method of FIG. 20A or the threshold variable-length method of FIG. 20B.

At step 2204, the collision detection facility computes the AUC for the X-direction acceleration profile in the impact window. This is referred to as X-AUC.

At step 2206, the collision detection facility computes the AUC for the Y-direction acceleration profile in the impact window. This is referred to as Y-AUC.

At step 2208, the collision detection facility computes the AUC for the combined X-Y acceleration curve. This is referred to as XY-AUC.

At step 2210, the XY-AUC magnitude is compared with a maximum AUC. When the XY-AUC magnitude is greater than the maximum AUC, then control goes to step 2212, otherwise control goes to step 2214. The XY-AUC magnitude is greater than a maximum AUC when the XY-AUC is negative and XY-AUC is lower than the maximum negative AUC 2161. The XY-AUC magnitude is greater than a maximum AUC also when the XY-AUC is positive and the XY-AUC is higher than the maximum positive AUC 2167.

At step 2212, the collision detection facility determines that a collision is very likely, or in other words, the acceleration event is very likely a collision event. For example, a collision may be at an angle and therefore has both X and Y force components. As such acceleration in both the X-direction and the Y-direction are relevant in characterizing an acceleration event as a collision. Therefore, the magnitude of the combined AUC for both the X-direction and Y-direction acceleration profiles is compared against a threshold, such as a maximum AUC. When the combined AUC for both the X-direction and Y-direction (i.e., XY-AUC) is greater than the maximum AUC, the collision detection facility determines that a collision is very likely. As an example, the magnitude of the maximum AUC may be 2000 (corresponding to a maximum negative AUC of −2000 and a maximum positive AUC of 2000). Since the acceleration event is very likely a collision, the acceleration event is not filtered out by either the harsh braking filter 2420 or the noise filter 2430 of FIG. 24.

At step 2214, the collision detection facility compares the XY-AUC magnitude with a medium AUC. In this context, the XY-AUC magnitude is greater than the medium AUC when the XY-AUC is positive and the XY-AUC is higher than the medium positive AUC 2165. The XY-AUC magnitude is greater than the medium AUC if the XY-AUC is negative and is lower than the medium negative AUC 2163. When the XY-AUC magnitude is greater than the magnitude of the medium AUC, then control goes to step 2216, otherwise control goes to step 2218.

At step 2216, the collision detection facility determines that a collision is likely, or in other words, the acceleration event is likely a collision event. The determination is based on the amount of energy in the acceleration event which is lower than the energy corresponding to the maximum AUC but is higher than the energy corresponding to the medium AUC. As an example, the magnitude of the medium AUC may be 1000. Since the acceleration event is likely a collision, the acceleration event is not filtered out by either the harsh braking filter 2420 or the noise filter 2430 of FIG. 24

At step 2218, the collision detection facility compares the AUC in the X-direction (i.e. along the longitudinal axis of the vehicle) to a harsh braking AUC. Assuming the X-direction is in the direction of travel of the vehicle, then during braking the acceleration is in the negative X-direction. As such the X-direction AUC (X-AUC) is negative. The harsh braking AUC is also a negative quantity. When the X-AUC is less (i.e., more negative) than the harsh braking AUC, then control goes to step 2220, otherwise control goes to step 2222. As an example, the harsh braking AUC may be −500. As another example, the harsh breaking AUC may be −300.

Figure 22B:
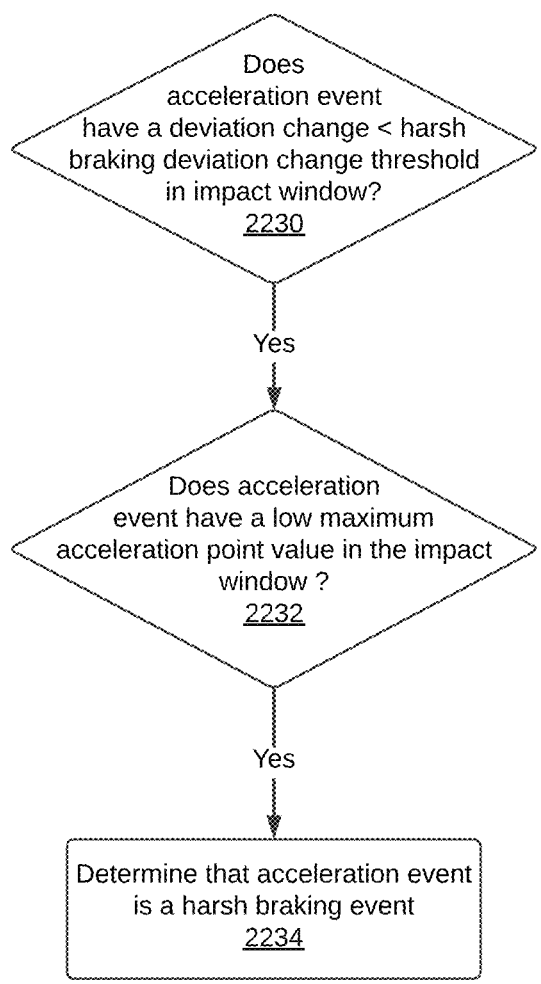
FIG. 22B shows steps for ascertaining that the high-rate acceleration event is a harsh braking event, in accordance with embodiments of the present disclosure.

At step 2220, the collision detection facility determines that the event is possibly a harsh braking event. Other features may need to be checked to verify that the event is a harsh braking event. As such, the method may proceed to step 2230 of FIG. 22B. In FIG. 22B the collision detection facility conducts further tests to ascertain that the acceleration event corresponds to a harsh braking event. For example, a low standard deviation change and a low number of maximum acceleration points can provide additional verification that the event is indeed a harsh breaking event, as will be described below.

At step 2222, the magnitude of XY-AUC is compared with a noise AUC threshold. When the magnitude of XY-AUC has a lower magnitude than the noise AUC threshold, then control goes to step 2224.

At step 2224, the collision detection facility determines that the acceleration event is possibly a noise event. The collision detection facility conducts further verification that the acceleration event is a noise event by checking the standard deviation change and the number of zero crossings. Accordingly, the collision detection facility proceeds to step 2240 of FIG. 22C.

Using Deviation Change and Maximum Acceleration Points to Verify Harsh Braking Events FIG. 22B contains method steps by which the collision detection facility verifies whether the acceleration event is a harsh braking event based on the deviation change and the maximum acceleration point features. The steps 2230 through 2234 are executed by the collision detection facility when the collision detection facility concludes that an acceleration event is possibly a harsh braking event based on comparing an X-direction AUC with a harsh braking AUC threshold (i.e., subsequent to steps 2218 and 2220 of FIG. 22A0. With reference to FIG. 22B, at step 2230 the collision detection facility checks whether the deviation change is less than a harsh braking deviation change threshold. For example, the harsh braking deviation change threshold may be equal to 1.5 or 1.6. If yes, then at step 2232 the collision detection facility checks whether the maximum acceleration point has a low acceleration value. If yes, then the event is a harsh braking event. The collision detection facility thus determines that an acceleration event is a harsh braking event when the X-direction AUC is less than a harsh braking AUC, the deviation change is less than a harsh braking deviation change threshold, and the maximum acceleration point has a low acceleration value. For the purpose of identifying or verifying harsh braking events, a low acceleration value for the maximum acceleration point may be in the range of 1 g to 1.6 g.

When harsh braking events are verified, the collision detection facility can filter out acceleration data corresponding to the harsh braking events in order to compute an acceleration context that is dependent on acceleration data relating to collision events. The harsh braking filter 2420 of FIG. 24 relies on the step 2218 of FIG. 22A and the steps of FIG. 22B to identify and filter out acceleration data corresponding to harsh braking events.

Figure 22C:
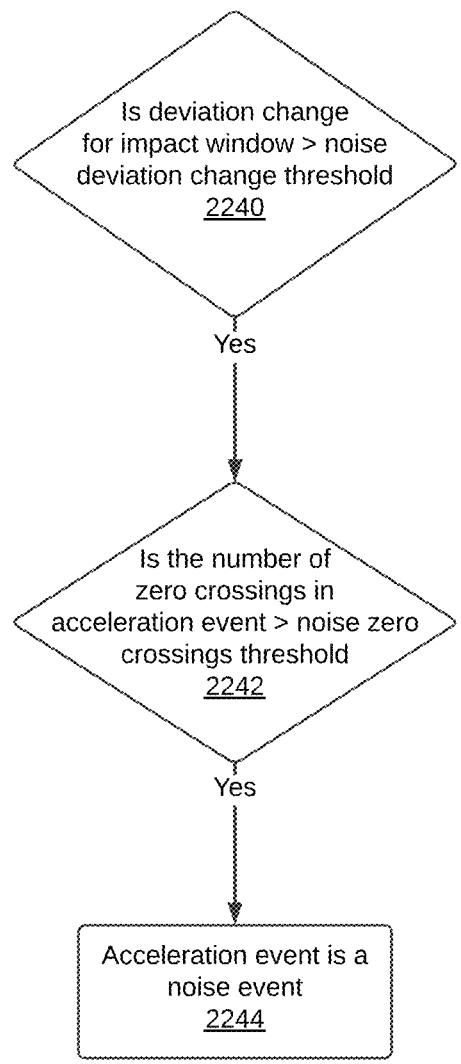
FIG. 22C shows steps for ascertaining that the high-rate acceleration event is a noise event, in accordance with embodiments of the present disclosure.

Using Deviation Change and Zero Crossings to Verify that an Acceleration Event is a Noise Event In FIG. 22A, at step 2224 the collision detection facility determines that the acceleration event is possibly a noise event based on a comparison between the combined X-direction and Y-direction AUC with a noise AUC threshold (step 222). FIG. 22c contains the steps 2240 through 2244 which utilize the deviation change feature and the number of zero crossings feature to verify whether the acceleration event is indeed a noise event. With reference to FIG. 22C, at step 2240, the collision detection facility checks whether the deviation change is greater than a noise deviation change threshold. For example, a deviation change of 1 g or greater may indicate a possible noise event. When the deviation change is greater than the noise deviation change threshold, then at step 2242, the collision detection facility checks the number of zero crossings in the acceleration profile against a noise zero crossings threshold, such as 5. When the number of zero crossings is greater than the noise zero crossings threshold, control goes to step 2244. At step 2244, the collision detection facility determines that the acceleration event is a noise event. The collision detection facility thus determines that an acceleration event is a noise event when the combined AUC in the X-Y direction (i.e. combined XY-AUC) is less than a noise AUC, the deviation change is greater than a noise deviation change threshold, and the number of zero crossings is greater than a noise zero crossings threshold.

The steps of FIG. 22C are part of filtering noisy events in the noise filter 2430 of FIG. 24 discussed below.

Using Deviation Change to Characterize an Acceleration Event

Figure 23:
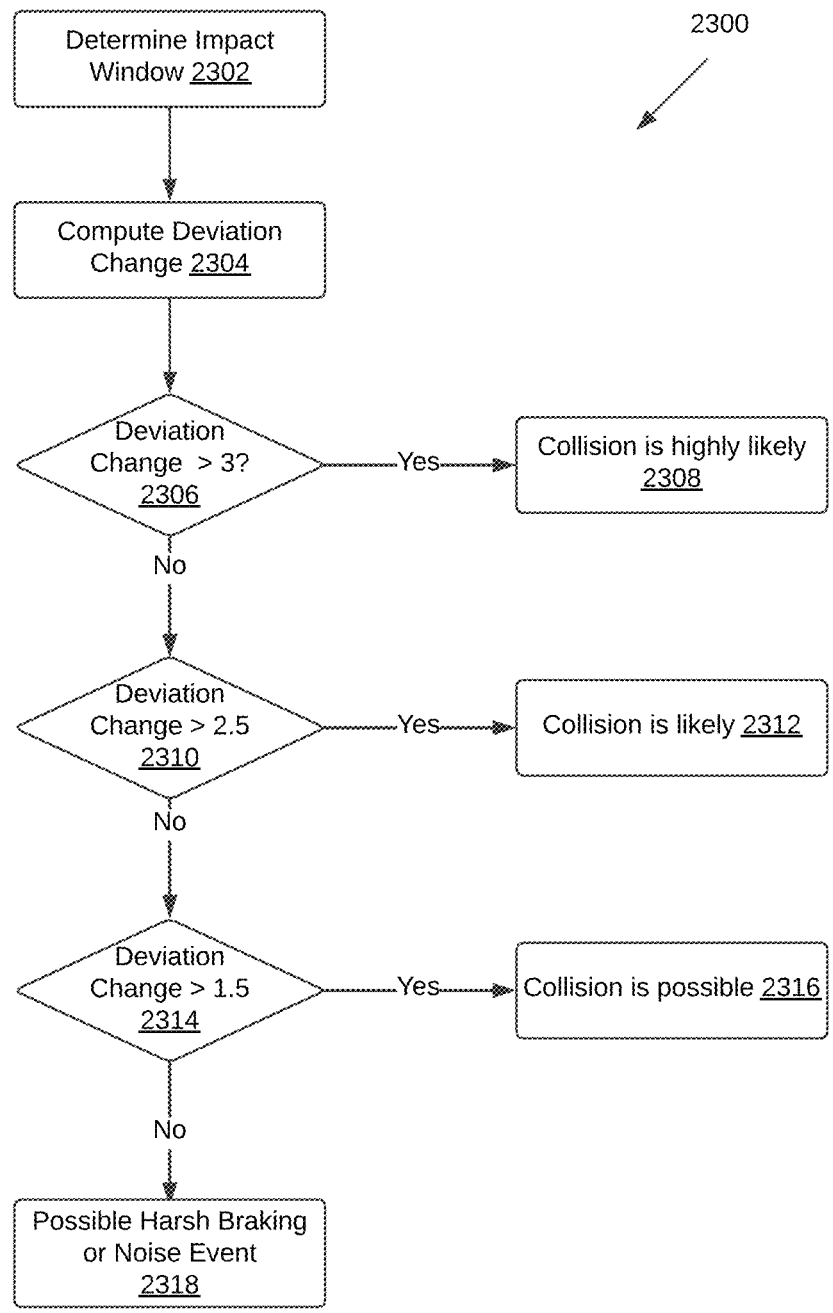
FIG. 23 is a method of characterizing a high-rate acceleration event using the change in standard deviation, in accordance with embodiments of the present disclosure.

FIG. 23 depicts a method 2300 of using deviation change for characterizing an event as to whether it is a collision or a harsh braking event or noisy event, in accordance with embodiments of the present disclosure. The method 2300 may be used as part of filtering out harsh braking events and/or noise events.

The method begins at step 2302 where the collision detection facility determines an impact window. This step is similar to step 2202 of FIG. 22A.

At Step 2304, the collision detection facility computes the deviation change between acceleration points within the impact window and acceleration points outside the impact window but within a duration around the impact window as discussed above. At step 2306, if the deviation change computed is higher than 3, then control goes to step 2308, otherwise control goes to step 2310.

At step 2308, it is determined that a collision is highly likely. In this case, the acceleration event is not filtered out. Instead, the acceleration event is used to compute the respective scores, such as the AUC score, deviation score, impact length score, and maximum acceleration score.

At step 2310, if the deviation change is higher than 2.5, then control goes to step 2312, otherwise control goes to step 2314.

At step 2312, it is determined that a collision is likely. In this case, the acceleration event is not filtered out. Instead, the acceleration event is used to compute the respective scores, such as the AUC score, deviation score, impact length score, and maximum acceleration score.

At step 2314, if it is determined that the deviation change is greater than 1.5, then control goes to step 2316, otherwise control goes to step 2318.

At step 2318, it is determined that the event is possibly a harsh braking event or a noise event since the deviation change is minimal (below 1.5) or substantially the same between the impact window and the duration outside the impact window. In this case, the acceleration event is filtered out and is not used to compute any of the scores, such as the AUC score, deviation score, impact length score, and maximum acceleration score.

Other factors can then be checked to ascertain whether the acceleration event is indeed a harsh braking event. For example, if the AUC in the X-direction (X-AUC) is below 500, then that increases the possibility that the acceleration event is a harsh braking event. Additionally, if the maximum acceleration points have a low magnitude, then that also increases the possibility that the acceleration event is a harsh braking event. These checks have been described above with reference to FIG. 22B and may be executed after step 2318.

To determine whether the acceleration event is a noise event, the magnitude of the XY-AUC is checked to see if it is lower than 600, and the number of zero crossings is checked to see if it is greater than 5. These checks have been described above with reference to FIG. 22C and may be executed after step 2318.

Feature Testing

In order to test whether the generated features described above accurately predict whether an event is a collision event, a harsh braking event, or noise, the inventors have validated their method using 150 labeled events. Each of the events used for testing was hand-labeled as one of: a collision event, a harsh braking event, or noise. The labels were obtained from prior knowledge of each of the events, such as from a low-rate data pipeline. To test the significance of each feature and determine the respective thresholds across the different types of events (i.e., collision, harsh braking, or noise), the events were placed into a visual learning facets tool ("facets tool"). The facets tool used allowed for testing multiple features thus allowing testing and creating clusters of events.

Findings of Feature Testing

Feature testing showed that the threshold-based impact window method of FIG. 20B gave better prediction of collisions than the constant length impact window method of FIG. 20A.

Heuristic Modeling

As described above with reference to FIG. 8 and FIG. 9, a heuristic model is developed. The model consisted of a weighted sum of different feature-based contexts, as well as initial false positive filters for noise and harsh braking. The different contexts include Acceleration, Speed, Pullover, and Road. All these contexts are scores from 0 to 1. The Speed, Pullover, and Road contexts are the same as the low-rate model, but the Acceleration context was heavily modified. The Acceleration context was made up of an AUC score, a deviation score, a maximum acceleration score, and an impact length score. Each of these scores were calculated from a linear map, and then weighted to achieve the acceleration context.

Computing the Acceleration Context from Acceleration Events

FIG. 24 is an acceleration context design process, in which the acceleration context is derived from an AUC score, a deviation score, a maximum acceleration score, and an impact length (duration) score.

The process of FIG. 24 takes high-rate acceleration data 2410 as an input thereto.

The harsh braking filter 2420 of the collision detection facility filters out harsh braking events so they are not used in the computation of the acceleration context. Filtering out harsh braking events in harsh braking filter 2420 utilizes the methods described in FIG. 22A, FIG. 22B, and FIG. 23. Specifically, the methods of FIG. 22A and FIG. 23 identify possible noise events, and the steps in FIG. 22B verify that the possible noise events are indeed noise events and can be filtered out.

A noise filter 2430 of the collision detection facility filters out noise events so they are not used in the computation of the acceleration context. The noise filter 2430 utilizes the methods described in FIG. 22A, FIG. 22C, and FIG. 23. Specifically, the methods of FIG. 22A and FIG. 23 identify possible harsh braking events, and the steps in FIG. 22C the collision detection facility verifies that the possible harsh braking events are indeed harsh braking events and can be filtered out.

At block 2440, the collision detection facility computes the AUC score, as described above with reference to FIG. 21A, FIG. 21B, and FIG. 21C.

At block 2450, the collision detection facility computes the deviation score using the methods described above with reference to FIG. 21D.

At block 2460, the collision detection facility computes the impact length score using the methods described above with reference to FIG. 21F and FIG. 21G.

At block 2465, the collision detection facility computes the maximum acceleration score, using the methods described above with reference to FIG. 21E. In the depicted figure, the block 2465 is shown in dashed lines to indicate that it is optional in some embodiments.

At block 2470, the collision detection facility computes an acceleration context 2480 based on the AUC score, the deviation score, the impact length score, and the maximum acceleration. The acceleration score is a weighted sum of the individual scores. In some implementations the acceleration context is computed based on the AUC score, the deviation score, and the impact length score. For example, in one implementations, the acceleration context score is computed as:

0.4*deviation score+0.4*AUC score+0.2*impact length score

The computed acceleration context is then used to compute the full accident score, as shown in FIG. 25. FIG. 25 depicts how an accident score 2595 is computed from an acceleration context 2480, a pullover context 2540, a speed context 2550, and a road context 2580.

High-rate acceleration data 2410 is captured by a telematics monitor as discussed. At block 2520, the collision detection facility computes an acceleration context 2480 from the high-rate acceleration data 2410, as described with reference to FIG. 24.

Speed data 2530 is captured by the telematics monitor either by an IMU unit or GPS or both. At block 2535, the collision detection facility computes a pullover context 2540 based on the speed data 2530.

At block 2545, the collision detection facility computes a speed context 2550 based on the speed data 2530. Computing the pullover context has been described earlier in this disclosure.

GPS data 2560 is gathered from a GPS module in the telematics monitor. At block 2565, the collision detection facility computes a road context 2580. Computing the road context 2580 has been described earlier in this disclosure.

At block 2590, the collision detection facility computes an accident score 2595 based on the acceleration context 2480, the pullover context 2540, the speed context 2550, and the road context 2580. In some implementations, the accident score 2595 is the weighted sum of the acceleration context, the pullover context, the speed context, and the road context. For example, as shown in block 2590, the accident score is given by formula:

accident score=acceleration context*weight1+pullover context*weight2+speed context*weight3+road context*weight4

In some implementations, the weights may be chosen to be fractions such that the computed accident score is a score between 0 and 1.

In some implementations an accident score indicating a collision is used by the collision detection facility to request deployment of emergency vehicles to assist the vehicle containing the telematics monitor that gathered the high-rate acceleration data.

In some implementations, an accident score indicating a collision by a vehicle causes the collision detection facility to send a message to the telematics monitor deployed in the vehicle. In some cases, the message places the telematics monitor in a data-gathering mode for gathering additional data about the collision. For example, the telematics monitor may be configured, by the message, to record video and/or audio using a device coupled to the telematics monitor. In some cases, the message may cause the telematics monitor to send additional information captured prior to the accident to a remote server. In some cases, the message causes the telematics monitor to dial an emergency phone number and enable a microphone such that the operator of the vehicle may speak with the emergency personnel.

The collision detection facility may be a remote server or implemented locally to the telematics monitor. When the collision detection facility is local to the telematics monitor, the collision detection facility may send messages to other applications on the telematics monitor to request emergency services, enable capturing of additional data, capture audio/video, or dial an emergency telephone number and enable a microphone.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method, comprising:
    capturing, by a telematics monitor coupled to a vehicle, high-rate acceleration data, speed data, and global positioning system (GPS) data;
    identifying at least one high-rate acceleration trigger event from the high-rate acceleration data;
    computing a plurality of feature values for a plurality of features corresponding to the at least one high-rate acceleration trigger event;
    when at least some of the plurality of feature values indicate that the at least one high-rate acceleration trigger event comprises a noise event or a harsh braking event, filtering out the at least one high-rate acceleration trigger event from the high-rate acceleration data;
    when the at least some of the plurality of feature values indicate that the at least one high-rate acceleration trigger event does not comprise a noise event and does not comprise a harsh braking event;
    computing a plurality of feature scores corresponding to the plurality of feature values;
    computing an acceleration context based on the plurality of feature scores;
    computing, by a collision detection facility local to the telematics monitor, each of:
    the acceleration context based on the high-rate acceleration data;
    a pullover context based on the speed data;
    a speed context based on the speed data; and
    a road context based on the GPS data;
    computing, by the collision detection facility, an accident score based on the acceleration context, the pullover context, the speed context, and the road context; and
    in response to determining that the accident score indicates a potential collision, triggering at least one action for responding to the potential collision.

2. The method of claim 1, wherein capturing the high-rate acceleration data comprises capturing acceleration data at a rate between 80 Hz and 120 Hz.

3. The method of claim 1, wherein identifying the at least one high-rate acceleration trigger event from the high-rate acceleration data comprises identifying a plurality of successive acceleration points having a magnitude which is above a trigger threshold.

4. The method of claim 1, wherein identifying the at least one high-rate acceleration trigger event from the high-rate acceleration data comprises:
    identifying a first plurality of successive acceleration points having magnitudes above a trigger threshold;
    identifying a second plurality of successive acceleration points having magnitudes above the trigger threshold; and
    when a first acceleration point of the second plurality of successive acceleration points has a first acceleration point timestamp that is within a predetermined time window after a last acceleration point timestamp of a last acceleration point in the first plurality of successive acceleration points, combining the first plurality of successive acceleration points and the second plurality of successive acceleration points to form the at least one high-rate acceleration trigger event.

5. The method of claim 1, wherein computing the plurality of feature values for the plurality of features corresponding to the at least one high-rate acceleration trigger event comprises:
    defining an impact window for the at least one high-rate acceleration trigger event;
    computing an area-under-the-curve (AUC) for the impact window;
    computing a deviation change for the impact window;
    determining an impact window length for the impact window;
    determining a maximum acceleration point value of the impact window; and
    determining a number of zero crossings for the impact window.

6. The method of claim 5, wherein at least some of the plurality of feature values indicate that the at least one high-rate acceleration trigger event comprises a noise event when:
    the AUC comprises a combined AUC for a combined X-direction and Y-direction acceleration profile inside the impact window;
    the combined AUC has a lower magnitude than a noise AUC threshold;
    the deviation change is greater than a noise deviation change threshold; and
    the number of zero crossings is greater than a noise zero crossings threshold.

7. The method of claim 5, wherein at least some of the plurality of feature values indicate that the at least one high-rate acceleration trigger event comprises a harsh braking event when:
    the AUC is more negative than a harsh braking AUC threshold;
    the deviation change is less than a harsh braking deviation change threshold; and the maximum acceleration point value is lower than a low maximum acceleration threshold.

8. The method of claim 5, wherein computing the plurality of feature scores, comprises:
computing an AUC score from the AUC;
computing a deviation score from the deviation change; and
computing an impact length score from the impact window length.

9. The method of claim 8, wherein computing the plurality of feature scores further comprises computing a maximum acceleration score.

10. The method of claim 8, wherein computing the AUC score, comprises:
comparing an X-direction maximum acceleration for an X-direction acceleration profile of the at least one high-rate acceleration trigger event and a Y-direction maximum acceleration for a Y-direction acceleration profile of the at least one high-rate acceleration trigger event;
when the X-direction maximum acceleration is greater than the Y-direction AUC maximum acceleration, computing an X-direction AUC and selecting the X-direction AUC as a selected AUC that is to be mapped to the AUC score; and
when the Y-direction maximum acceleration is greater than the X-direction maximum acceleration, computing a Y-direction maximum acceleration and selecting the Y-direction maximum acceleration to be the selected AUC that is to be mapped to the AUC score.

11. The method of claim 10, wherein mapping the selected AUC to the AUC score, comprises:
when the selected AUC is lower than a maximum negative AUC or is higher than a maximum positive AUC, setting the AUC score to 1;
when the selected AUC is higher than the maximum negative AUC and is lower than a medium negative AUC, setting the AUC score to:

1−(the selected AUC−the maximum negative AUC)/
(the medium negative AUC−the maximum
negative AUC);

when the selected AUC is higher than the medium negative AUC and lower than a medium positive AUC, setting the AUC score to 0; and
when the selected AUC is higher than the medium positive AUC and is lower than the maximum positive AUC, setting the AUC score to:

(the maximum positive AUC−the selected AUC)/(the
maximum positive AUC−the medium positive
AUC).

12. The method of claim 8, wherein computing the deviation score, comprises:
for each of an X-direction acceleration profile and a Y-direction acceleration profile of the at least one high-rate acceleration trigger event:
computing a first standard deviation for a first plurality of acceleration points within the impact window;
computing a second standard deviation for a second plurality of acceleration points outside the impact window but within a predetermined duration thereof; and
computing the deviation change by dividing the first standard deviation by the second standard deviation;
wherein the deviation change computed for the X-direction acceleration profile is an X-direction deviation change, and the deviation change computed for the Y-direction acceleration profile is a Y-direction deviation change.

13. The method of claim 12, wherein computing the deviation score further comprises:
selecting a higher deviation change of the X-direction deviation change and the Y-direction deviation change as a selected deviation change;
when the selected deviation change is lower than a minimum deviation change, setting the deviation score to 0;
when the selected deviation change is higher than a maximum deviation change, setting the deviation score to 1; and
when the selected deviation change is higher than the minimum deviation change and lower than the maximum deviation change, setting the deviation score to:

(the selected deviation change−the minimum deviation change)/(the maximum deviation change−
the minimum deviation change).

14. The method of claim 8, wherein determining the impact length score comprises:
when the impact window length is lower than a minimum impact window length or higher than a maximum impact window length, setting the impact length score to 0;
when the impact window length is higher than a low impact window length and lower than a high impact window length, setting the impact length score to 1;
when the impact window length is higher than the minimum impact window length and is lower than the low impact window length, setting the impact length score to:

(the impact window length−the minimum impact
window length)/(the low impact window
length−the minimum impact window length);
and when the impact window length is higher than the high impact window length and lower than the maximum impact window length, setting the impact length score to:

1−(the maximum impact window length−the impact
window length)/(the maximum impact window
length−the minimum impact window length).

15. The method of claim 9, wherein computing the maximum acceleration score comprises:
when the maximum acceleration point value is lower than a low maximum acceleration threshold, setting the maximum acceleration score to 0;
when the maximum acceleration point value is higher than a high maximum acceleration threshold, setting the maximum acceleration score to 1; and
when the maximum acceleration point value is higher than the low maximum acceleration threshold and lower than the high maximum acceleration threshold, setting the maximum acceleration score to:

(the maximum acceleration point value−the low
maximum acceleration threshold)/(the high
maximum acceleration threshold−the low maximum acceleration threshold).

16. The method of claim 1, wherein computing the accident score comprises computing a weighted average of the acceleration context, the pullover context, the speed context, and the road context.

17. The method of claim 1, wherein triggering the at least one action comprises placing the telematics monitor in a data-gathering mode for gathering additional data pertaining to a collision.

18. The method of claim 1, wherein triggering the at least one action comprises making an emergency call from the telematics monitor.

19. The method of claim 5, wherein defining the impact window uses a threshold-based method in which:
- the impact window starts at a first acceleration point having an acceleration magnitude that is higher than an impact window trigger threshold; and
- the impact window ends at a second acceleration point having an acceleration magnitude that is lower than the impact window trigger threshold.

\* \* \* \* \*